United States Patent
Oseto

(10) Patent No.: US 7,702,666 B2
(45) Date of Patent: Apr. 20, 2010

(54) FULL-TEXT SEARCH DEVICE PERFORMING MERGE PROCESSING BY USING FULL-TEXT INDEX-FOR-REGISTRATION/DELETION STORAGE PART WITH PERFORMING REGISTRATION/DELETION PROCESSING BY USING OTHER FULL-TEXT INDEX-FOR-REGISTRATION/DELETION STORAGE PART

(75) Inventor: Futoshi Oseto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 663 days.

(21) Appl. No.: 10/453,578

(22) Filed: Jun. 4, 2003

(65) Prior Publication Data

US 2004/0006555 A1    Jan. 8, 2004

(30) Foreign Application Priority Data

Jun. 6, 2002   (JP)   ............................ 2002-165580
Jun. 11, 2002  (JP)   ............................ 2002-169487
Jul. 23, 2002  (JP)   ............................ 2002-214343

(51) Int. Cl.
G06F 17/30   (2006.01)

(52) U.S. Cl. ...................... 707/610; 707/611; 707/613; 711/162

(58) Field of Classification Search ................. 707/204, 707/6, 100, 610; 711/162
See application file for complete search history.

(56) References Cited

U.S. PATENT DOCUMENTS

| | | | |
|---|---|---|---|
| 5,020,019 A |   | 5/1991 | Ogawa |
| 5,155,809 A | * | 10/1992 | Baker et al. ................. 709/227 |
| 5,469,354 A | * | 11/1995 | Hatakeyama et al. .......... 707/3 |
| 5,535,382 A |   | 7/1996 | Ogawa |
| 5,537,585 A | * | 7/1996 | Blickenstaff et al. ........ 707/205 |
| 5,680,612 A |   | 10/1997 | Asada et al. |
| 5,701,427 A | * | 12/1997 | Lathrop ...................... 709/237 |
| 5,961,602 A | * | 10/1999 | Thompson et al. .......... 709/229 |
| 5,995,963 A | * | 11/1999 | Nanba et al. .................... 707/6 |
| 6,003,043 A | * | 12/1999 | Hatakeyama et al. ....... 707/203 |
| 6,097,797 A |   | 8/2000 | Oseto |
| 6,230,189 B1 |   | 5/2001 | Sato et al. |

(Continued)

FOREIGN PATENT DOCUMENTS

JP    01-098020    4/1989

(Continued)

OTHER PUBLICATIONS

"A Critique of ANSI SQL Isolation Levels" by Hal Berenson et al., ACM SIGMOD Conf. (Jun. 1995) pp. 1-10.

(Continued)

*Primary Examiner*—Etienne P LeRoux
*Assistant Examiner*—Monica M Pyo
(74) *Attorney, Agent, or Firm*—Dickstein Shapiro LLP

(57) ABSTRACT

When a number of document data registered in one of full-text index-for-registration/deletion storage parts reaches a predetermined number, or when a capacity of the full-text index-for-registration/deletion storage part reaches a predetermined capacity, a merge processing is performed for merging data from the full-text index-for-registration/deletion storage part to a full-text index-for-search storage part. While this merge processing is performed, a registration/deletion processing is performed by using another full-text index-for-registration/deletion storage part.

6 Claims, 34 Drawing Sheets

U.S. PATENT DOCUMENTS

| | | | |
|---|---|---|---|
| 6,286,004 | B1 | 9/2001 | Yoshiura et al. |
| 6,546,383 | B1 | 4/2003 | Ogawa |
| 6,640,225 | B1 | 10/2003 | Takishita et al. |
| 7,016,914 | B2* | 3/2006 | Nayak ................... 707/102 |
| 2003/0014432 | A1* | 1/2003 | Teloh et al. ............. 707/204 |
| 2003/0033297 | A1 | 2/2003 | Ogawa |
| 2003/0220950 | A1 | 11/2003 | Hiraoka et al. |

FOREIGN PATENT DOCUMENTS

| | | |
|---|---|---|
| JP | 7-146880 | 6/1995 |
| JP | 9-265420 | 10/1997 |
| JP | 10-143412 | 5/1998 |
| JP | 10-240754 | 9/1998 |
| JP | 11-73429 | 3/1999 |
| JP | 2000-163294 | 6/2000 |

OTHER PUBLICATIONS

"Principles of Transaction Processing" by Philip A. Bernstein, Eric Newmarker; Nikkei Business Publications, Inc.

"Information Retrieval Algorithm" by Kenji Kitasato et al., Kyoritsu Shuppan Co., Ltd., pp. 160-179.

1998 Activity Report of Full-Text Search System Conference (http://www.ftsanet.com/dbtokyo99/Db99.htm).

J. Yoshiwara et al., "Incremental Updating Scheme of a Full-Text Index Structure for WWW Text Search Engines", vol. 40, No. Sig8(T0D4), pp. 112-125, Nov. 1999 (with English abstract).

* cited by examiner

FULL-TEXT SEARCH DEVICE PERFORMING MERGE PROCESSING BY USING FULL-TEXT INDEX-FOR-REGISTRATION/DELETION STORAGE PART WITH PERFORMING REGISTRATION/DELETION PROCESSING BY USING OTHER FULL-TEXT INDEX-FOR-REGISTRATION/DELETION STORAGE PART

BACKGROUND OF THE INVENTION

1. Field of the Invention

The present invention generally relates to a database management system, a full-text search device, and a full-text search method, and more particularly, to a database management system for performing a merge processing by a delayed update, and a full-text search device and method for searching for a document containing a specified character string from a plurality of document data.

This invention is applicable to a system managing a large quantity of document data, such as a document management system, an electronic library system, and a patent publication search system.

2. Description of the Related Art

In a relational database, data is represented and managed as a table. This table is composed of sets of tuples each of which is a list of attribute values. Besides, a substance of the table is stored in a file.

Operations to a database are classified into the following four operations.

(1) Search (Retrieval) Operation

This is an operation of providing conditions concerning attribute values as search conditions so as to retrieve a set of tuples that match the conditions.

(2) Insertion Operation

This is an operation of inserting a new tuple having given attribute values into a table.

(3) Updating Operation

This is an operation of changing attribute values of a tuple selected from a table into new values.

(4) Deletion Operation

This is an operation of deleting a tuple selected from a table.

Hereinafter, the above-mentioned insertion operation, the updating operation, and the deletion operation are collectively referred to as a changing operation.

In a system using the relational database, a response time upon performing the search operation is an important performance indicator.

Therefore, in order to shorten the search response time, there is a method of building a relational database by using an index file.

This index file includes particular structures converted from one or more attribute values so as to evaluate conditions concerning the attribute values at high speed.

On the other hand, in the changing operation, a time required for updating the index file makes a cause of aggravating a performance.

In a common form of using the index file, only the search operation is performed since the changing operation is less frequently requested compared with the search operation; and a mass of the changing operations are performed at night when the system is stopped. Therefore, the performance measured by the response time to the changing operation.

However, when a real-time property is required as in an on-line system, the response time to the changing operation is regarded as being important.

To solve these problems, in a "database management system" disclosed in Japanese Laid-Open Patent Application No. 10-143412, a writing to a database is temporarily retained in a nonvolatile memory before being reflected to a magnetic disk, and corresponding data is referred to by using the nonvolatile memory as a disk cache, in place of the magnetic disk.

However, since only data having a simple structure can be retained in the disk cache, there is a problem that a highly functional index file cannot be used.

Besides, in a "database management method and device, and a machine-readable recording medium recording a program thereof" disclosed in Japanese Laid-Open Patent Application No. 2000-163294, a reference and an updating to a database on a secondary storage are performed on data buffers provided on a primary storage, and an updated page is reflected to the database asynchronously with a processing by an application program, thereby performing a delayed updating process using only one set of data buffers; this reduces a required capacity of the main memory.

However, since only data having a simple structure can be retained in this data buffer, there is a problem that a highly functional index file cannot be used, as in Japanese Laid-Open Patent Application No. 10-143412.

When a plurality of users simultaneously use a database system, the search operation and the changing operation are asynchronously requested. In this course, a transaction processing is used so as to maintain a consistency of data. The transaction processing is explained in detail in (1) "'Principles of Transaction Processing' Philip A Bernstein, Eric Newmarker; Nikkei Business Publications, Inc.".

Completely isolating transactions guarantees the consistency of data at any point of time. However, a reduction in a concurrent execution property may result in a reduction in a throughput as a whole considerably. In order to solve this problem, a concept of an isolation level is used. The isolation level is explained in detail in (2) "'A Critique of ANSI SQL Isolation Levels' Hal Bereson, Philip A Bernstein, Jim Gray, Jim Melton, Elizabeth J. O'Neil, Patrick E. O'Neil Proc. ACM SIGMOD Conf. (June 1995) p.1-10".

In order to explain the above-described problems of the conventional technology, a consideration is given of a merging operation of arranging together data retaining parts (inverted files) used for full-text search which are divided in plurality.

A merging operation is started when an amount of data in an inverted file to be merged reaches a threshold value. There are two types of such merging operation: one is a synchronous merge that performs a merging as an operation (a foreground operation) in a same series as an insertion operation to the inverted file; the other is an asynchronous merge that performs a merging as an operation (a background operation) different from the insertion operation.

In the asynchronous merge, in order to perform an insertion during merging correctly, an inverted file to be merged has to be processed exclusively. Therefore, during a period of the exclusive processing, the merging operation and the insertion operation each undergo delayed processing, as a result of which a response of the insertion operation is aggravated.

Besides, in recent years, as information communication technology has developed, electronic documents and information about the documents are distributed in large quantities via the Internet etc. Thereupon, there is proposed a document search device for searching a desired document with accuracy and at high speed.

In such document search device, a keyword search method and a full-text search method are used. A full-text search device using the full-text search method compares any given search character string with all documents to be searched so as to extract all documents containing the search character string. Thus, unlike the keyword search method, the full-text search device using the full-text search method involves no need for a large amount of manpower for providing keywords beforehand to all the documents to be searched. Various types of full-text search device are proposed, one type of which is a device adopting an inverted (index) file method. In the inverted-file method, an inverted file that records documents containing a character/word/n-gram (n character juncture), or records appearance positions thereof in the documents, is built beforehand as an auxiliary file for searching; and upon a full-text search, the search is performed by using only the inverted file. Thus, the inverted-file method enables a considerably high-speed search, and is effective for a system necessitating a high-speed search of a large quantity of documents.

Besides, a full-text search method in general and an inverted-file method in detail are described in "Information Retrieval Algorithm" (Kenji Kitasato, Kazuhiko Tsuda, Masami Shishibori; Kyoritsu Shuppan Co., Ltd.; pp.160-179), "Description of the Related Art" of Japanese Laid-Open Patent Application No. 11-073429, and 1998 Activity Report of Full-Text Search System Conference etc., and are well-known; therefore, an explanation thereof is omitted.

As a conventional technology adopting the inverted-file method, Japanese Patent No. 3024544 (Japanese Laid-Open Patent Application No. 9-265420) describes an information search device that stores real-time processing data apart from a search index file so as to perform a search processing even when the search index file is being updated. Besides, Japanese Laid-Open Patent Application No. 7-146880 describes a document search device and method registering a new document in a subindex smaller than a main index, thereby shortening a registration time.

However, in the inverted-file method including those described in the above-described Laid-Open Patent Applications, it is commonly necessary to build an inverted file several times as large as original data. Accordingly, as an amount of registered document data increases, a full-text index of the inverted-file method requires a longer time for a registration/deletion processing. Thus, as a full-text search device, a response time of the registration/deletion processing becomes long from a user's point of view.

SUMMARY OF THE INVENTION

It is a general object of the present invention to provide an improved and useful database management system, a full-text search device, and a full-text search method, in which the above-mentioned problems are eliminated.

A more specific object of the present invention is to provide a database management system which can avoid an aggravation of a response of an insertion operation upon performing an asynchronous merge, and enhance a total response to a mass of search requests, and to provide a full-text search device and a full-text search method which can shorten a response time of registration and deletion processing from a user's point of view, and further can eliminate a period during which a processing is impossible.

In order to achieve the above-mentioned objects, there is provided according to one aspect of the present invention a database management system managing a database, the system including a first data retaining part for search performing a search operation of data at a high speed, and performing a changing operation of data at a low speed, second data retaining parts for insertion and for deletion each performing a search operation of data at a low speed, and performing a changing operation of data at a high speed, a data transfer part transferring data from each of the second data retaining parts to the first data retaining part so as to reflect a result of an insertion operation or a deletion operation, a database operation request processing part executing a operation request with respect to the database, a transaction processing part guaranteeing a consistency of data between the data transfer part and the database operation request processing part, and a file switching part switching the second data retaining parts between the operation request with respect to the database and an asynchronous merge processing to the first data retaining part so that when one of the second data retaining parts is used for the asynchronous merge processing, the other second data retaining part is used for the operation request with respect to the database.

According to the present invention, an exclusive control becomes unnecessary between the merge processing and the insertion operation, thereby avoiding an aggravation of a response of the insertion operation, and enhancing a total response to search requests as a whole.

Other objects, features and advantages of the present invention will become more apparent from the following detailed description when read in conjunction with the accompanying drawings.

DETAILED DESCRIPTION OF THE PREFERRED EMBODIMENTS

A description will now be provided, with reference to the drawings, of embodiments according to the present invention.

<System Configuration>

Figure 1:
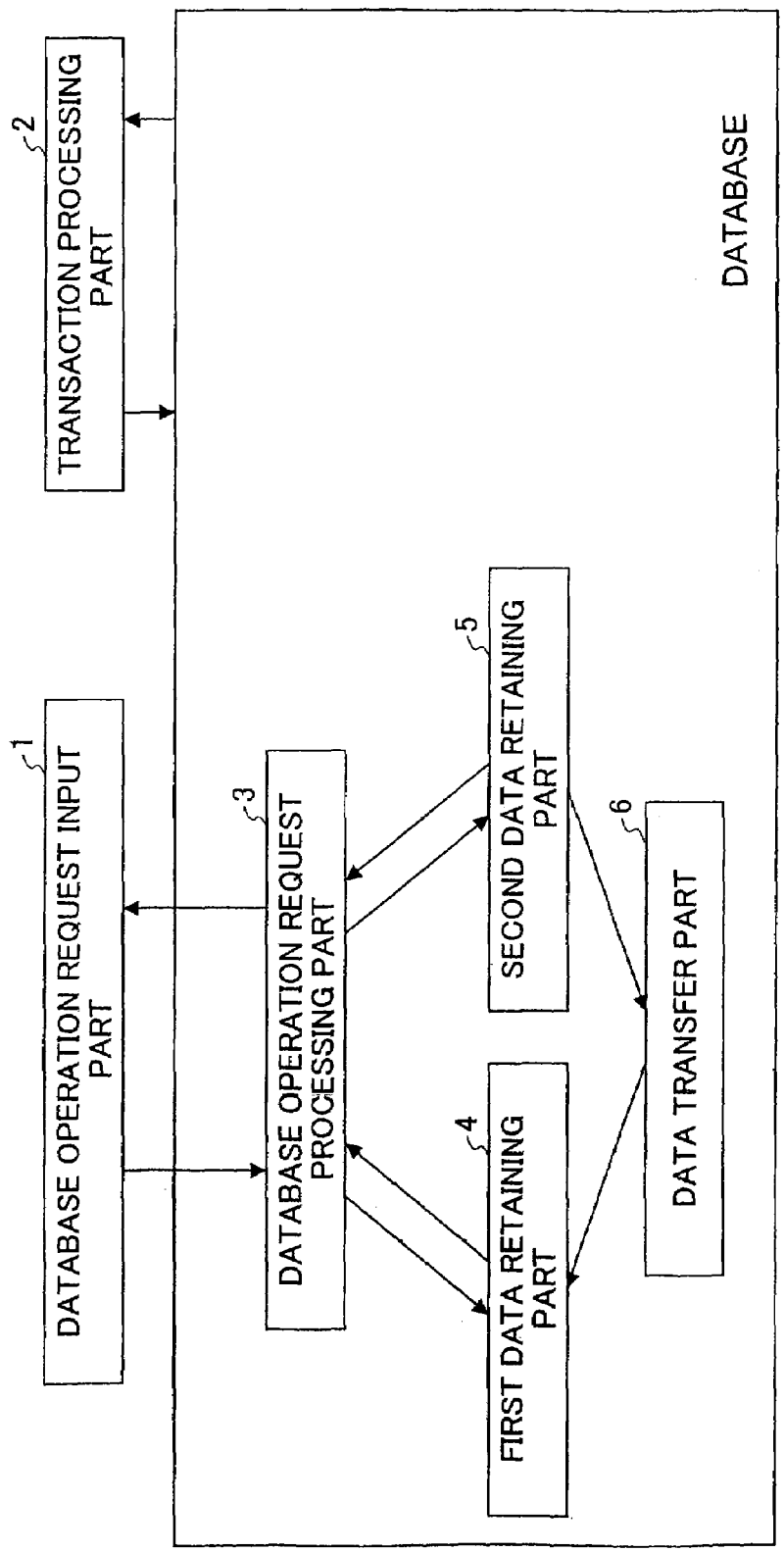
FIG. 1 is a block diagram for explaining a configuration of a database management system.

FIG. 1 is a block diagram for explaining a configuration of a database management system. The following description will be given, using a relational database as a database; however, the present invention is also applicable to other databases.

A database management system shown in FIG. 1 comprises a database operation request input part 1, a transaction processing part 2, a database operation request processing part 3, a first data retaining part 4, a second data retaining part 5, and a data transfer part 6.

An operation request to a database is input from the database operation request input part 1, and the operation request is processed by the database operation request processing part 3.

The first data retaining part 4 is used in a search (retrieval) operation of the database, and in a changing operation upon data transfer.

The second data retaining part 5 is used in an insertion operation, a deletion operation and an updating operation of the database, and in a deletion operation upon data transfer.

Objects to be processed in the first data retaining part 4 and the second data retaining part 5 are index files, for example with the relational database, which are retained in association with one another for such a purpose, as referring to data.

The data transfer part 6 reads a tuple from the second data retaining part 5, and performs operations of inserting the tuple into the first data retaining part 4, updating the tuple in the first data retaining part 4, and deleting the tuple from the first data retaining part 4.

The transaction processing part 2 performs a exclusive control for controlling an order of executing a search operation and a changing operation requested asynchronously so as to maintain a consistency of data, and performs a logging for recording information used for restoring a state before starting a transaction in a case where a changing operation is cancelled.

Hereinafter, the above-described parts are explained further in detail.

<<Database Operation Request Input Part 1>>

Figure 2:
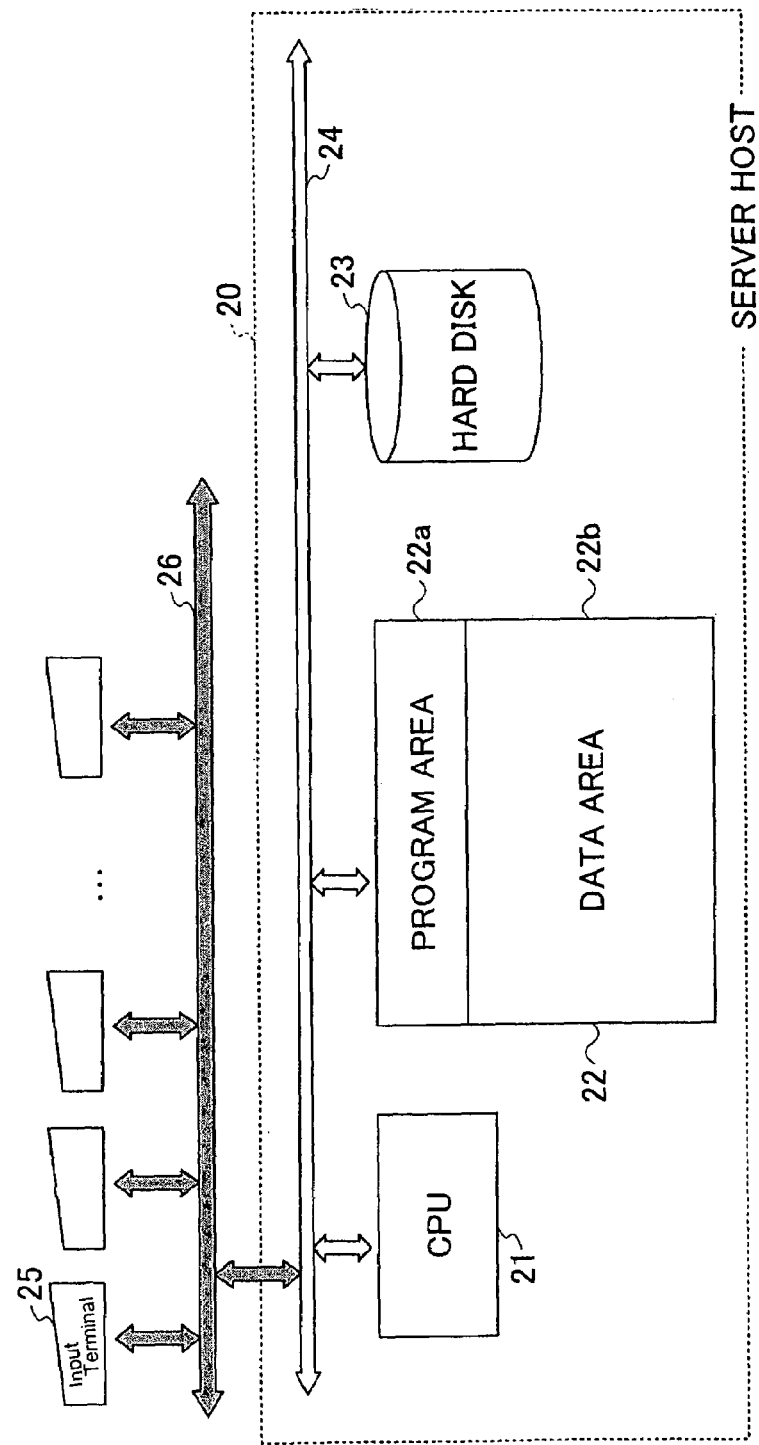
FIG. 2 is a diagram showing an example of a configuration embodying the database management system.

FIG. 2 is a diagram showing an example of a configuration embodying the database management system. The database operation request input part 1 is realized as an input terminal 25. In a server host 20 retaining a database, a CPU 21, a memory 22 including a program area 22a and a data area 22b, and a hard disk 23 are connected to one another by a data bus 24. A plurality of the input terminals 25 are connectable to this server host 20 via a LAN 26. The database operation request input part 1 in this example enables a plurality of users to input database operation requests.

A user inputs a database operation request represented by a character string in a form of a SQL statement, for example, from the input terminal 25. The database operation request is transmitted to the server host 20 via the LAN 26, and is processed in the server host 20. A result of the processing is transmitted to the input terminal 25 again via the LAN 26, and is communicated to the user by such a manner as being displayed on a display of the input terminal 25.

<<Database Operation Request Processing Part 3>>

Figure 3:
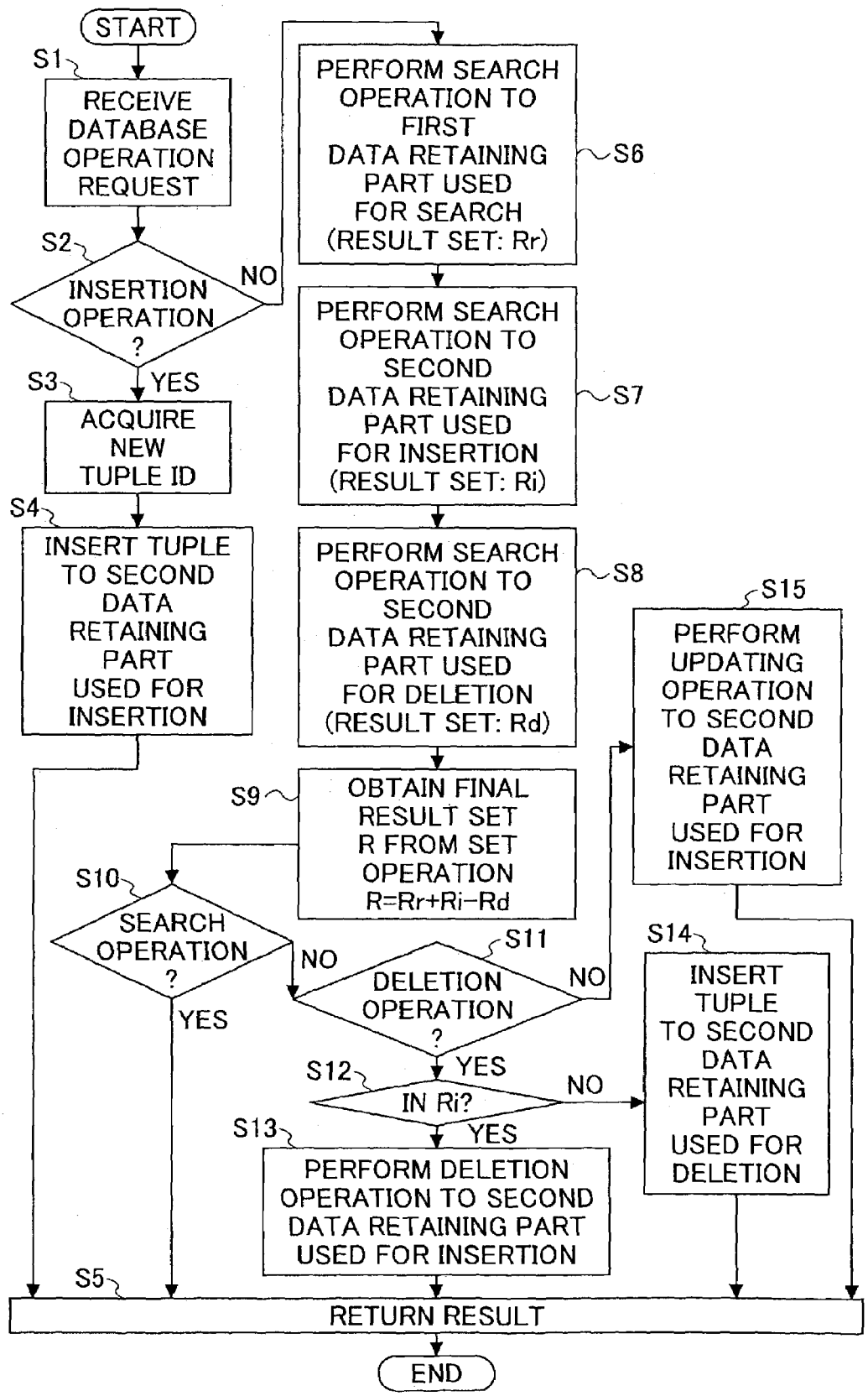
FIG. 3 is a flowchart showing an example of a processing procedure of a database operation request processing part.

FIG. 3 is a flowchart showing an example of a processing procedure of the database operation request processing part 3.

Contents of the processing are divided according to types of the database operation request. In this example, each of tuples in a table is provided with a unique ID (a tuple ID) so that each of the tuples is identified by the tuple ID.

When the database operation request processing part 3 receives the database operation request (step S1), the database operation request processing part 3 judges whether or not the database operation request indicates an insertion operation (step S2). When the database operation request indicates the insertion operation, the database operation request processing part 3 acquires a tuple ID for a new tuple (step S3), and thereafter, performs the insertion operation of the tuple to the second data retaining part 5 used for insertion (step S4), and returns a result thereof (step S5).

When the database operation request does not indicate the insertion operation in step S2, the database operation request processing part 3 performs a search operation to each of the first data retaining part 4 used for search (retrieval), the second data retaining part 5 used for insertion and the second data retaining part 5 used for deletion (steps S6-S8), and then forms a final search result set R from respective search result sets Rr, Ri and Rd (R=Rr+Ri−Rd; where + represents a logical OR, and − represents a logical NOT) as a result (step S9).

Subsequently, when the database operation request indicates the search operation in step S10, the database operation request processing part 3 returns the result thereof (step S5). When the database operation request does not indicate the search operation in step S10, the database operation request processing part 3 judges whether or not the database operation request indicates a deletion operation (step S11). When the database operation request does not indicate the deletion operation, the database operation request processing part 3 performs an updating operation of a tuple to the second data retaining part 5 used for insertion by using the tuple provided with a new value changed from a tuple selected in a similar procedure as in the search operation (step S15), and returns a result thereof (step S5).

When the database operation request indicates the deletion operation in step S11, and when the tuple selected in the similar procedure as in the search operation exists in Ri (YES in step S12), the database operation request processing part 3 performs a deletion processing to the second data retaining part 5 used for insertion (step S13), and returns a result thereof (step S5). When the tuple does not exist in Ri, i.e., the tuple exists in Rr, (NO in step S12), the database operation request processing part 3 performs an insertion processing of the tuple to the second data retaining part 5 used for deletion (step S14), returns a result thereof (step S5), and ends the processing procedure.

<<First Data Retaining Part 4>>

The first data retaining part 4 is a data retaining part used for search, and is used in the search operation performed by the database operation request processing part 3, and in a changing operation performed by the data transfer part 6.

The first data retaining part 4 is capable of performing a search operation at a high speed, but performs a changing operation at a relatively low speed. For example, a full-text search server capable of performing a full-text search can be used as the first data retaining part 4.

<<Second Data Retaining Part 5>>

There are two types of the second data retaining part 5 which are used for insertion and used for deletion, respectively.

The second data retaining part 5 used for insertion is used in the insertion operation, the deletion operation, and the updating operation performed by the database operation request processing part 3, and is also used in a deletion operation performed by the data transfer part 6.

The second data retaining part 5 used for deletion is used in the deletion operation performed by the database operation request processing part 3, and is also used in the deletion operation performed by the data transfer part 6.

The second data retaining part 5 is capable of performing an insertion operation and a changing operation at a high speed. For example, a common file managed by an OS can be used as the second data retaining part 5.

When the second data retaining part 5 cannot perform a search operation like a common file, the second data retaining part 5 returns retained tuples successively, and the database operation request processing part 3 evaluates search conditions (which is referred to as total search).

Since the second data retaining part 5 retains a very small number of tuples in comparison with a number of tuples retained by the first data retaining part 4, performing the total search does not influence a response time.

<<Data Transfer Part 6>>

Figure 4:
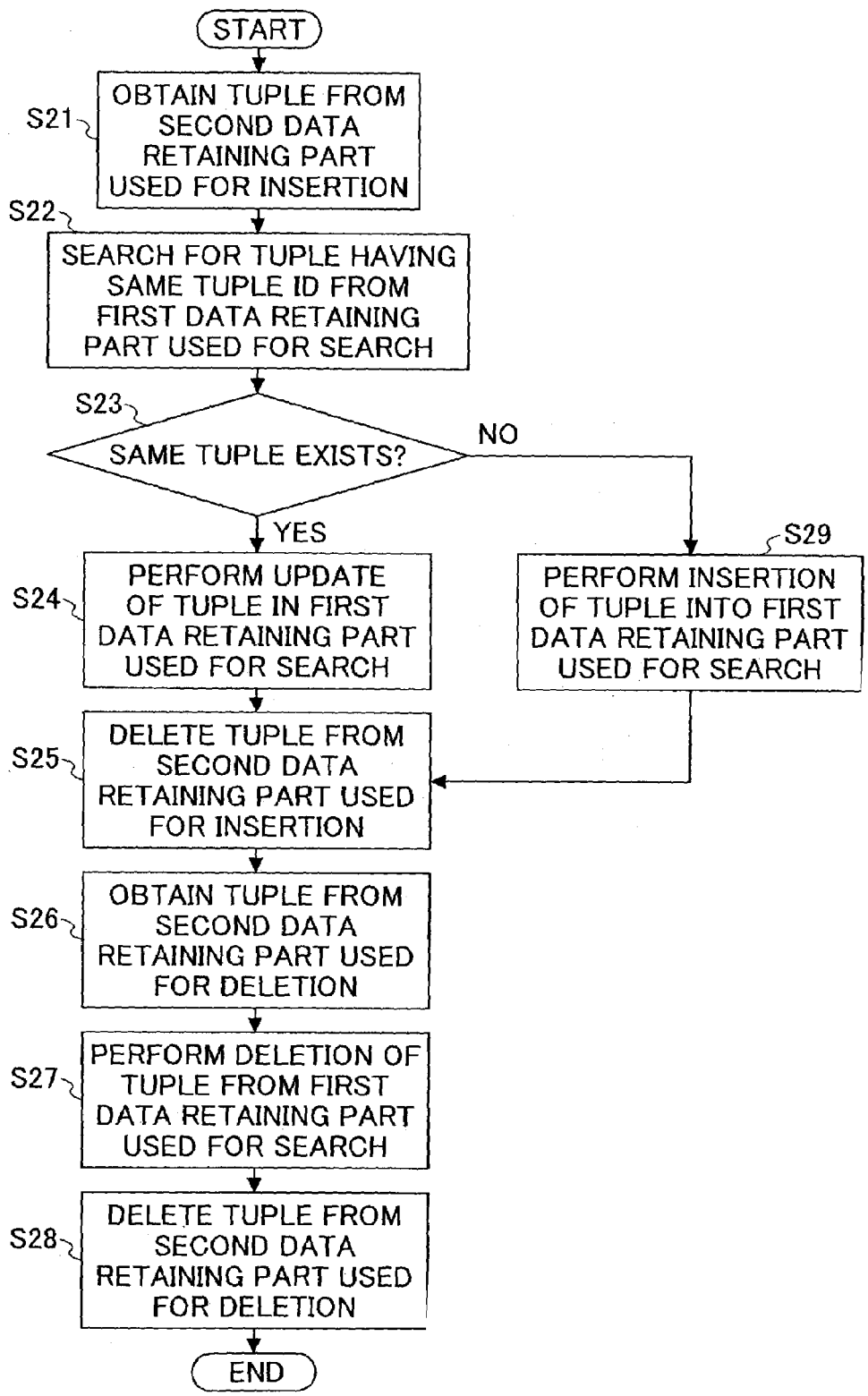
FIG. 4 is a flowchart showing an example of a processing procedure of a data transfer part.

FIG. 4 is a flowchart showing an example of a processing procedure of the data transfer part 6.

In the data transfer performed by the data transfer part 6, tuples are read one by one from the second data retaining part 5 used for insertion, and an insertion or updating operation of the tuples is performed to the first data retaining part 4 according to values of the tuples; then, reflected tuples are deleted from the second data retaining part 5 used for insertion.

Next, tuples are read one by one from the second data retaining part 5 used for deletion, and the tuples are deleted from the first data retaining part 4; then, reflected tuples are deleted from the second data retaining part 5 used for deletion.

In FIG. 4 when the data transfer part 6 obtains each of the tuples from the second data retaining part 5 used for insertion (step S21), the data transfer part 6 searches for a tuple having a same tuple ID from the first data retaining part 4 (step S22). When the same tuple exists (YES in step S23), the data transfer part 6 performs an update of the tuple in the first data retaining part 4 (step S24), and deletes the tuple from the second data retaining part 5 used for insertion (step S25).

When the same tuple does not exist (NO in step S23), the data transfer part 6 performs an insertion of the tuple into the first data retaining part 4 (step S29), and deletes the tuple from the second data retaining part 5 used for insertion (step S25).

After completion of step S25, the data transfer part 6 obtains each of the tuples from the second data retaining part 5 used for deletion (step S26), performs a deletion of the tuple from the first data retaining part 4 (step S27), deletes the tuple from the second data retaining part 5 used for deletion (step S28), and ends the processing procedure.

<<Transaction Processing Part 2>>

The transaction processing part 2 performs a exclusive control for controlling an order of executing a search operation and a changing operation requested asynchronously so as to maintain a consistency of data, and performs a logging for recording information used for restoring a state before starting a transaction in a case where a changing operation is cancelled.

The exclusive control is not only used as an exclusive control among database operations requested by a plurality of users, but also is used as an exclusive control between the database operation request processing part 3 and the data transfer part 6.

Various isolation levels are realized by using a multiple-granularity lock explained in the above-mentioned document (1). Objects to be locked are tables, tuples, and files; and the files are composed of the first data retaining part 4 and the second data retaining part 5 which are used for insertion and used for deletion.

In the exclusive control and the logging, the first data retaining part 4 and the second data retaining part 5 composing the files can be handled collectively as one object, regardless of structures thereof.

Hereinafter, a description will be given of a method for realizing an isolation level of READ COMMITTED. First, there are the following preconditions regarding locks.

A lock on a table has either of the following modes.

TABLE 1

| Lock mode | Description |
|---|---|
| S (Sharing) | Used in read-only processing, such as SELECT |
| X (Exclusion) | Used in data-changing processing, such as UPDATE, INSERT or DELETE, to avoid simultaneously updating one resource |
| IS (Intent Sharing) | Indicating presence of transaction for reading an S-locked resource in a lower tier |
| IX (Intent Exclusion) | Indicating presence of transaction for changing an X-locked resource in a lower tier |
| SIX (Sharing with Intent Exclusion) | Allowing simultaneous reading of a resource with indicating presence of transaction to change an IX-locked resource in a lower tier |

A lock on a tuple has either the mode S or X.

An S-lock on a tuple can be canceled at any time after reference.

An X-lock on a tuple cannot be canceled until an end of transaction.

Before and after accessing a file, an exclusive latch is applied to the file.

Next, a description will be given of procedures realized according to types of database operation.

(1) Search Operation

0. Apply an IS-lock-on a targeted table before a start of an operation.
1. Apply a latch to a file.
2. Search for a tuple matching a search condition.
3. Apply an S-lock on the obtained tuple.
4. When the S-Lock cannot be applied, cancel the latch to the file, and return to 1.
5. When the S-lock can be applied, add the tuple to a search result.
6. Cancel the lock to the tuple.
7. Cancel the latch to the file.

(2) Insertion Operation

0. Apply an IX-lock on a targeted table before a start of an operation.
1. Apply a latch to a file.
2. Acquire a new tuple ID.
3. Apply an X-lock on the tuple.
4. Record a tuple insertion on a log.
5. Insert the tuple into the file.
6. Cancel the latch to the file.

(3) Updating Operation

0. Apply an IX-lock on a targeted table before a start of an operation.
1. Apply a latch to a file.
2. Search for a tuple matching a condition of a tuple to be updated.
3. Apply an X-lock on the obtained tuple.
4. When the X-Lock cannot be applied, cancel the latch to the file, and return to 1.
5. When the X-lock can be applied, record a tuple update on a log.
6. Perform the update of the tuple.
7. Cancel the latch to the file.

(4) Deletion Operation

0. Apply an IX-lock on a targeted table before a start of an operation.
1. Apply a latch to a file.
2. Search for a tuple matching a condition of a tuple to be deleted.
3. Apply an X-lock on the obtained tuple.
4. When the X-Lock cannot be applied, cancel the latch to the file, and return to 1.
5. When the X-lock can be applied, record a tuple deletion on a log.
6. Perform the deletion of the tuple.
7. Cancel the latch to the file.

The following processes are performed upon an end of a transaction.

(1) Commitment

When a commitment is performed when an IX-lock is applied on a targeted table before a start of a changing operation:

1. Record the commitment on a log.
2. Cancel all of locks requested by the committed transaction.

(2) Rollback (Abort)

When a rollback is performed when an IX-lock is applied on a targeted table before a start of a changing operation:

1. Record the rollback on a log.
2. UNDO a data operation with referring to the log. In this course, apply a latch to a necessary file.
3. Cancel all of locks requested by the rolled-back transaction.

Next, a description will be given of a basic operation of merging. In this merging, a small inverted file is merged to a large inverted file in a background by a demon using the following three files.

Large inverted file: a destination file of merging

Small inverted file for insertion: a file for insertion to be merged

Small inverted file for deletion: a file for deletion to be merged

Hereinafter, a description will be given of an outline of an operation of the daemon.

This daemon has three threads: a main thread that operates with a same thread as an executor; a daemon thread that performs a merging; a timer thread that continuously manages the merging.

In a basic operation of the main thread, the main thread judges whether a file size of the small inverted files exceeds a predetermined value upon insertion to the small inverted files. When the file size exceeds the predetermined value, the main thread passes file IDs of the targeted large inverted file and the two small inverted files to the daemon thread, and directs an execution of merging, thereby performing the merging due to the size.

In a basic operation of the timer thread, the timer thread checks time at constant time intervals, and judges whether a specified time has passed. When the specified time has passed, the timer thread passes file IDs of the targeted large inverted file and the two small inverted files to the daemon thread with respect to all large inverted files, and directs an execution of merging, thereby performing the merging due to the constant time.

Upon receiving the direction for the execution of merging, the daemon thread executes the merging of the inverted files by performing a series of the following operations.

1. Start a tacit transaction.
2. Apply a lock on a meta-database as a whole (target of operation: tuples,; content of operation: reading).
3. Apply a lock on a database table of the meta-database (target of operation: tuples, content of operation: reading).

4. Apply a lock on tuples corresponding to a targeted database in the database table of the meta-database (target of operation: tuples, content of operation: reading).

5. Apply a lock on the database (target of operation: tuples, content of operation: reading and writing).

6. Apply a lock on a table (target of operation: tuples, content of operation: reading and writing).

7. Put inverted files into a state of being merged.

8. Merge a number of inverted lists of small inverted files.

9. Empty the merged small inverted files.

10. Cancel the state of the inverted files being merged.

11. End the transaction.

Hereinafter, based on the above-described database management system, a description will be given of a database management system according to a first embodiment of the present invention.

Embodiment 1

Figure 5:
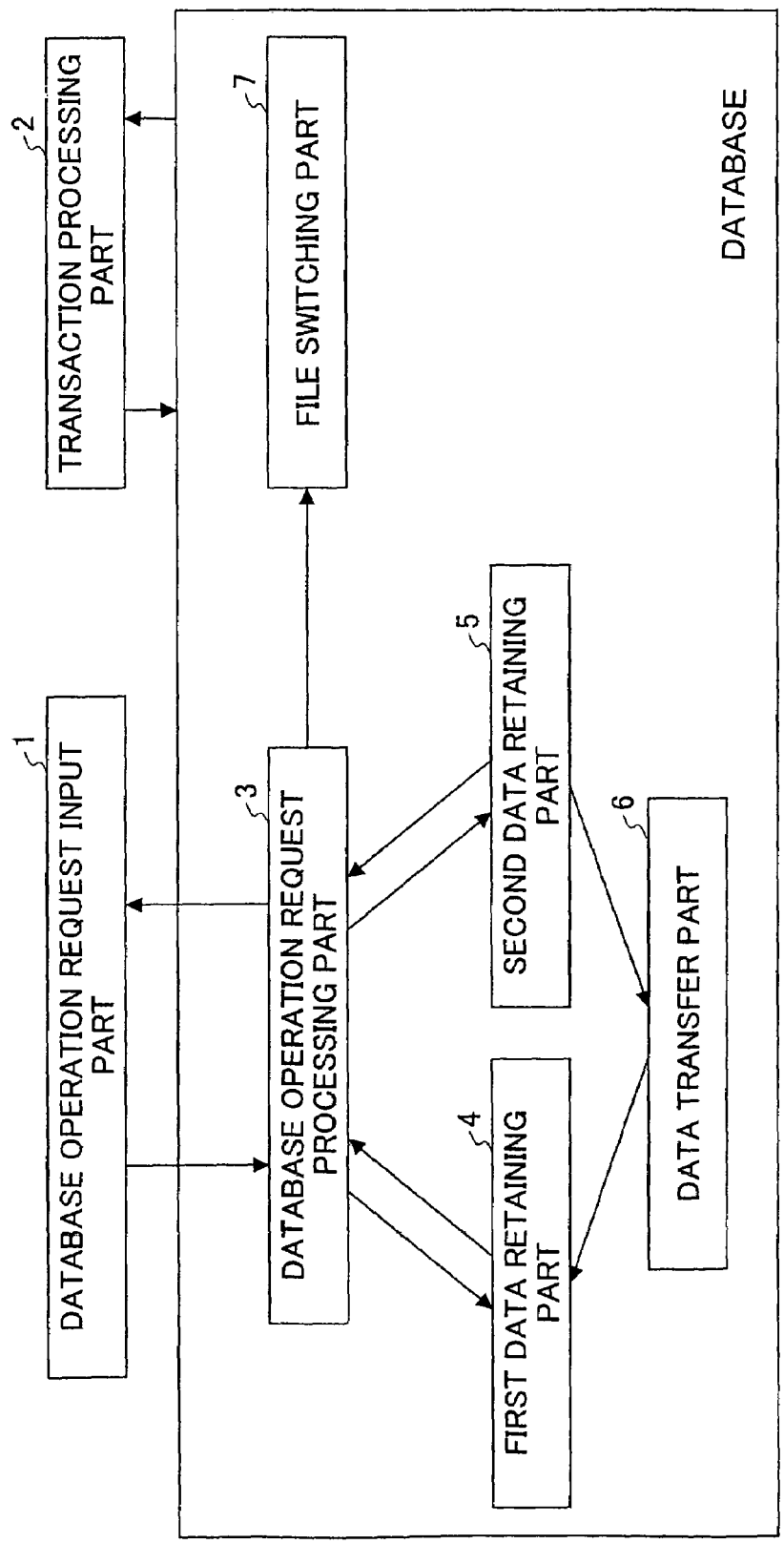
FIG. 5 is a block diagram showing a configuration of a database management system according to a first embodiment of the present invention.

FIG. 5 is a block diagram showing a configuration of the database management system according to the present first embodiment.

Parts in the present first embodiment that are identical or equivalent to the parts shown in FIG. 1 are referenced by the same reference marks, and only differences therebetween will be described in detail.

As shown in FIG. 5, the database management system comprises the database operation request input part 1, the transaction processing part 2, the database operation request processing part 3, the first data retaining part 4, the second data retaining part 5, the data transfer part 6, and a file switching part 7.

First, a plurality of the second data retaining parts 5 (inverted files used for insertion and for deletion) are prepared.

The file switching part 7 judges whether the second data retaining parts 5 are used for either a database operation or a merge processing. When the second data retaining parts 5 are used for the database operation, the file switching part 7 transfers a database operation request to the second data retaining parts 5 used for the database operation. When the second data retaining parts 5 are used for the merge processing, the file switching part 7 transfers a merge processing request to the first data retaining part 4 upon the merge processing.

In FIG. 5, the first data retaining part 4 corresponds to a data retaining part used for search, and the second data retaining part 5 corresponds to data retaining parts used for insertion and used for deletion.

Figure 6:
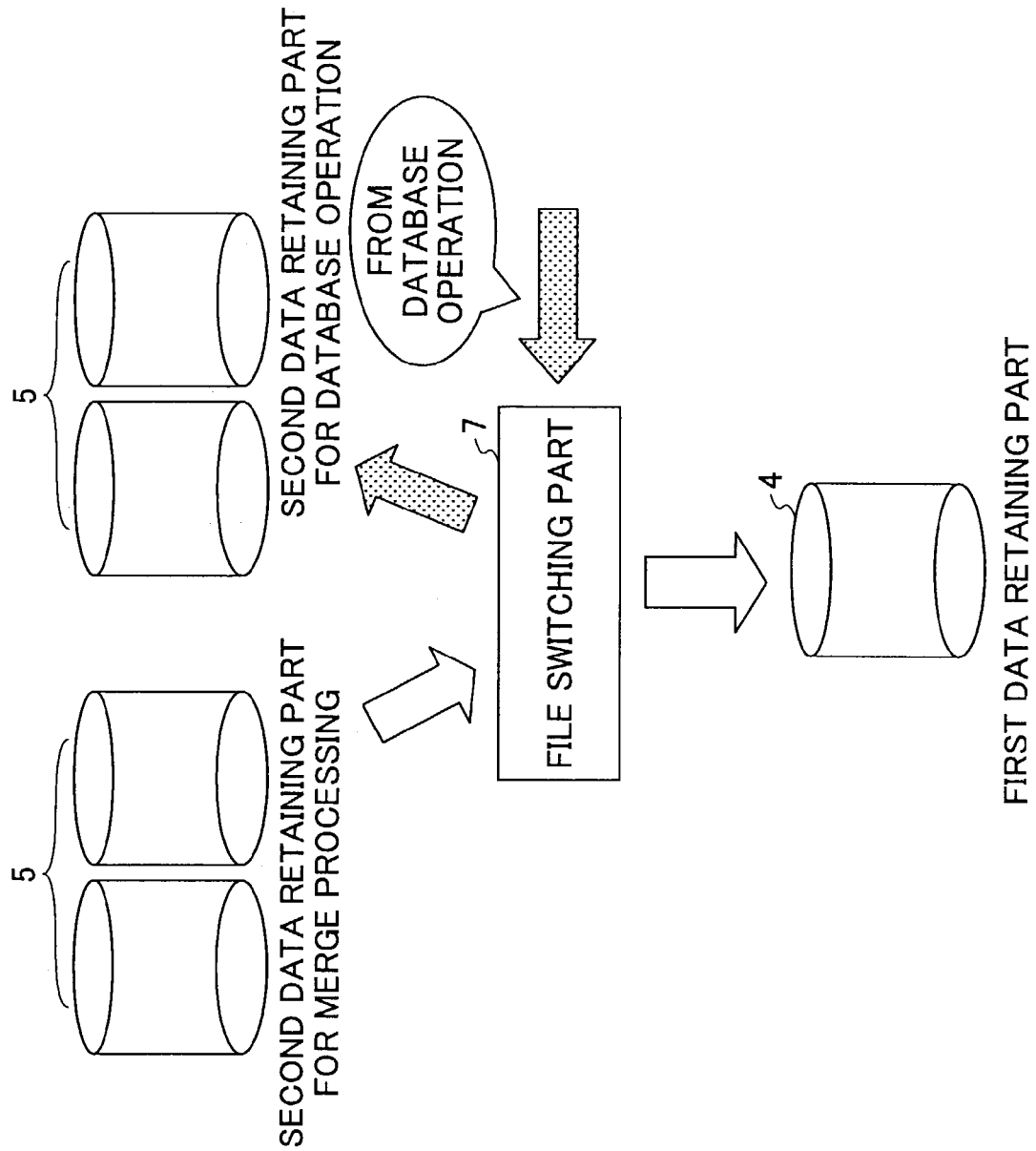
FIG. 6 is a diagram for explaining an operation of a file switching part according to the first embodiment of the present invention.

FIG. 6 is a diagram for explaining an operation of the file switching part 7.

First, two sets of the second data retaining parts (used for insertion and for deletion) 5 are prepared.

The file switching part 7 switches the two sets of the second data retaining parts 5 so that when one set of the second data retaining parts 5 is used for the database operation, the other set of the second data retaining part 5 is used for the merge processing.

The file switching part 7 switches the usages of the two sets of the second data retaining parts 5 in the above-mentioned operation of "7. Put inverted files into a state of being merged" among the operations of the daemon thread in the merging process. Specifically, the file switching part 7 puts the first data retaining part (large inverted file) 4 into a state of being merged, and switches the second data retaining parts 5 used for the database operation to second data retaining parts used for the merge processing, and switches the second data retaining parts 5 used for the merge processing to second data retaining parts used for the database operation, and thereafter puts only the second data retaining parts (small inverted files) 5 used for the merge processing into a state of being merged.

The above-mentioned operations of "8. Merge a number of inverted lists of small inverted files" and "9. Empty the merged small inverted files" are performed with respect to the second data retaining parts 5 used for the merge processing.

Embodiment 2

In the foregoing first embodiment, when a large quantity of insertion operations occur at a time according to a database operation request, insertions may continue after an amount of data exceeds a capacity of the second data retaining part 5 used for the database operation, causing a risk of a performance decline.

In a second embodiment according to the present invention, three or more second data retaining parts 5 are provided so that when the amount of data in the second data retaining part 5 used for the database operation exceeds a given threshold value, another unused second data retaining part 5 is switched for the second data retaining part 5 used for the database operation.

Figure 7:
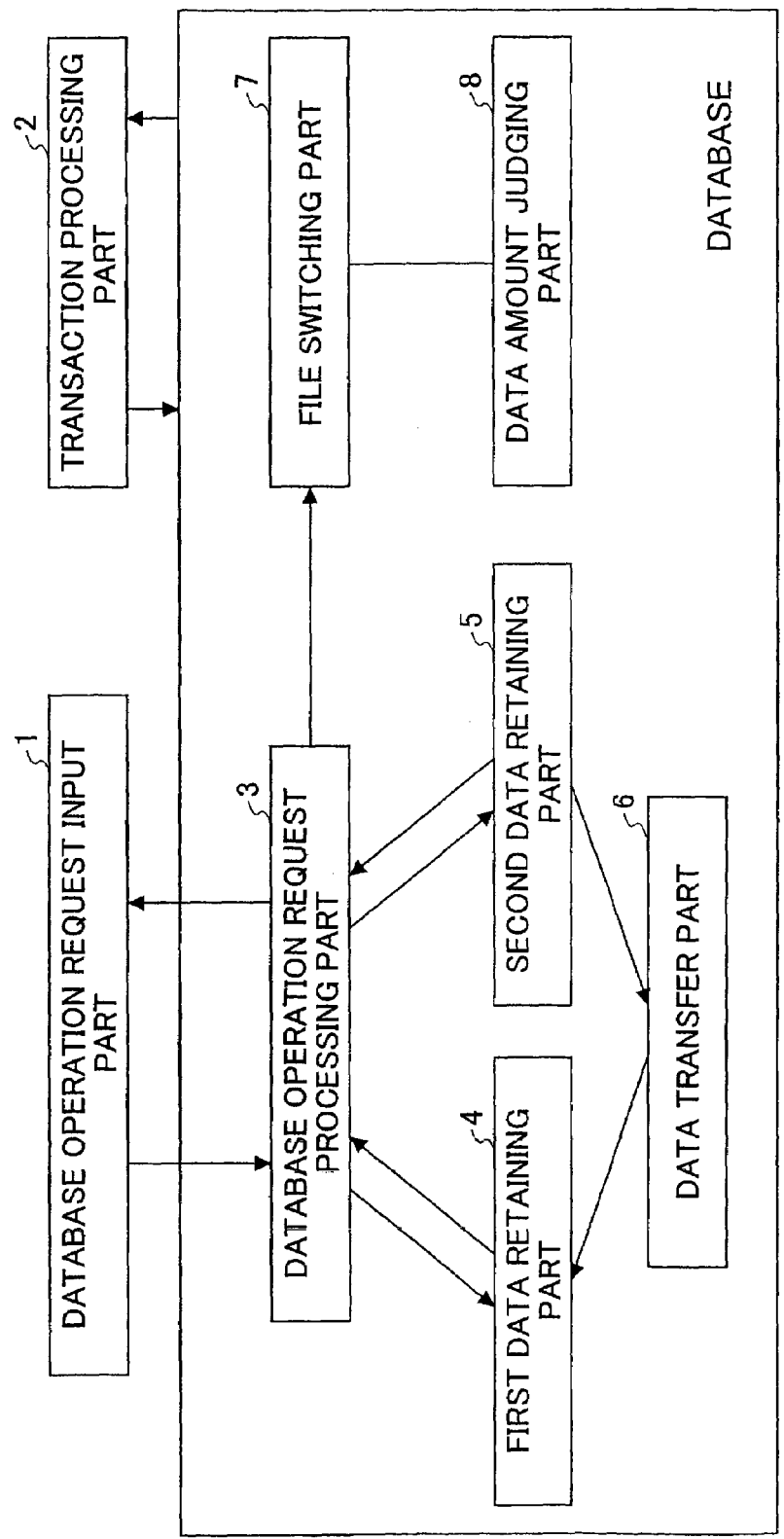
FIG. 7 is a block diagram showing a configuration of a database management system according to a second embodiment of the present invention.

FIG. 7 is a block diagram showing a configuration of a database management system according to the present second embodiment.

Parts in the present second embodiment that are identical or equivalent to the parts shown in FIG. 1 and the foregoing first embodiment are referenced by the same reference marks, and only differences therebetween will be described in detail.

As shown in FIG. 7, the database management system comprises the database operation request input part 1, the transaction processing part 2, the database operation request processing part 3, the first data retaining part 4, the second data retaining part 5 (used for insertion and for deletion), the data transfer part 6, the file switching part 7, and a data amount judging part 8.

Figure 8:
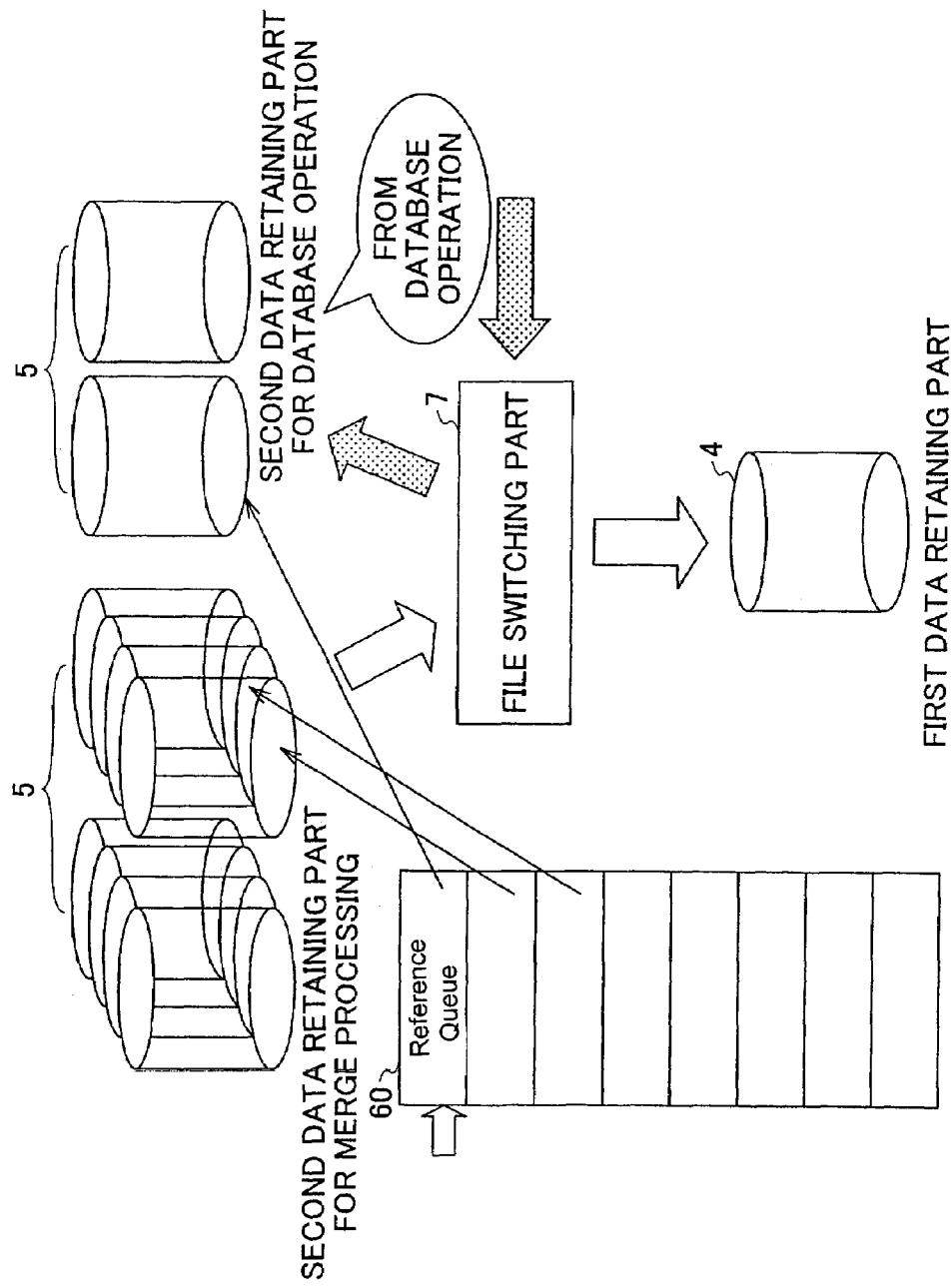
FIG. 8 is a diagram for explaining an operation of the file switching part according to the second embodiment of the present invention.

FIG. 8 is a diagram for explaining an operation of the file switching part 7 according to the present second embodiment.

First, the three or more second data retaining parts (used for insertion and for deletion) 5 are prepared. Besides, reference queues 60 corresponding to a number of the prepared second data retaining parts 5 are prepared so that the second data retaining parts 5 are referred to from each of the reference queues 60. Besides, the second data retaining part 5 used for the database operation is referred to at a head position of the reference queues 60, and the rest of the second data retaining parts 5 are used as the second data retaining parts 5 used for the merge processing, and as the empty second data retaining parts 5.

The data amount judging part 8 monitors the capacity of the second data retaining part 5 used for database operation. When the capacity becomes equal to or more than a predetermined threshold value, the data amount judging part 8 informs the file switching part 7 that the empty second data retaining part 5 used for the database operation is requested.

When the empty second data retaining part 5 is requested from the data amount judging part 8, the file switching part 7 shifts the empty second data retaining part 5 among the second data retaining parts 5 used for the merge processing to the head position of the reference queues 60, and shifts the second data retaining part 5 used for the database operation previously at the head position to a second position or after in the reference queues 60. Thereby, the second data retaining parts 5 used for the database operation and used for the merge processing can be switched.

The file switching part 7 switches the usages of the second data retaining parts 5 in the above-mentioned operation of "7. Put inverted files into a state of being merged" among the operations of the daemon thread in the merging process. Specifically, when the amount of data in the second data retaining part 5 exceeds the given threshold value, the file switching part 7 reorders the reference queues 60, and switches the second data retaining part 5 used for the database operation to the second data retaining part 5 used for the merge processing, and switches the second data retaining part 5 used for the merge processing to the second data retaining part 5 used for the database operation, and thereafter puts only the second data retaining parts 5 used for the merge processing into a state of being merged.

The above-mentioned operations of "8. Merge a number of inverted lists of small inverted files" and "9. Empty the merged small inverted files" are performed with respect to the second data retaining parts 5 used for the merge processing.

Embodiment 3

In the foregoing second embodiment, a maximum number of the second data retaining parts 5 required are prepared beforehand; therefore, the second data retaining parts 5 partially become useless unless a large quantity of database operation requests occur at a time, causing a waste of resources.

In a third embodiment according to the present invention, the second data retaining parts are provided dynamically according to necessity.

A configuration of a database management system according to the present third embodiment is identical to the configuration of the database management system according to the foregoing second embodiment, only differences therebetween will be described in detail.

Figure 9:
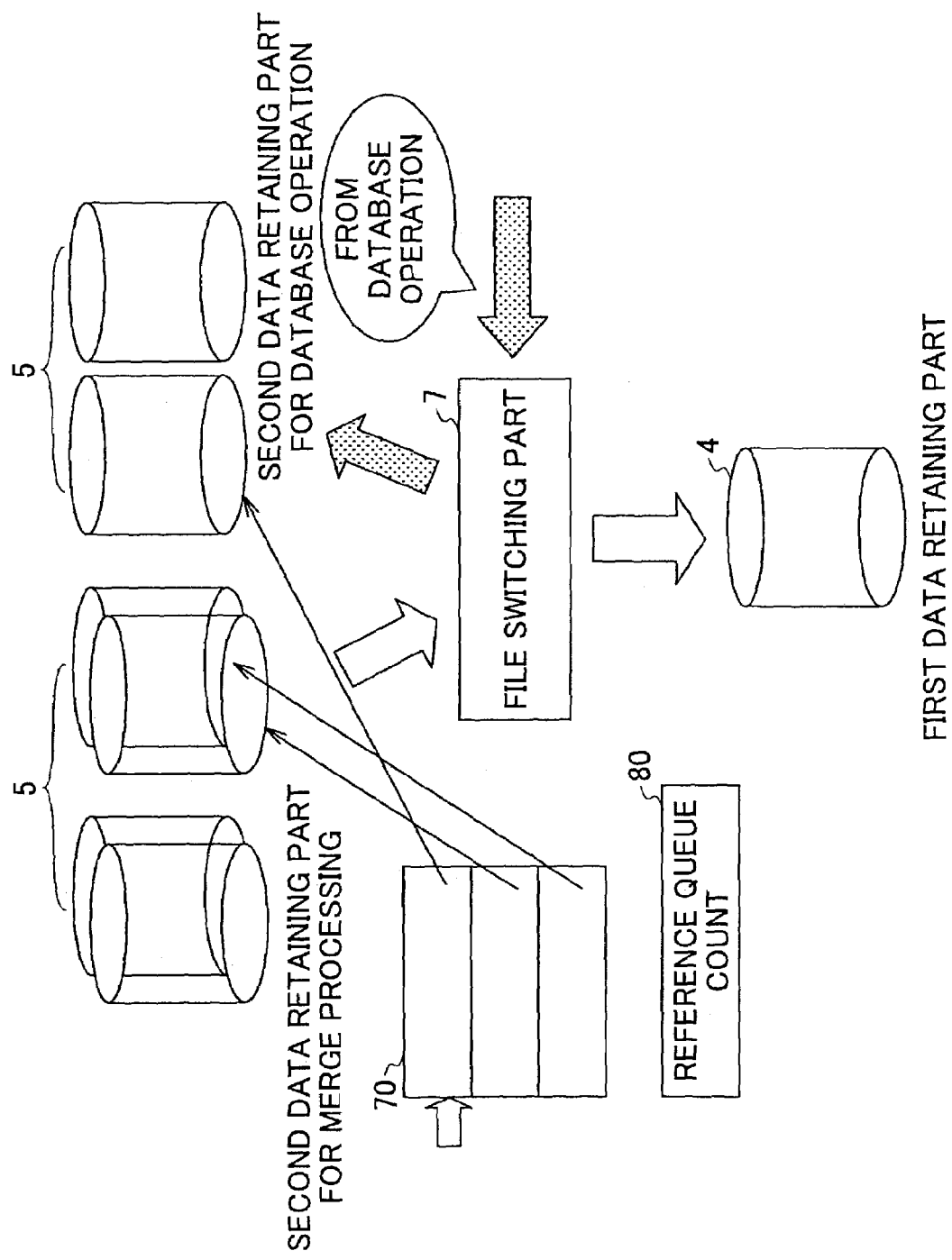
FIG. 9 is a diagram for explaining an operation of the file switching part according to a third embodiment of the present invention.

FIG. 9 is a diagram for explaining an operation of the file switching part 7 according to the present third embodiment.

The database management system according to the present third embodiment comprises reference queues 70 for registering the currently used second data retaining parts 5, and a reference queue count 80 retaining a number of the second data retaining parts 5 registered in the reference queues 70.

The second data retaining part 5 used for the database operation is referred to at a head position of the reference queues 70, and the rest of the second data retaining parts 5 are used as the second data retaining parts 5 used for the merge processing.

When the empty second data retaining part 5 is requested from the data amount judging part 8, the file switching part 7 generates a new second data retaining part 5 dynamically, sets the new second data retaining part 5 to the head position of the reference queues 70, and shifts the second data retaining part 5 used for the database operation previously at the head position to a second position or after in the reference queues 70 so as to expand the reference queues 70, and increase the reference queue count 80 by one. Thus, the second data retaining parts 5 used for the database operation and used for the merge processing are switched.

The file switching part 7 switches the usages of the second data retaining parts 5 according to a same timing as in the foregoing second embodiment. However, in the above-mentioned operation of "9. Empty the merged small inverted files", the second data retaining parts 5 having undergone the merge processing and the reference queues 70 corresponding thereto are deleted, and the reference queue count 80 is decreased by one.

Embodiment 4

In the database management system, the merge processing is performed in units of indexes so that a search can be performed even during merging.

Upon searching, the first data retaining part 4 and all of the second data retaining parts 5 used for the merge processing are used, necessitating exclusive controls before and after the merge processing for one index unit.

Besides, upon processing a search request, a state where data remains in the second data retaining part 5 used for the merge processing is disadvantageous for a performance of the search processing; therefore, a state having undergone the merge processing is preferable for the searching.

However, when a large quantity of search requests are input during the merge processing, the merge processing does not progress because exclusive controls are performed to the searches, continuing the state where the data used for the merge processing remains which is disadvantageous for the performance of the search processing. Therefore, a total search performance is declined.

In a fourth embodiment according to the present invention, an exclusive control between the search processing and the merge processing is performed by using an exclusion mechanism of the transaction processing part 2. Accordingly, even when a large quantity of search requests are input, the merge processing can be finished quickly so as to enhance a total response to the search requests as a whole.

Figure 10:
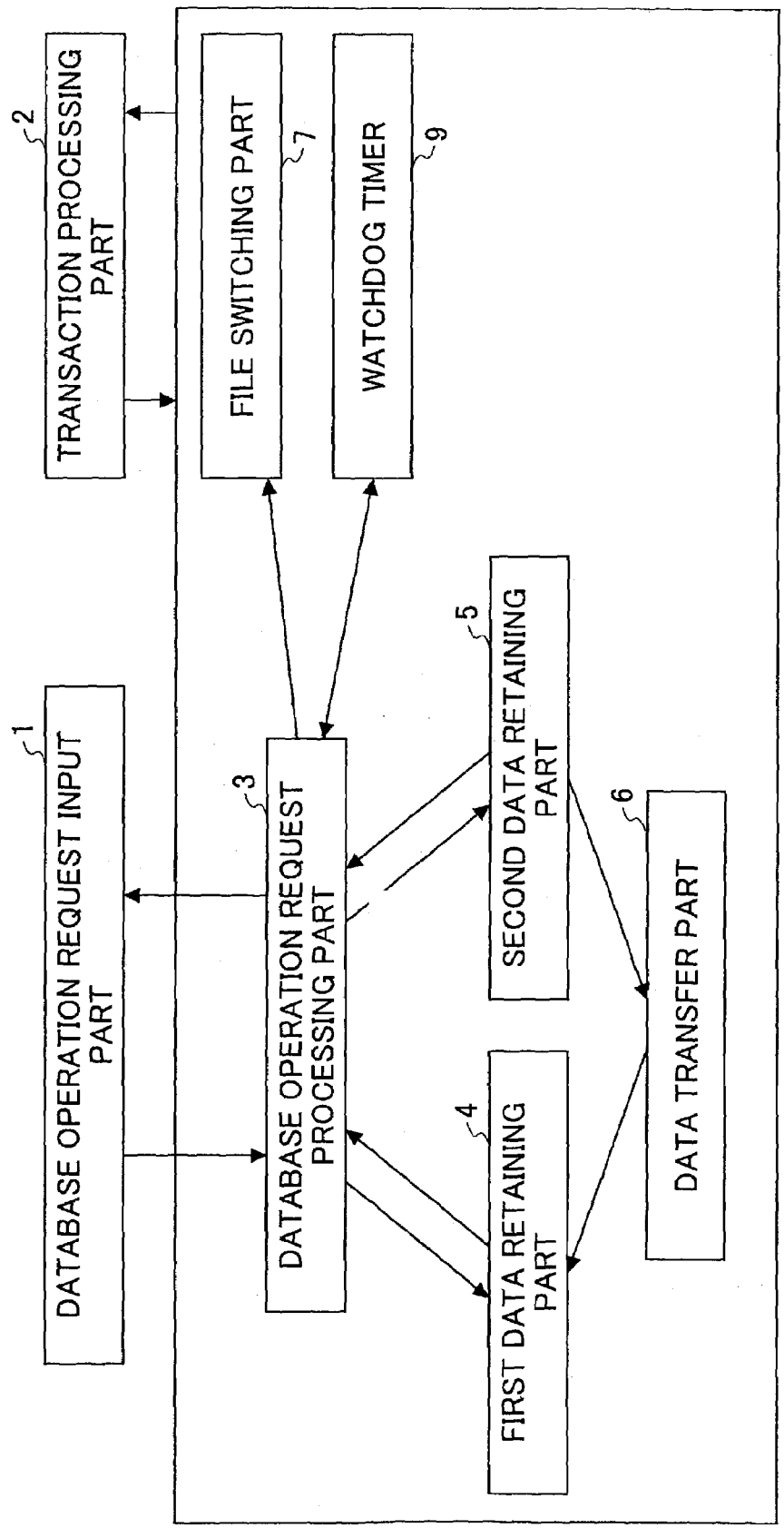
FIG. 10 is a block diagram showing a configuration of a database management system according to a fourth embodiment of the present invention.

FIG. 10 is a block diagram showing a configuration of a database management system according to the present fourth embodiment. The database management system according to the present fourth embodiment is based on the database management system according to the foregoing first embodiment. Instead, the database management system according to the present fourth embodiment may be based on the database management system according to the foregoing second or third embodiment.

Parts in the present fourth embodiment that are identical or equivalent to the parts shown in FIG. 1 and the foregoing first embodiment are referenced by the same reference marks, and only differences therebetween will be described in detail.

As shown in FIG. 10, the database management system comprises the database operation request input part 1, the transaction processing part 2, the database operation request processing part 3, the first data retaining part 4, the second data retaining part 5, the data transfer part 6, the file switching part 7, and a watchdog timer 9.

Hereinafter, a description will be given, with reference to flowcharts of FIG. 11 to FIG. 13, of operations of the present fourth embodiment.

(1) Search Processing

Figure 11:
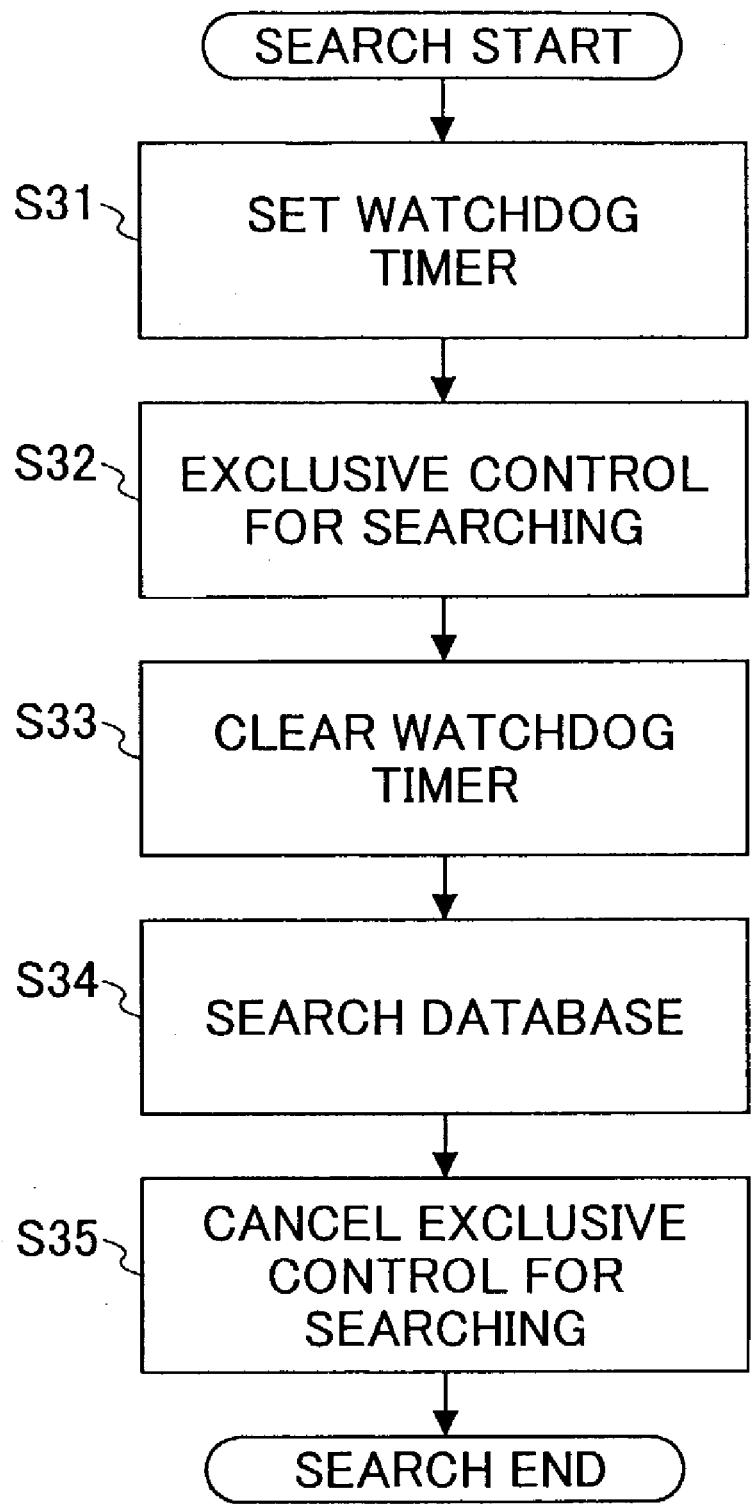
FIG. 11 is a flowchart showing a procedure of processing a search request in the database operation request processing part according to the fourth embodiment of the present invention.

FIG. 11 is a flowchart showing a procedure of processing a search request in the database operation request processing part 3.

First, upon a start of a search processing, the database operation request processing part 3, receiving a search request, sets a maximum time delayable in searching in the watchdog timer 9 (step S31).

Thereafter, the database operation request processing part 3 requests the exclusion mechanism of the transaction processing part 2 for an exclusive control for the search processing (step S32).

After the maximum delayable time set in the watchdog timer 9, the exclusive control for the search processing succeeds so that the search processing becomes executable.

Thereupon, the database operation request processing part 3 clears the watchdog timer 9 (step S33), and causes the searching to be performed to the database (step S34).

Upon completion of the searching, the database operation request processing part 3 requests the exclusion mechanism to cancel the exclusive control for the search processing, and ends the procedure (step S35).

Figure 12:
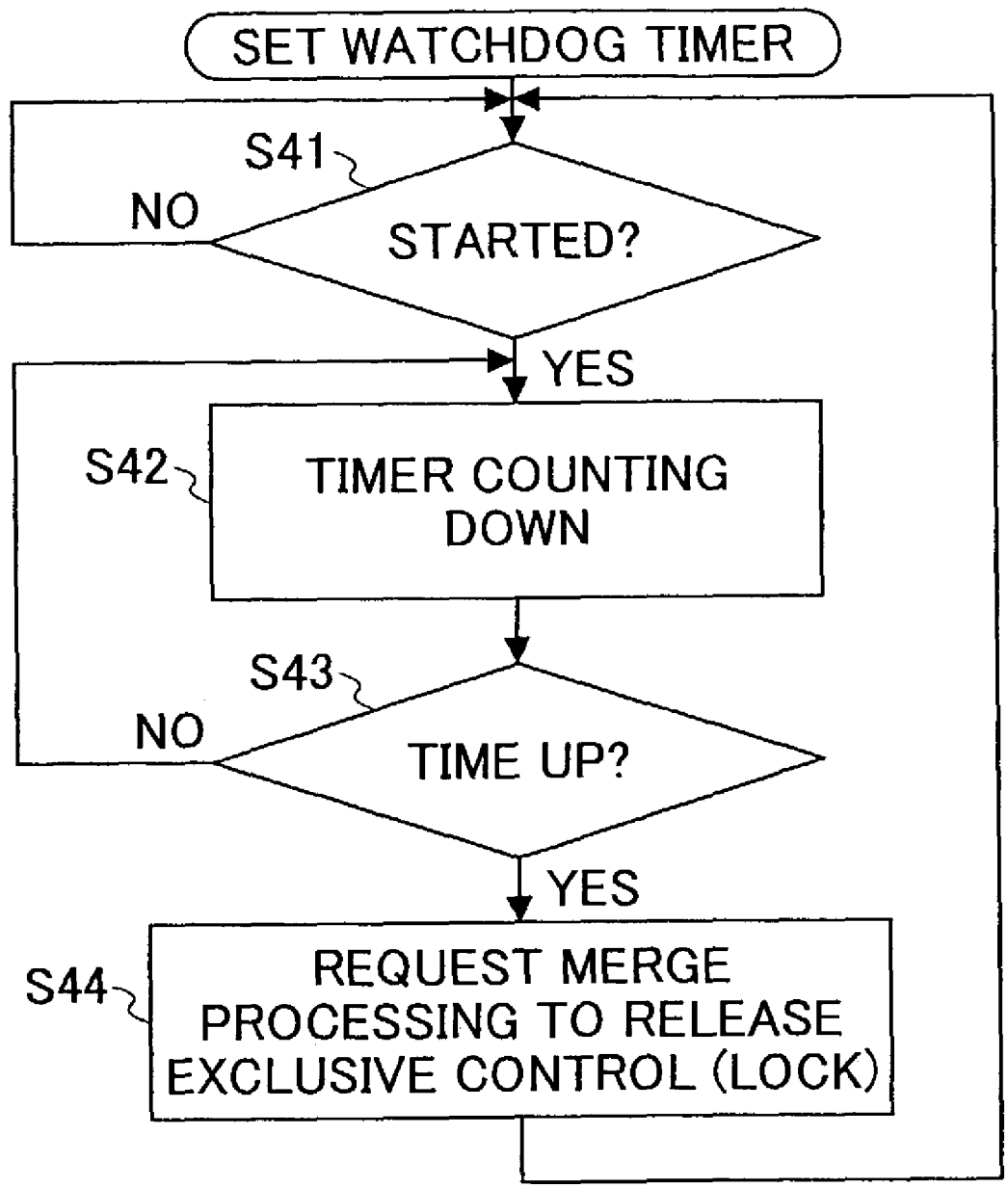
FIG. 12 is a flowchart showing a processing procedure of a watchdog timer according to the fourth embodiment of the present invention.

FIG. 12 is a flowchart showing a processing procedure of the watchdog timer 9.

The watchdog timer 9 stands by until the maximum delayable time is set to a timer from the database operation request processing part 3 (step S41).

When the maximum delayable time is set to the timer (YES in step S41), the watchdog timer 9 sleeps while counting down until the maximum delayable time comes (steps S42, S43).

When the timer equals the maximum delayable time (YES in step S43), the watchdog timer 9 requests the merge processing to release the exclusive control for the search processing, and stands by until the maximum delayable time is set to a next timer (steps S44 and S41).

(2) Merge Processing

Figure 13:
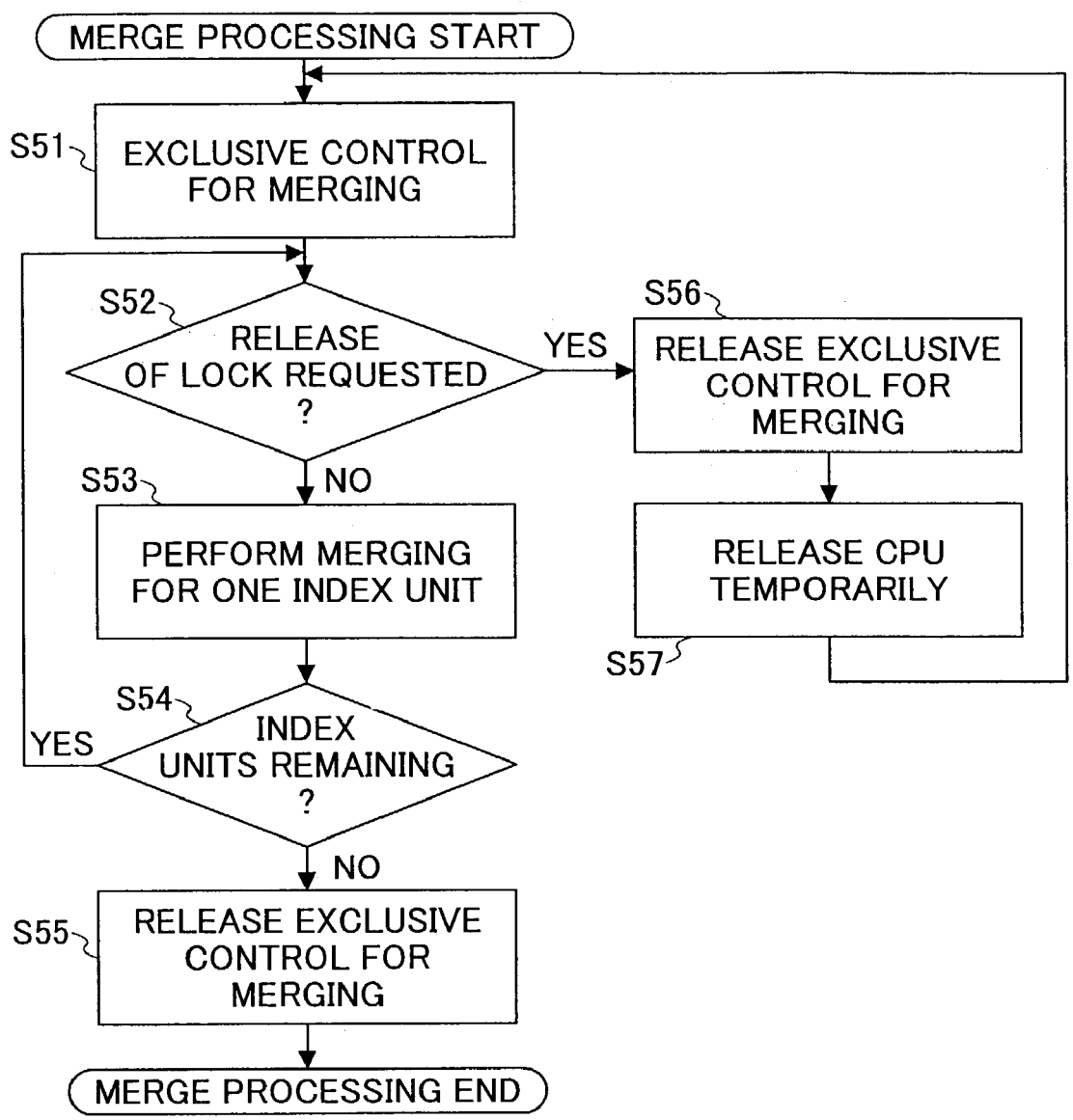
FIG. 13 is a flowchart showing a processing procedure of a merge processing in the data transfer part according to the fourth embodiment of the present invention.

FIG. 13 is a flowchart showing a processing procedure of the merge processing in the data transfer part 6.

As to the merge processing, the data transfer part 6 requests the exclusion mechanism of the transaction processing part 2 for an exclusive control for the merge processing so as to temporarily forbid a search request during the merge processing (step S51).

After the exclusive control for the merge processing succeeds, the data transfer part 6 checks whether a release of a lock (an exclusive control) is requested from the watchdog timer 9 (step S52). When the release of the lock is not requested (NO in step S52), the data transfer part 6 extracts an inverted list that is a unit of the merge processing from the second data retaining parts 5 (for insertion and for deletion) used for the merge processing, and performs a merging to the first data retaining part 4 for one index unit (step S53).

Steps S52 and S53 are repeated until an end of inverted lists (YES in step S54).

Upon the end of the inverted lists (index units) (NO in step S54), which is an end of the merge processing, the data transfer part 6 requests the exclusion mechanism to cancel the exclusive control for the merge processing, and ends the procedure (step S55).

On the other hand, in step S52, when the release of the lock is requested (YES in step S52), the data transfer part 6 requests the exclusion mechanism to cancel the exclusive control for the merge processing upon completion of the merge processing of the inverted list for one index unit (step S56).

The data transfer part 6 temporarily interrupts the merge processing, and releases the CPU for the search processing (step S57). Then, the data transfer part 6 returns to step S51 so as to request an exclusive control for the merge processing again.

Accordingly, the searching is performed while the CPU is released, during which the merging of the inverted list is not performed. Thus, the search processing can be performed safely.

Embodiment 5

Further, the present invention is not limited to the foregoing embodiments. The objects of the present invention can be achieved by programming functions of the parts composing the database management system according to each of the foregoing embodiments, writing beforehand the programs in a recording medium, such as a CD-ROM, mounting this CD-ROM in a computer including a medium drive, such as a CD-ROM drive, storing these programs in a memory or a storage device of the computer, and executing the programs.

In this case, the programs read from the recording medium realize the functions of the parts according to each of the foregoing embodiments. Thus, the programs and the recording medium storing the programs are also within the scope of the present invention.

Besides, the recording medium may be a medium, such as a semiconductor medium (e.g., a ROM, a nonvolatile memory card), an optical medium (e.g., a DVD, an MO, an MD, a CD-R), and a magnetic medium (e.g., a magnetic tape, a flexible disk).

The functions of the parts according to each of the foregoing embodiments are realized not only by executing the loaded programs, but also by an operating system, etc., performing part or all of actual processing according to instructions of the programs.

Besides, the above-mentioned programs may be stored in a storage device, such as a magnetic disk, of a server computer, and be distributed as by downloading, etc., to a user computer connected via a communications network, such as the Internet. In this case, the storage device of the server computer is also included in the recording medium of the present invention.

Embodiment 6

Besides, a full-text search device according to a sixth embodiment of the present invention is capable of restrict a time required for a merge processing to a predetermined time so as to restrict a waiting time of other processing to the predetermined time even when a number of registered documents increases, thereby improving a throughput of the system as a whole. This full-text search device further shortens a response time of registration (insertion) and deletion shortened by a full-text search device described in a patent application filed by the applicant of the present application.

The full-text search device described in the patent application filed by the applicant of the present application prepares small-scale full-text indexes for registration and for deletion, respectively, so as to avoid an aggravation of the response time of registration and deletion. Upon a search processing, the full-text search device adds a search result of the small-scale full-text index used for registration to a search result of a large-scale full-text index, and subtracts a search result of the small-scale full-text index used for deletion therefrom so as to form a search result to be returned to a user. This is an application of a method (a database management system) for enhancing a throughput of registration and deletion by preparing data retaining parts used for registration and for deletion aside from a data retaining part used for search, which is described in another patent application filed also by the applicant of the present application, to a full-text search device using full-text indexes of an inverted-file method so as to shorten a response time of registration and deletion processing from a user's point of view. That is, in the full-text search device described in the patent application filed by the applicant of the present application, a data transfer part uses, not original document data, but inverted lists composing the full-text indexes of the inverted-file method so as to shorten a time required for data transferring.

However, as a number of registered document data increases, the inverted list of the large-scale full-text index becomes large, and a time required for data transferring from the small-scale full-text indexes for search and for deletion (a merge processing of the inverted lists) also becomes long.

In the present embodiment, a time required for a data transfer is recorded; and when the time required for the data transfer at a predetermined point exceeds a predetermined time, a condition for starting a next data transfer is changed so that the data transfer is performed with a small-scale full-text index for search or for deletion being further smaller, thereby shortening the time required for data transferring, and preventing the time required for data transferring from becoming largely longer than a predetermined time.

Figure 14:
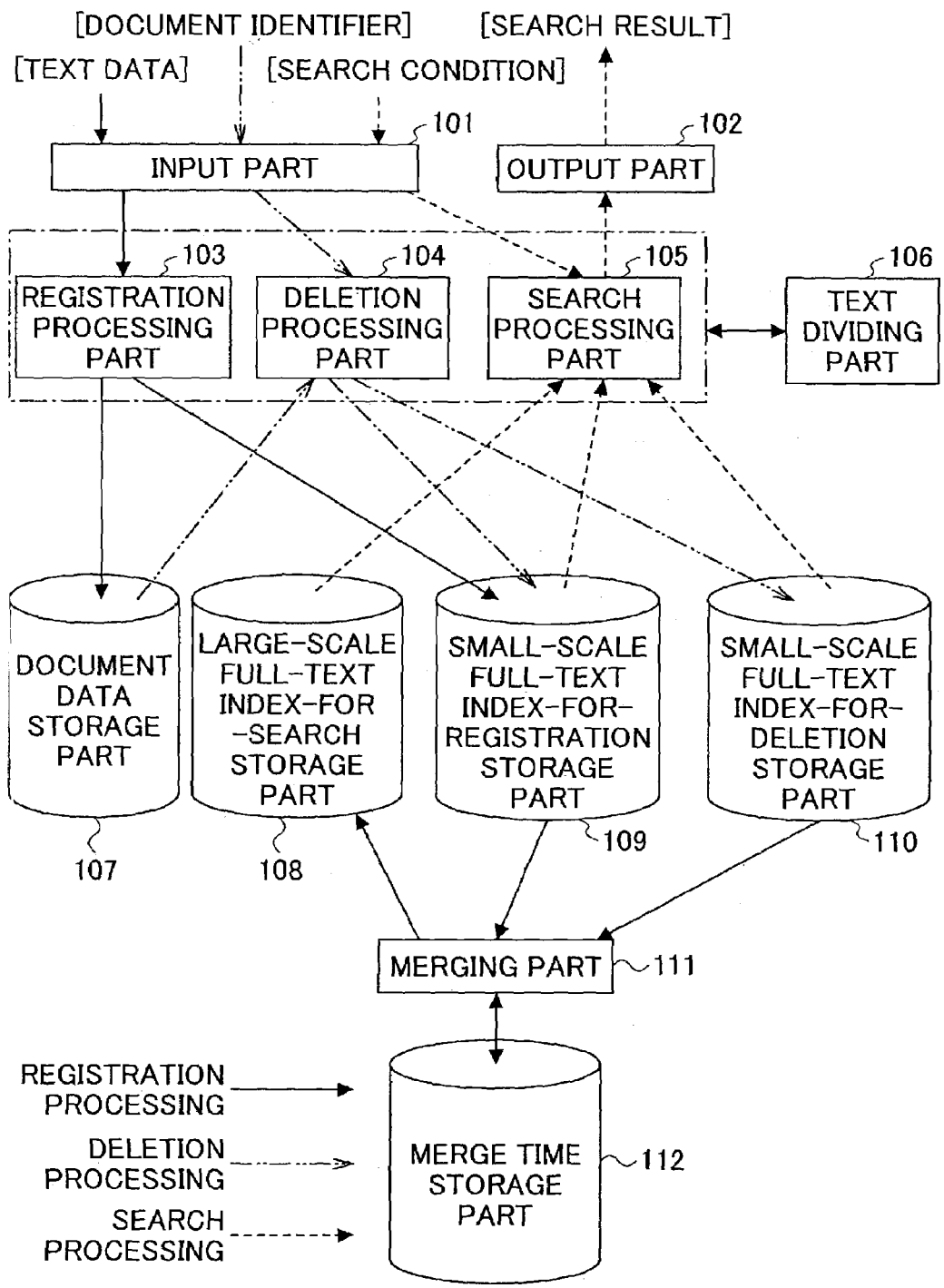
FIG. 14 is a block diagram for explaining a full-text search device according to a sixth embodiment of the present invention.
Figure 15:
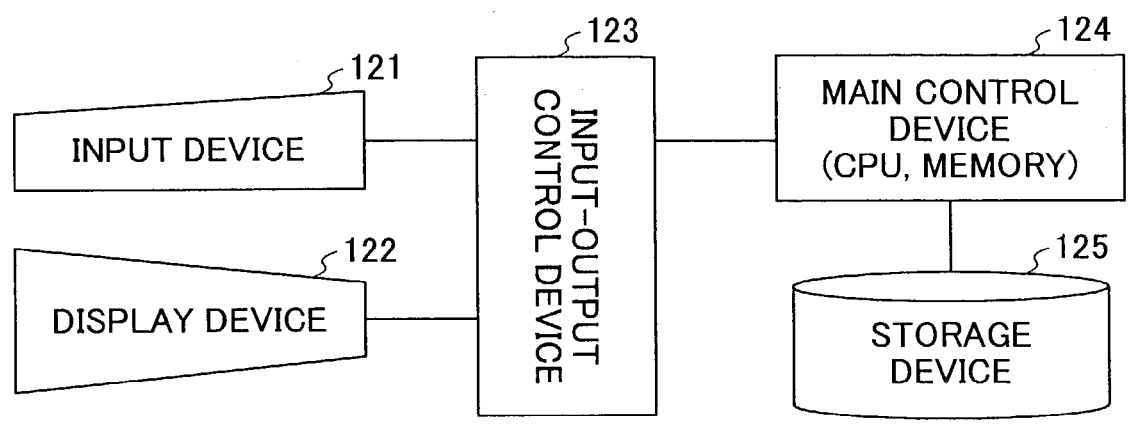
FIG. 15 is a diagram showing a hardware configuration of a stand-alone example of the full-text search device shown in FIG. 14.
Figure 16:
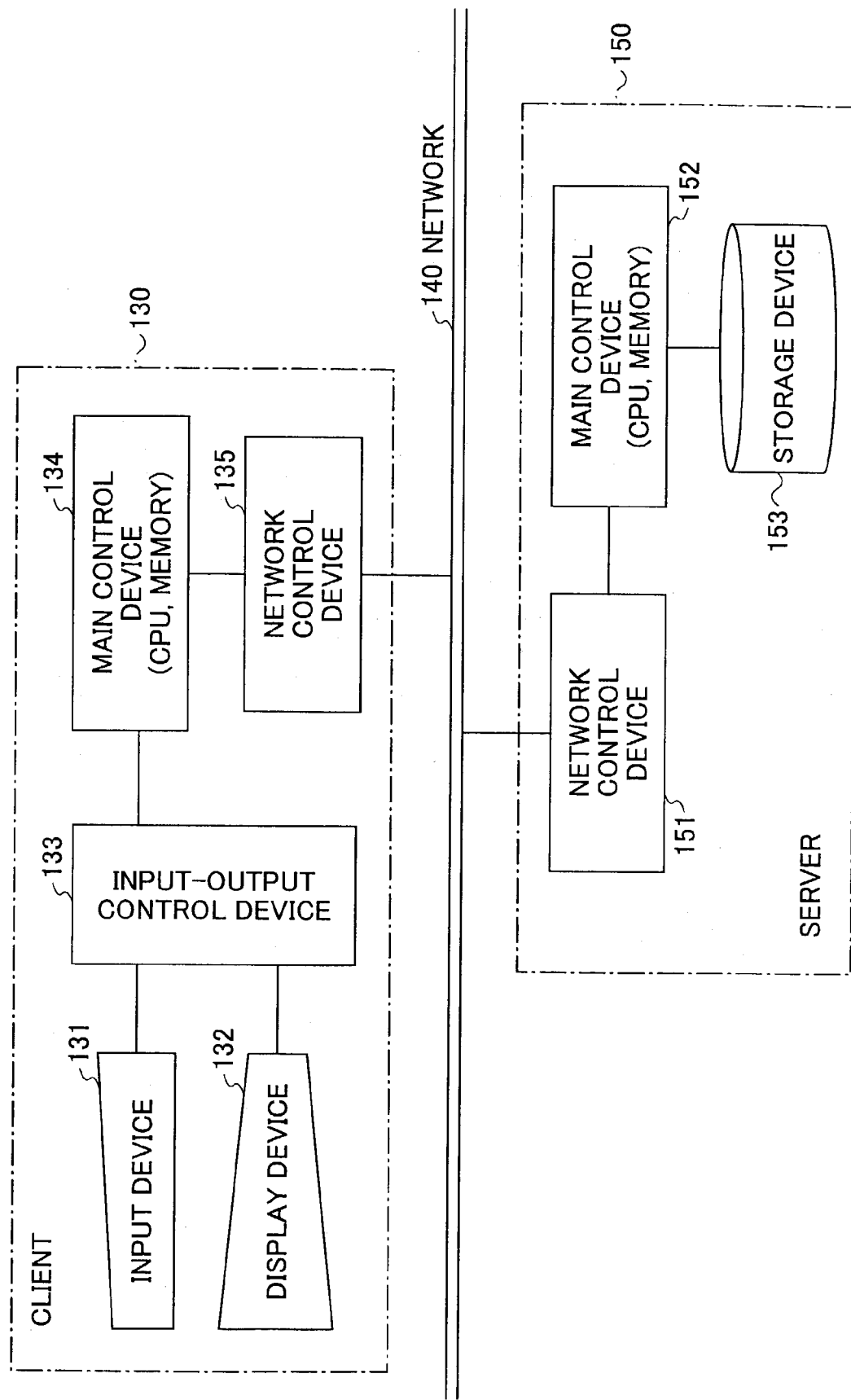
FIG. 16 is a diagram showing a hardware configuration of a server/client example of the full-text search device shown in FIG. 14.

FIG. 14 is a block diagram for explaining a full-text search device according to the sixth embodiment of the present invention. FIG. 15 is a diagram showing a hardware configuration of a stand-alone example of the full-text search device shown in FIG. 14. FIG. 16 is a diagram showing a hardware configuration of a server/client example of the full-text search device shown in FIG. 14.

The full-text search device according to the present invention is a device that searches for a document containing a specified character string from a plurality of document data (a plurality of electronic documents).

As shown in FIG. 14, in the present sixth embodiment, text data for registration processing, a document identifier for deletion processing, a search condition for search processing and so forth are input via an input part 101, and are supplied to a registration processing part 103, a deletion processing part 104, and a search processing part 105, respectively. The registration processing part 103 performs a registration processing with respect to document data. The registration processing by the registration processing part 103 is performed to a document data storage part 107 and a small-scale full-text index-for-registration storage part 109. The deletion processing part 104 performs a deletion processing with respect to document data. In the deletion processing by the deletion processing part 104, document data stored in the document data storage part 107 is read according to the document identifier input via the input part 101; and, using a text dividing part 106, when an index thereof is registered in the small-scale full-text index-for-registration storage part 109, the index is deleted; when the index is not registered in the small-scale full-text index-for-registration storage part 109, the index is recorded in a small-scale full-text index-for-deletion storage part 110. Besides, the text dividing part 106 performs a process of dividing the document data into partial character strings in the registration processing for the registration processing part 103, performs a process of dividing the document data into partial character strings in the deletion processing for the deletion processing part 104, and performs a process of dividing the search condition (a search character string) into partial character strings in a search processing for the search processing part 105. Besides, the search processing by the search processing part 105 is performed to a large-scale full-text index-for-search storage part 108, the small-scale full-text index-for-registration storage part 109, and the small-scale full-text index-for-deletion storage part 110. In the search processing, a search result of the small-scale full-text index-for-deletion storage part 110 is subtracted from search results of the large-scale full-text index-for-search storage part 108 and the small-scale full-text index-for-registration storage part 109, and a result of the subtraction is output via an output part 102 as a search result.

A merging part (a data transfer part) 111 performs data transferring among the large-scale full-text index-for-search storage part 108, the small-scale full-text index-for-registration storage part 109 and the small-scale full-text index-for-deletion storage part 110. A merge time storage part (a data transfer time storage part) 112 records a time required for a data transfer.

In the stand-alone hardware configuration shown in FIG. 15, an input device 121 corresponds to the input part 101 shown in FIG. 14, and a display device 122 corresponds to the output part 102 shown in FIG. 14. A main control device (a CPU, a memory, etc.) 124 corresponds to the registration processing part 103, the deletion processing part 104, the search processing part 105, the text dividing part 106 and the merging part 111 shown in FIG. 14. A storage device 125 corresponds to the document data storage part 107, the large-scale full-text index-for-search storage part 108, the small-scale full-text index-for-registration storage part 109, the small-scale full-text index-for-deletion storage part 110 and the merge time storage part 112 shown in FIG. 14. Besides, an input-output control device 123 controls the input device 121 and the display device 122 according to a control signal of the main control device 124.

In the server/client hardware configuration shown in FIG. 16, an input device 131 of a client 130 corresponds to the input part 101 shown in FIG. 14, and a display device 132 of the client 130 corresponds to the output part 102 shown in FIG. 14. Main control devices (a CPU, a memory, etc.) 134 and 152 of the client 130 and a server 150 correspond to the registration processing part 103, the deletion processing part 104, the search processing part 105, the text dividing part 106 and the merging part 111 shown in FIG. 14. A storage device 153 of the server 150 corresponds to the document data storage part 107, the large-scale full-text index-for-search storage part 108, the small-scale full-text index-for-registration storage part 109, the small-scale full-text index-for-deletion storage part 110 and the merge time storage part 112 shown in FIG. 14. Besides, network control devices 135 and 151 of the client 130 and the server 150 control a data transfer and so forth between the client 130 and the server 150 via a network 140. Further, an input-output control device 133 of the client 130 controls the input device 131 and the display device 132 according to a control signal of the main control device 134.

Hereinafter, a detailed description will be given of an example of operations of the full-text search device configured as above.

<<Registration Processing>>

In performing the registration processing, first, a user creates document data, and registers the document data via the input part 101. The registration processing part 103 stores the document data in the document data storage part 107, and at the same time, determines an identifier (a document identifier) indicating the document data. Further, the registration processing part 103 acquires partial character strings (tokens) and appearance position information of the tokens from the document data by using the text dividing part 106. Finally, the registration processing part 103 records the document identifier and the appearance position information of the tokens in the small-scale full-text index-for-registration storage part 109. Besides, the text dividing part 106 may use a dividing method, such as a method of making an N character group a token, or a method of performing a morphological analysis and making a word a token. The following examples will be described with the text dividing part 106 using the method of making an N character group a token; however, the examples are similarly applicable to the method of performing a morphological analysis and making a word a token.

Figure 17:
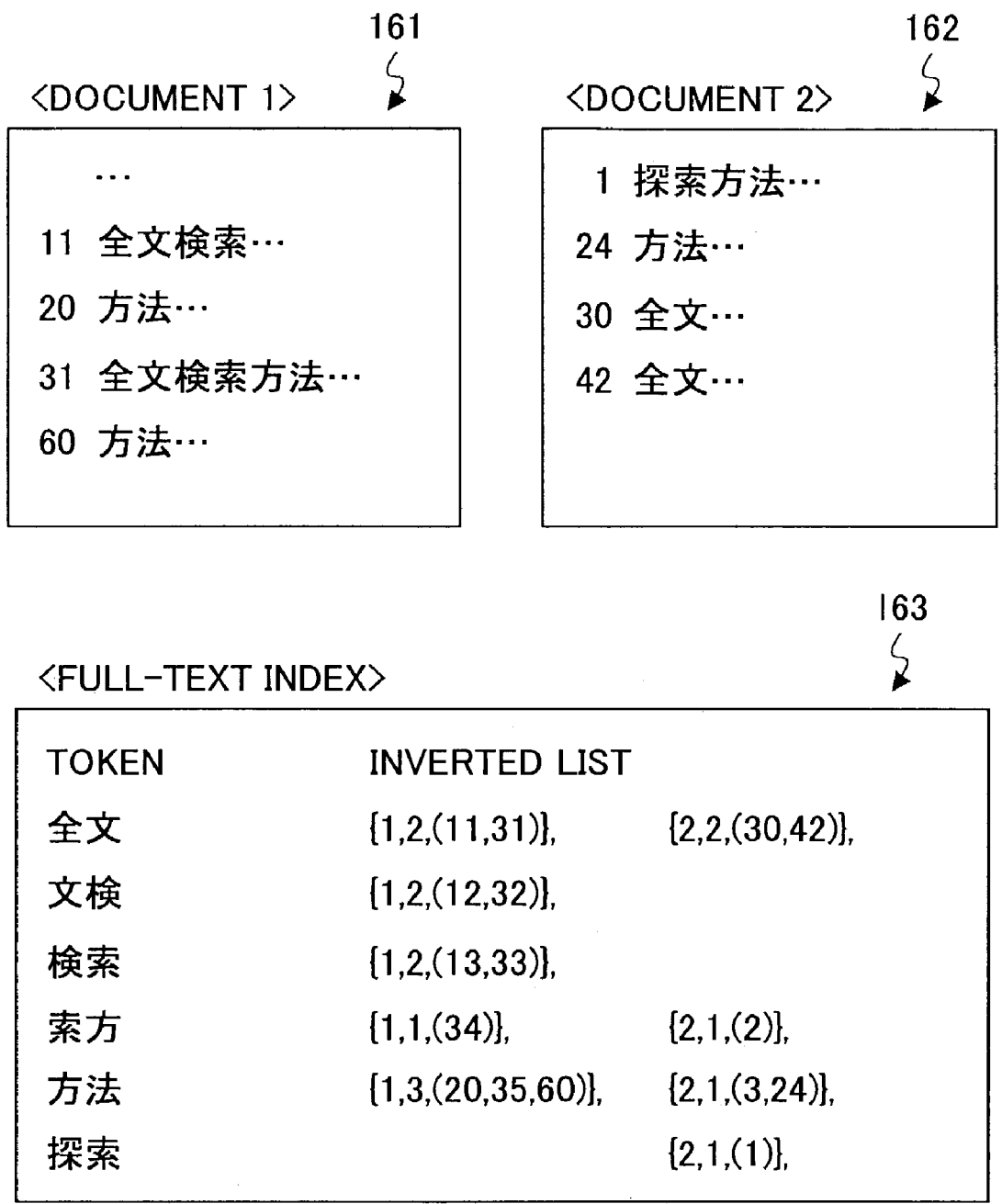
FIG. 17 is a diagram for explaining processes in the full-text search device shown in FIG. 14, and shows an example of a full-text index.

FIG. 17 is a diagram for explaining the processing in the full-text search device shown in FIG. 14, and shows an example of the full-text index. A detailed description will be given, with reference to the example shown in FIG. 17, of the full-text index of the inverted-file method.

Contents of document data "document 1" and "document 2" (contents acquired by the dividing process of the text dividing part 106) are indicated by marks 161 and 162, respectively, in FIG. 17. In FIG. 17, numbers on the left in each of the documents represent numbers of characters from a head of the character string. Specifically, in the document 1, "全文検索" (it is noted that Chinese characters are shown in FIG. 17) appears at an eleventh character from the head, "方法" appears at twentieth and sixtieth characters, and "全文検索方法" appears at a thirty-first character. In the document 2, "探索方法" appears at a first character from the head, "方法" appears at a twenty-fourth character, and "全文" appears at thirtieth and forty-second characters.

Besides, in a case of making a two-character group a partial character string (a token), all of partial character strings in the document are extracted, and appearance positions (the numbers of characters from the head) in the document are recorded in the index collectively for each partial character string. For example, in the document 1, "全文" appears at positions 11 and 31, and "文検" appears at positions 12 and 32; thus, the positions are recorded in the index. In addition to the appearance positions in the document, document identifiers identifying the document and numbers of appearances are recorded in the index, such as in a format indicated by a mark 163 in FIG. 17. For example, an inverted list for "全文", i.e., {1, 2, (11, 31)} and {2, 2, (30, 42)}, means that "全文" appears in the document 1 two times at positions 11 and 31, and that "全文" appears in the document 2 two times at positions 30 and 42, respectively.

<<Deletion Processing>>

In performing the deletion processing, first, a user inputs a document identifier of a document to be deleted via the input part 101. Next, the deletion processing part 104 reads document data corresponding to the document identifier from the document data storage part 107. Further, the deletion processing part 104 acquires partial character strings (tokens) and appearance position information of the tokens from the document data by using the text dividing part 106. Besides, when the document identifier is registered in the small-scale full-text index-for-registration, the appearance position information of the tokens is deleted from the small-scale full-text index-for-registration storage part 109. When the document identifier is not registered in the small-scale full-text index-for-registration (i.e., when the document identifier is registered in the large-scale full-text index-for-search), the document identifier and the appearance position information of the tokens are recorded in the small-scale full-text index-for-deletion storage part 110. Besides, the deletion processing part 104 deletes the document data corresponding to the document identifier from the document data storage part 107.

<<Search Processing>>

In performing the search processing, first, a user inputs a search character string via the input part 101. Next, the search processing part 105 acquires tokens from the search character string by using the text dividing part 106. Besides, the search processing part 105 obtains a set (Rs) of document identifiers of document data containing the search character string by using the large-scale full-text index-for-search of the large-scale full-text index-for-search storage part 108, and obtains a set (Ri) of document identifiers of document data containing the search character string by using the small-scale full-text index-for-registration of the small-scale full-text index-for-registration storage part 109. Further, the search processing part 105 obtains a set (Rd) of document identifiers of document data containing the search character string by using the small-scale full-text index-for-deletion of the small-scale full-text index-for-deletion storage part 110. The search processing part 105 performs the following set operation to the obtained sets (Rs, Ri, Rd) of the document identifiers so as to obtain a search result (R), and outputs the search result (R) as a set of the document identifiers of the document data containing the search character string to the user via the output part 102.

$$R = Rs + Ri - Rd,$$

wherein + represents a logical OR operator, and − represents a logical NOT operator.

A detailed description will be given of the search processing by taking the full-text index 163 shown in FIG. 17 as an example.

When the search character string is "全文検索", the text dividing part 106 extracts three tokens of "全文", "文検" and "検索". Next, the text dividing part 106 examines three inverted lists corresponding to the tokens in the full-text index 163. Finding appearance positions of the tokens with a difference of 1 in the inverted lists reveals that "全文検索" exists at the eleventh and the thirty-first characters in the document 1.

<<Merge Processing>>

A merge processing by the merging part 111 replaces a processing of a data transfer part described in the above-mentioned latter patent application filed by the applicant of the present application.

Compared with a case of performing a registration/deletion processing by using original document data, directly using inverted lists already created upon a start of the processing does not require a time for dividing tokens and creating inverted lists by a text dividing process, thereby shortening a time of data transfer processing. In the present invention, since the processing is performed between inverted lists, the data transfer processing is also referred to as merge processing. When the registration/deletion processing of document data in the full-text search device is performed between inverted lists, inverted lists already created upon registration/deletion of data with respect to the full-text index-for-search are directly used, thereby shortening a time of the merge processing to the full-text index-for-search, and shortening a waiting time of the search processing.

In performing the merge processing, first, with respect to all of tokens in the small-scale full-text index-for-registration, (a) a process of extracting inverted lists of the tokens from the full-text index, and (b) a process of adding the inverted lists to an end of inverted lists of the corresponding tokens in the large-scale full-text index-for-search, are performed. Next, the small-scale full-text index-for-registration is emptied. Besides, with respect to all of tokens in the small-scale full-text index-for-deletion, (c) a process of extracting inverted lists of the tokens from the full-text index, and (d) a process of deleting appearance position information included in the extracted inverted lists from inverted lists of the corresponding tokens in the large-scale full-text index-for-search, are performed. Next, the small-scale full-text index-for-deletion is emptied.

Figure 18:
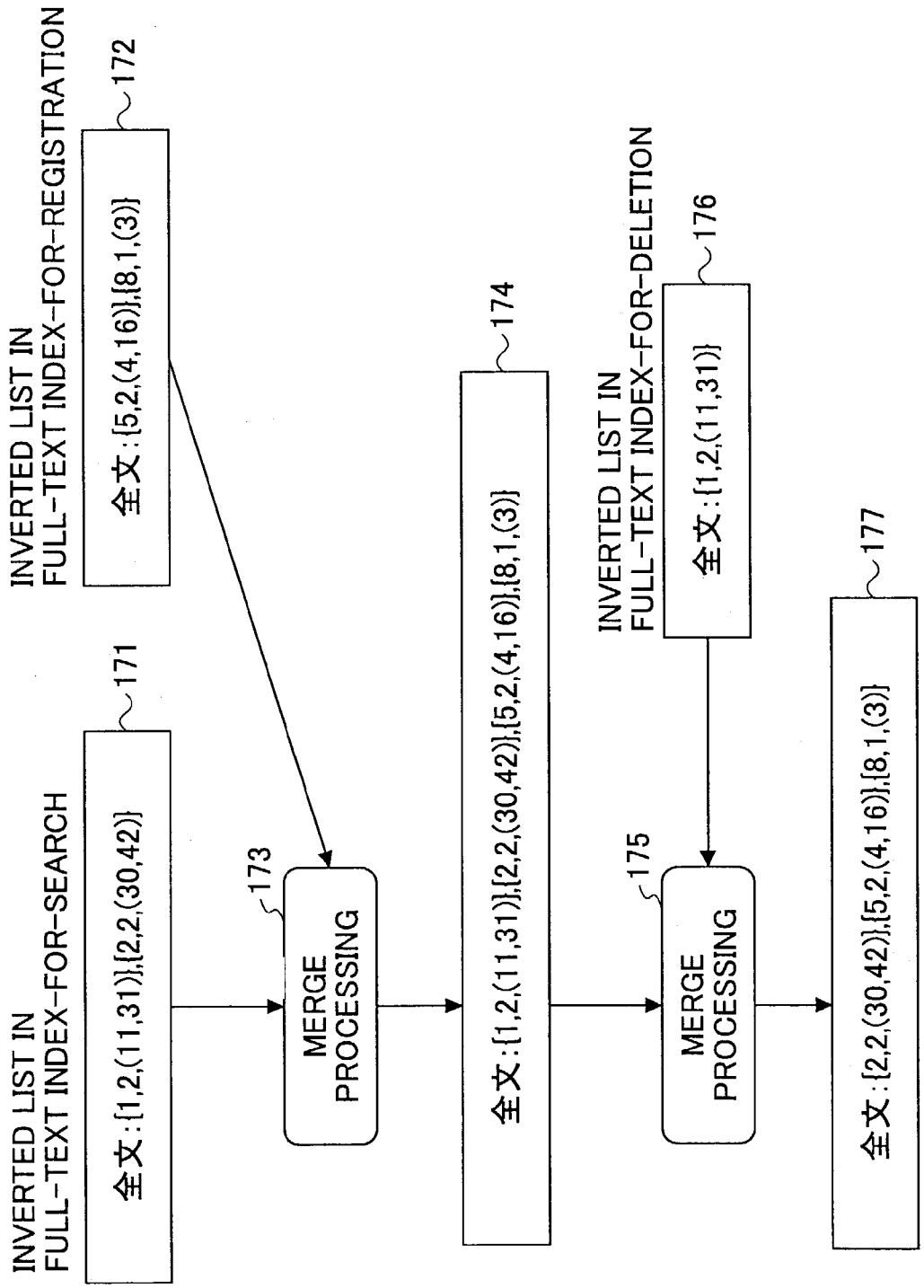
FIG. 18 is a chart for explaining a merge processing by taking an inverted list of a token "全文" in the full-text index shown in FIG. 17 as an example.

FIG. 18 is a chart for explaining the merge processing by taking the inverted list of the token "全文" in the full-text index 163 shown in FIG. 17 as an example.

In this example, an inverted list for "全文", i.e., {1, 2, (11, 31)}, {2, 2, (30, 42)}, is an inverted list 171 in the full-text index-for-search; an inverted list for "全文", i.e., {5, 2, (4, 16)}, {8, 1, (3)}, is an inverted list 172 in the full-text index-for-registration; and the inverted list 171 and the inverted list 172 are subjected to a merge processing 173. Performing the merge processing 173 obtains an inverted list 174 for "全文", i.e., {1, 2, (11, 31)}, {2, 2, (30, 42)}, {5, 2, (4, 16)}, {8, 1, (3)}. Further, performing a merge processing 175 of this inverted list 174 and an inverted list for "全文", i.e., {1, 2, (11, 31)}, as an inverted list 176 in the full-text index-for-deletion obtains an inverted list 177 for "全文", i.e., {2, 2, (30, 42)}, {5, 2, (4, 16)}, {8, 1, (3)}.

<<Form 1 of Merge Processing>>

The merge processing of the small-scale full-text index-for-registration is started by the registration processing part 103 upon a starting condition, i.e., when a number of document identifies registered in the small-scale full-text index-for-registration in the small-scale full-text index-for-registration storage part 109 reaches a predetermined number (Ni), and is performed by the merging part 111.

In the merge processing, when the above-mentioned starting condition is fulfilled, first, a start time (Ts) is recorded (stored) in the merge time storage part 112. Next, with respect to all of tokens in the small-scale full-text index-for-registration, (a) the process of extracting inverted lists of the tokens from the full-text index, and (b) the process of adding the inverted lists to an end of inverted lists of the corresponding tokens in the large-scale full-text index-for-search, are performed. Then, the small-scale full-text index-for-registration is emptied. Besides, with respect to all of tokens in the small-scale full-text index-for-deletion, (c) the process of extracting inverted lists of the tokens from the full-text index, and (d) the process of deleting appearance position information included in the extracted inverted lists from inverted lists of the corresponding tokens in the large-scale full-text index-for-search, are performed. Subsequently, the small-scale full-text index-for-deletion is emptied. Then, an end time (Te) is stored in the merge time storage part 112.

In the above-described merge processing, when a merge processing time (Te−Ts) is larger than a predetermined time (T), the starting condition is changed according to the following expression (1) for a next merge processing.

$$Ni \times (1-(Te-Ts)/T) \qquad (1)$$

According to the form 1 of the merge processing, using the number of registered document identifies as the starting condition does not require a management of the size of the full-text index storage part, providing an advantage of the processing to be performed with ease.

<<Form 2 of Merge Processing>>

The merge processing of the small-scale full-text index-for-registration may be started by the registration processing part 103 upon a starting condition, i.e., when a storage capacity (size) in the small-scale full-text index-for-registration storage part 109 becomes a predetermined size (Si), and be performed by the merging part 111. In this merge processing, the expression (1) forming the starting condition of the merge processing described in the form 1 of the merge processing is replaced with the following expression (2).

$$Si \times (1-(Te-Ts)/T) \qquad (2)$$

According to the form 2 of the merge processing, when document data registered from a user varies in size, the merge processing can be prevented from starting before a time for registration to the small-scale full-text index-for-registration becomes long when small document data is continuously registered. Using the size as the starting condition equalizes the merge processing time.

<<Form 3 of Merge Processing>>

The merge processing of the small-scale full-text index-for-deletion is started by the deletion processing part 104 upon a starting condition, i.e., when a number of document identifies registered in the small-scale full-text index-for-deletion in the small-scale full-text index-for-deletion storage part 110 reaches a predetermined number (Nd), and is performed by the merging part 111. In this merge processing, the expression (1) forming the starting condition of the merge processing described in the form 1 of the merge processing is replaced with the following expression (3).

$$Nd \times (1-(Te-Ts)/T) \qquad (3)$$

According to the form 3 of the merge processing, when the deletion processing does not take place frequently, there is an advantage of shortening the time of the merge processing.

<<Form 4 of Merge Processing>>

The merge processing of the small-scale full-text index-for-deletion may be started by the deletion processing part 104 upon a starting condition, i.e., when a size of the small-scale full-text index-for-deletion in the small-scale full-text index-for-deletion storage part 110 reaches a predetermined size (Sd), and be performed by the merging part 111. In this merge processing, the expression (1) forming the starting condition of the merge processing described in the form 1 of the merge processing is replaced with the following expression (4).

$$Sd \times (1-(Te-Ts)/T) \qquad (4)$$

According to the form 4 of the merge processing, when the deletion processing does not take place frequently, there is an advantage of shortening the time of the merge processing.

According to the above-described forms of the merge processing, the full-text search device can start the merge processing of the full-text indexes on conditions appropriate for characteristics of document data to be registered/deleted and/or characteristics of a field where the device is used, thereby reducing a number of occurrences of the merge processing, and improving the throughput of the system as a whole. Further, even when the number of registered documents increases, the full-text search device restricts a time required for the merge processing to a predetermined time so as to restrict a waiting time of other processing to the predetermined time, thereby further improving the throughput of the system as a whole.

Besides, the present invention is applicable, not only to the above-described full-text search device, but also to a program for realizing functions of the full-text search device, to a program for realizing functions of the parts composing the full-text search device, or to a computer readable recording medium storing the program.

Embodiment 7

A description will be given of an embodiment where the program and data for realizing the functions of the full-text search according to the present invention are stored in the recording medium. Specifically, the recording medium may be a CD-ROM, a magneto-optical disc, a DVD-ROM, an FD, a flash memory, and various types of ROM and RAM, and so forth. The program for causing a computer to perform the functions of the full-text search device according to the foregoing embodiment so as to realize the functions of the full-text search is recorded in the recording medium for distribution, thereby facilitating the realization of these functions. The functions of the full-text search according to the present invention can be performed by mounting the above-mentioned recording medium in an information processing device, such as a computer, and reading the program by the information processing device, or by storing the program in a storage medium provided in the information processing device, and reading the program when needed.

Embodiment 8

Figure 19:
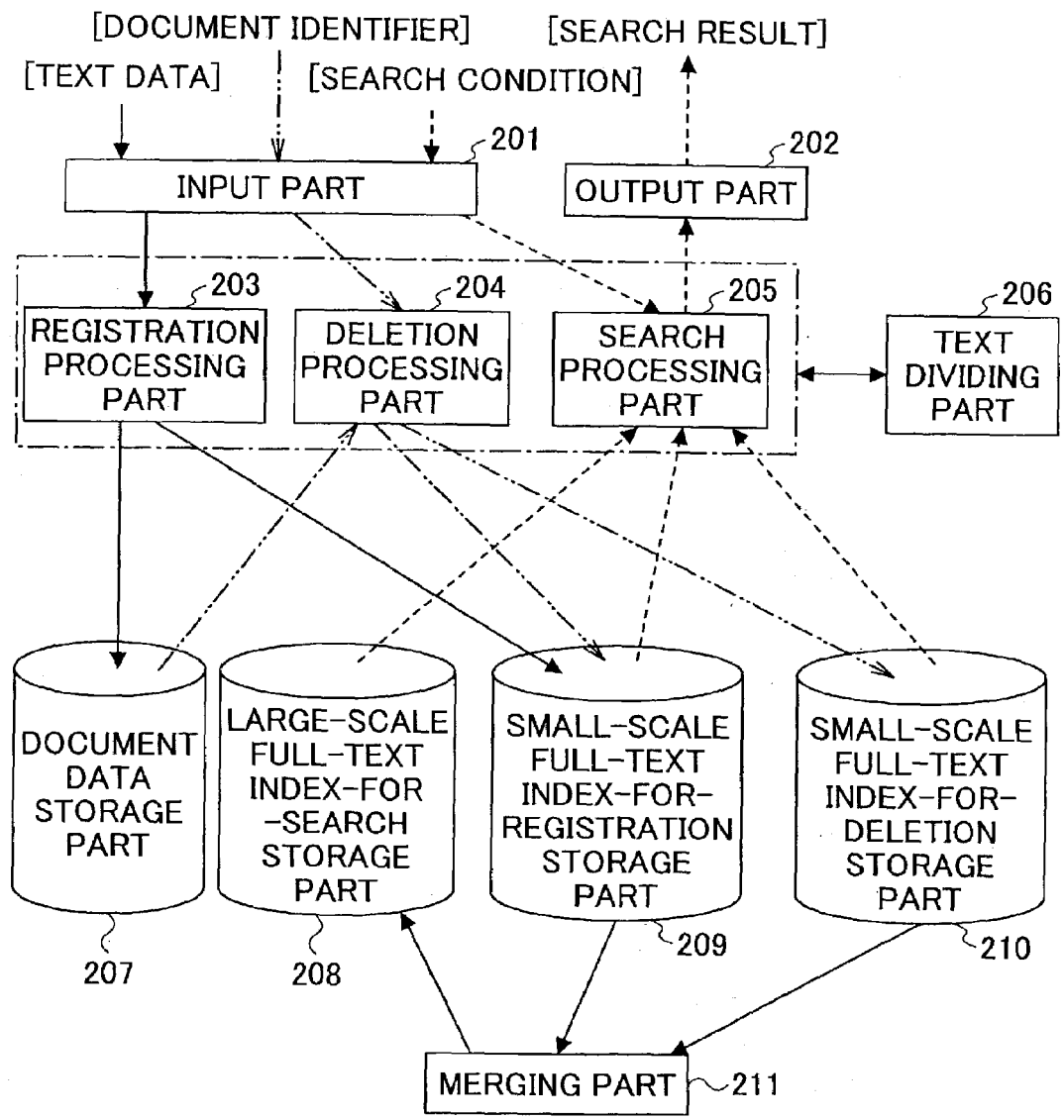
FIG. 19 is a block diagram for explaining a full-text search device according to an eighth embodiment of the present invention.

FIG. 19 is a block diagram for explaining a full-text search device according to an eighth embodiment of the present invention.

The full-text search device according to the present embodiment is also a device that searches for a document containing a specified character string from a plurality of document data (a plurality of electronic documents). Besides, the "full-text search" in the full-text search device means a search through all character strings to be searched. Therefore, in a document containing tags, such as an SGML, only character strings between predetermined tags may be appropriately searched through.

As shown in FIG. 19, in the present eighth embodiment, text data for registration processing, a document identifier for deletion processing, a search condition for search processing and so forth are input via an input part 201, and are supplied to a registration processing part 203, a deletion processing part 204, and a search processing part 205, respectively. The registration processing part 203 performs a registration processing with respect to document data. The registration processing by the registration processing part 203 is performed to a document data storage part 207 and a small-scale full-text index-for-registration storage part 209. The deletion processing part 204 performs a deletion processing with respect to document data. In the deletion processing by the deletion processing part 204, document data stored in the document data storage part 207 is read according to the document identifier input via the input part 201; and, using a text dividing part 206, when an index thereof is registered in the small-scale full-text index-for-registration storage part 209, the index is deleted; when the index is not registered in the small-scale full-text index-for-registration storage part 209, the index is recorded in a small-scale full-text index-for-deletion storage part 210. Besides, the text dividing part 206 performs a process of dividing the document data into partial character strings in the registration processing for the registration processing part 203, performs a process of dividing the document data into partial character strings in the deletion processing for the deletion processing part 204, and performs a process of dividing the search condition (a search character string) into partial character strings in a search processing for the search processing part 105.

Besides, the search processing by the search processing part 205 is performed to a large-scale full-text index-for-search storage part 208, the small-scale full-text index-for-registration storage part 209, and the small-scale full-text index-for-deletion storage part 210. In the search processing, a search result of the small-scale full-text index-for-deletion storage part 210 is subtracted from search results of the large-scale full-text index-for-search storage part 208 and the small-scale full-text index-for-registration storage part 209, and a result of the subtraction is output via an output part 202 as a search result. A merging part 211 performs a merge processing (i.e., data transferring in a broad sense) among the large-scale full-text index-for-search storage part 208, the small-scale full-text index-for-registration storage part 209 and the small-scale full-text index-for-deletion storage part 210.

Besides, the deletion processing by the deletion processing part 204 may be performed, not by using the small-scale full-text index-for-deletion storage part 210, but by using only the small-scale full-text index-for-registration storage part 209, in which other document data (and index) management method for deletion is used; for example, only document data to be deleted is deleted, and on a holiday, etc., with plenty of processing time, document data in the large-scale full-text index-for-search storage part 208 may be updated by being matched with document data stored in the document data storage part 207. On the contrary, the deletion processing by the deletion processing part 204 may be performed, not by using the small-scale full-text index-for-registration storage part 209, but by using only the small-scale full-text index-for-deletion storage part 210.

In the above-described stand-alone hardware configuration shown in FIG. 15, the input device 121 corresponds to the input part 201 shown in FIG. 19, and the display device 122 corresponds to the output part 202 shown in FIG. 19. The main control device (a CPU, a memory, etc.) 124 corresponds to the registration processing part 203, the deletion processing part 204, the search processing part 205, the text dividing part 206 and the merging part 211 shown in FIG. 19. The storage device 125 corresponds to all of the document data storage part 207, the large-scale full-text index-for-search storage part 208, the small-scale full-text index-for-registration storage part 209 and the small-scale full-text index-for-deletion storage part 210 shown in FIG. 19; or individual storage devices correspond to the respective storage parts 207 to 210 shown in FIG. 19; or files in the storage device 125 correspond to the storage parts 207 to 210 shown in FIG. 19. For example, when the full-text search according to the present invention is performed by using one limited storage device, areas to be used may be allocated appropriately depending on whether the search processing is performed mainly or the registration/deletion processing is mainly performed. Besides, the input-output control device 123 controls the input device 121 and the display device 122 according to a control signal of the main control device 124.

In the above-described server/client hardware configuration shown in FIG. 16, the input device 131 of the client 130 corresponds to the input part 201 shown in FIG. 19, and the display device 132 of the client 130 corresponds to the output part 202 shown in FIG. 19. The main control devices (a CPU, a memory, etc.) 134 and 152 of the client 130 and the server 150 correspond to the registration processing part 203, the deletion processing for the deletion processing part 204, the search processing part 205, the text dividing part 206 and the merging part 211 shown in FIG. 19. The storage device 153 of the server 150 corresponds to all of the document data storage part 207, the large-scale full-text index-for-search storage part 208, the small-scale full-text index-for-registration storage part 209 and the small-scale full-text index-for-deletion storage part 210 shown in FIG. 19; or individual storage devices connected to the server 150 correspond to the respective storage parts 207 to 210 shown in FIG. 19; or files in the storage device 153 correspond to the storage parts 207 to 210 shown in FIG. 19. Besides, the network control devices 135 and 151 of the client 130 and the server 150 control a data transfer and so forth between the client 130 and the server 150 via the network 140. Further, the input-output control device 133 of the client 130 controls the input device 131 and the display device 132 according to a control signal of the main control device 134.

Hereinafter, a detailed description will be given of an example of operations of the full-text search device according to the present eighth embodiment.

Figure 20:
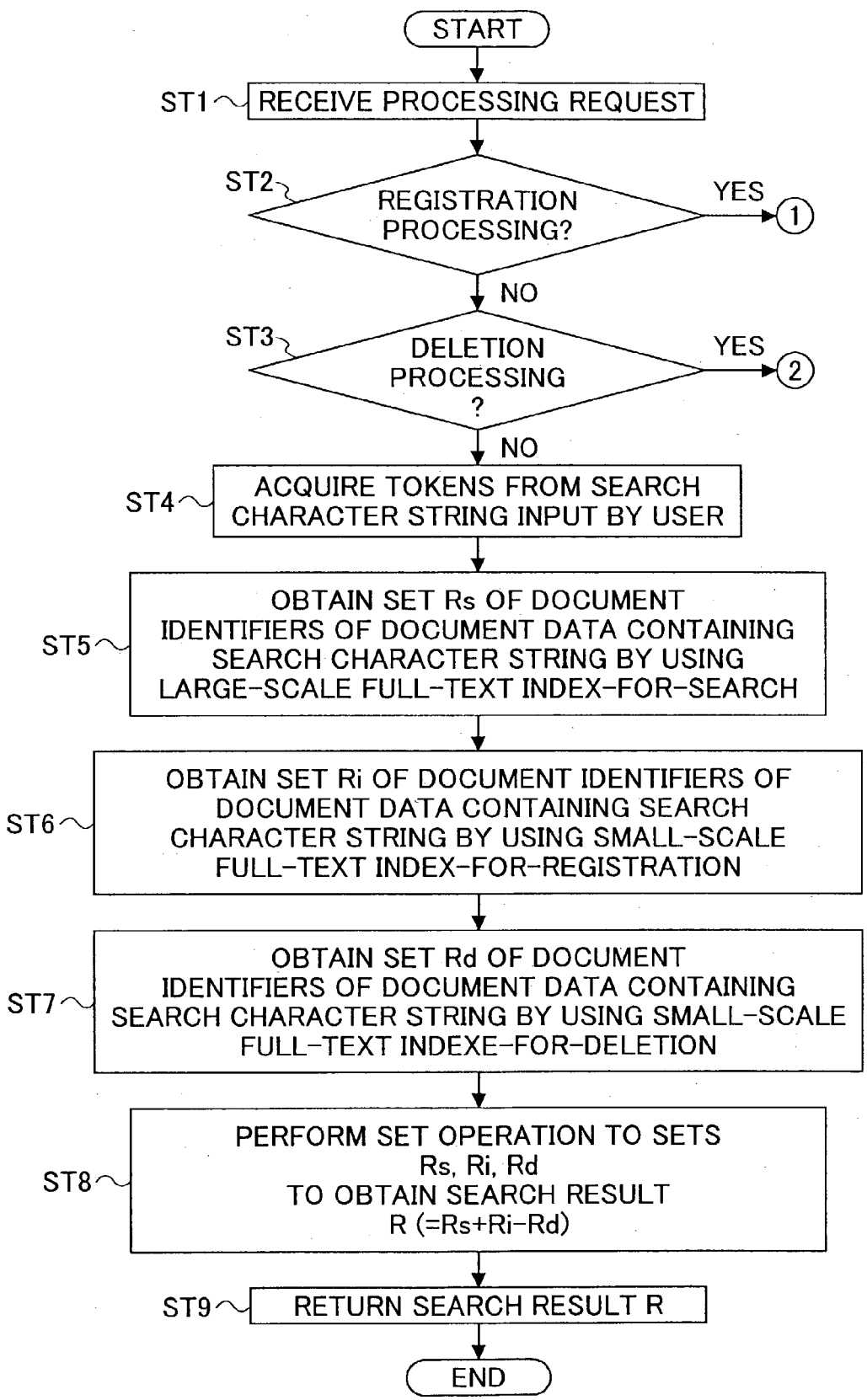
FIG. 20 is a first flowchart for explaining an example of processing in the full-text search device shown in FIG. 19.
Figure 21:
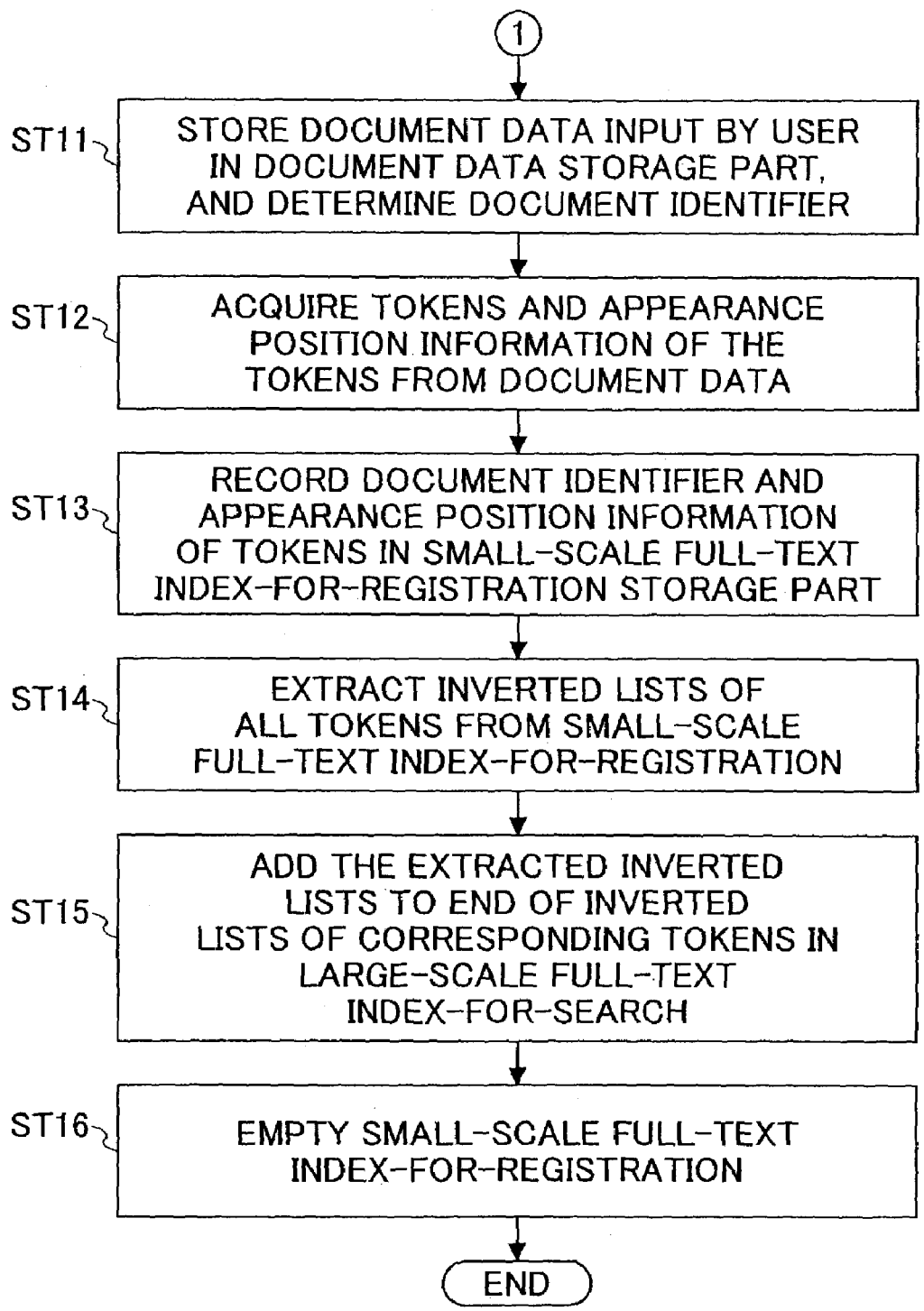
FIG. 21 is a second flowchart for explaining an example of processing in the full-text search device shown in FIG. 19.
Figure 22:
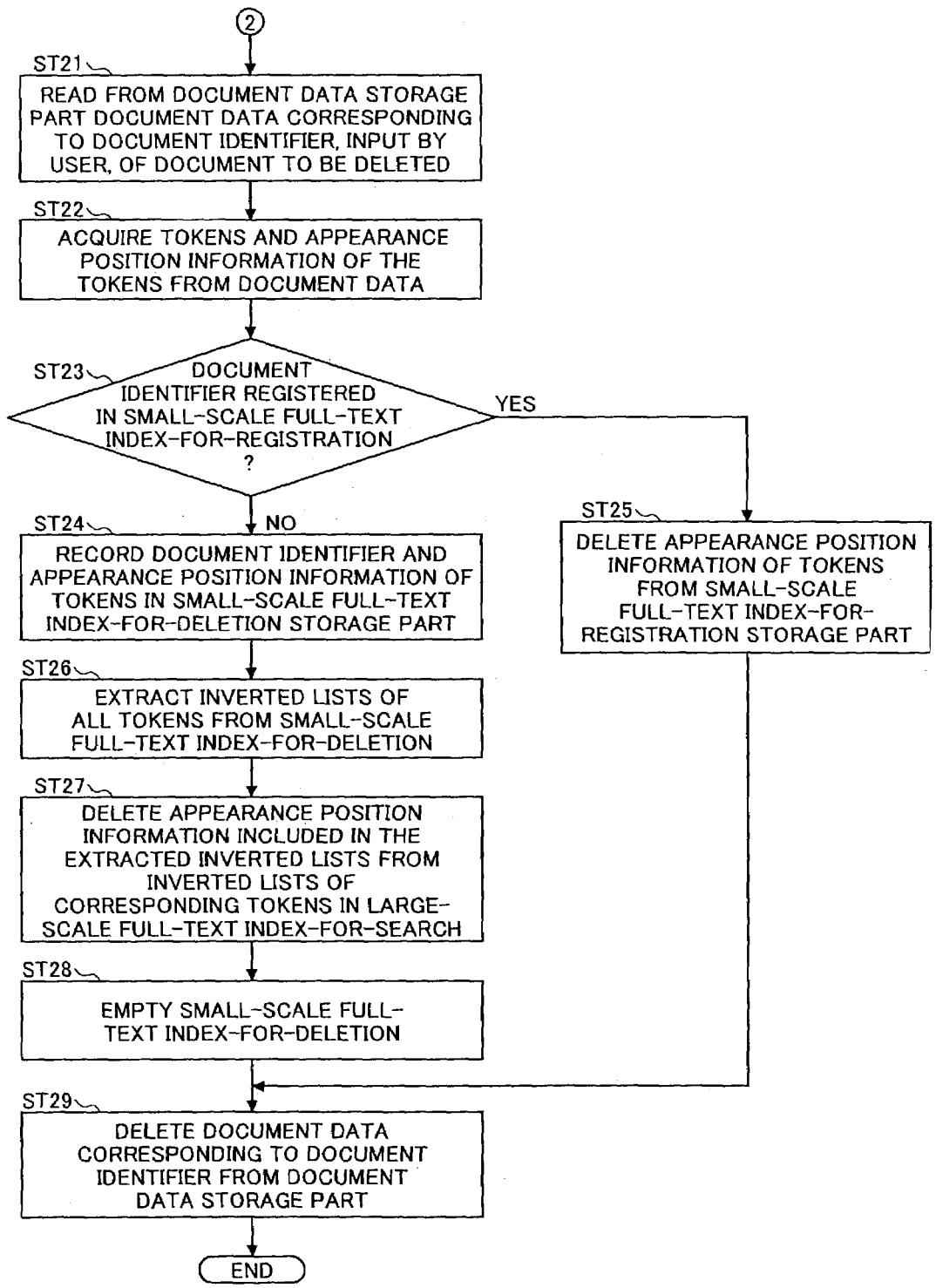
FIG. 22 is a third flowchart for explaining an example of processing in the full-text search device shown in FIG. 19.

FIG. 20 to FIG. 22 are flowcharts for explaining an example of processing in the full-text search device shown in FIG. 19.

When the full-text search device receives a processing request from a user (step ST1), first, the full-text search device judges whether the processing is the registration processing (step ST2), whether the processing is the deletion processing (step ST3), and whether the processing is the search processing (NO in step ST3). The full-text search device performs either of the following processings according to this judgment.

<<Registration Processing>>

In performing the registration processing, first, the user creates document data, and registers the document data via the input part 201. The registration processing part 203 stores the document data in the document data storage part 207, and at the same time, determines an identifier (a document identifier) indicating the document data (step ST11 in FIG. 21). For example, for a document containing tags, such as an SGML, only character strings between predetermined tags may be appropriately treated in this processing. Further, the registration processing part 203 acquires partial character strings (tokens) and appearance position information of the tokens from the document data by using the text dividing part 206 (step ST12). Finally, the registration processing part 203 records the document identifier and the appearance position information of the tokens in the small-scale full-text index-for-registration storage part 209 (step ST13). To "record" in step ST13 is a recording to the full-text index of the storage part (the same applies hereinafter), and the process as in step ST13 is also referred to as index storage step. Besides, the text dividing part 206 may use a dividing method, such as a method of making an N character group a token, or a method of performing a morphological analysis and making a word a token. The following examples will be described with the text dividing part 206 using the method of making an N character group a token; however, the examples are similarly applicable to the method of performing a morphological analysis and making a word a token. Besides, a merge processing is timely performed after the recording in step ST13 (steps ST14-ST16), which is described hereinafter.

Besides, the full-text index of the inverted-file method performed with the text dividing part 206 is substantially the same as described above with reference to FIG. 17.

<<Deletion Processing>>

In performing the deletion processing, first, the user inputs a document identifier of a document to be deleted via the input part 201. Next, the deletion processing part 204 reads document data corresponding to the document identifier from the document data storage part 207 (step ST21 in FIG. 22). Further, the deletion processing part 204 acquires partial character strings (tokens) and appearance position information of the tokens from the document data by using the text dividing part 206 (step ST22). For example, for a document containing tags, such as an SGML, only character strings between predetermined tags may be appropriately treated in this processing. The deletion processing part 204 judges whether the document identifier is registered in the small-scale full-text index-for-registration (step ST23). When the document identifier is registered in the small-scale full-text index-for-registration, the appearance position information of the tokens is deleted from the small-scale full-text index-for-registration storage part 209 (step ST25). When the document identifier is not registered in the small-scale full-text index-for-registration (i.e., when the document identifier is registered in the large-scale full-text index-for-search), the document identifier and the appearance position information of the tokens are recorded in the small-scale full-text index-for-deletion storage part 210 (step ST24). Subsequently, the deletion processing part 204 deletes the document data corresponding to the document identifier from the document data storage part 207 (step ST29). Besides, a merge processing is timely performed after the recording in step ST24 (steps ST26-ST28), which is described hereinafter.

<<Search Processing>>

In performing the search processing, first, the user inputs a search character string via the input part 201. Next, the search processing part 205 acquires tokens from the search character string by using the text dividing part 206 (step ST4 in FIG. 20). Besides, the search processing part 205 obtains a set (Rs) of document identifiers of document data containing the search character string by using the large-scale full-text index-for-search of the large-scale full-text index-for-search storage part 208 (step ST5), and obtains a set (Ri) of document identifiers of document data containing the search character string by using the small-scale full-text index-for-registration of the small-scale full-text index-for-registration storage part 209 (step ST6). Further, the search processing part 205 obtains a set (Rd) of document identifiers of document data containing the search character string by using the small-scale full-text index-for-deletion of the small-scale full-text index-for-deletion storage part 210 (step ST7). The search processing part 205 performs the following set operation to the obtained sets (Rs, Ri, Rd) of the document identifiers so as to obtain a search result (R) (step ST8), and outputs the search result (R) as a set of the document identifiers of the document data containing the search character string to the user via the output part 202 (step ST9).

$$R=Rs+Ri-Rd,$$

wherein + represents a logical OR operator, and − represents a logical NOT operator.

Besides, the search processing performed with the text dividing part 206 is substantially the same as described above by taking the full-text index 163 shown in FIG. 17 as an example.

<<Merge Processing>>

The merge processing by the merging part 211 replaces the processing of the data transfer part described in the above-mentioned latter patent application filed by the applicant of the present application.

Compared with a case of performing a registration/deletion processing by using original document data, directly using inverted lists already created upon a start of the processing does not require a time for dividing tokens and creating inverted lists by a text dividing process, thereby shortening a time of data transfer processing. In the present embodiment, since the processing is performed between inverted lists, the data transfer processing (data transfer step) is also referred to as merge processing (merging step). Since the registration/deletion processing of document data in the full-text search device is performed between inverted lists, inverted lists already created upon registration/deletion of data with respect to the full-text index-for-search are directly used, thereby shortening a time of the merge processing to the full-text index-for-search, and shortening a waiting time of the search processing.

In performing the merge processing, first, with respect to all of tokens in the small-scale full-text index-for-registration, (a) a process of extracting inverted lists of the tokens from the full-text index (step ST14 in FIG. 21), and (b) a process of adding the inverted lists to an end of inverted lists of the corresponding tokens in the large-scale full-text index-for-search (step ST15), are performed. Next, the small-scale full-text index-for-registration is emptied (step ST16). Besides, with respect to all of tokens in the small-scale full-text index-for-deletion, (c) a process of extracting inverted lists of the tokens from the full-text index (step ST26 in FIG. 22), and (d) a process of deleting appearance position information included in the extracted inverted lists from inverted lists of the corresponding tokens in the large-scale full-text index-for-search (step ST27), are performed. Next, the small-scale full-text index for-deletion is emptied (step ST28).

Besides, the merge processing of the inverted lists according to the present embodiment is substantially the same as described above with reference to FIG. 18.

<<Form 1 of Merge Processing>>

The merge processing is started by the registration processing part 203 when a number of document identifies registered in the small-scale full-text index-for-registration in the small-scale full-text index-for-registration storage part 209 reaches a predetermined number, and is performed by the merging part 211.

According to the form 1 of the merge processing, using the number of registered document identifies as a starting condition does not require a management of the size of the full-text index storage part, providing an advantage of the processing to be performed with ease.

<<Form 2 of Merge Processing>>

The merge processing may be started by the registration processing part 203 when a storage capacity (size) in the small-scale full-text index-for-registration storage part 209 becomes a predetermined size, and be performed by the merging part 211. According to the form 2 of the merge processing, when document data registered from a user varies in size, the merge processing can be prevented from starting before a time for registration to the small-scale full-text index-for-registration becomes long when small document data is continuously registered. Using the size as a starting condition equalizes the merge processing time.

<<Form 3 of Merge Processing>>

The merge processing of the small-scale full-text index-for-deletion may be started by the deletion processing part 204, and be performed by the merging part 211, upon a starting condition of when a number of document identifies registered in the small-scale full-text index-for-deletion reaches a predetermined number.

<<Form 4 of Merge Processing>>

The merge processing of the small-scale full-text index-for-deletion may be started by the deletion processing part 204, and be performed by the merging part 211, upon a starting condition of when a size of the small-scale full-text index-for-deletion storage part 210 reaches a predetermined size.

According to the forms 3 and 4 of the merge processing, when the deletion processing does not take place frequently, there is an advantage of shortening the time of the merge processing.

According to the above-described forms of the merge processing, the full-text search device can start the merge processing of the full-text indexes on conditions appropriate for characteristics of document data to be registered/deleted and/or characteristics of a field where the device is used, thereby reducing a number of occurrences of the merge processing, and improving the throughput of the system as a whole. Besides, the merge processing involved with the registration processing, and the merge processing involved with the deletion processing may be started simultaneously under either of the starting conditions.

Thus, in the full-text search device according to the present embodiment, the data transfer part (the merging part 211) for data transferring from the small-scale full-text indexes to the large-scale full-text index uses, not original document data, but inverted lists composing the full-text indexes of the inverted-file method so as to shorten a time required for data transferring.

Embodiment 9

Next, a description will be given of a full-text search device according to a ninth embodiment of the present invention, in which a write delay database management method/device, which is described in still another patent application filed also by the applicant of the present application, is applied to the full-text search device according to the foregoing embodiment. The full-text search device according to the present embodiment solves a problem that, while performing a data transfer (a merge processing of inverted lists) from a small-scale full-text index for registration or for deletion to a large-scale full-text index for search, the small-scale full-text index storage part for registration or for deletion cannot be used, and a registration processing or a deletion processing cannot be performed.

Figure 23:
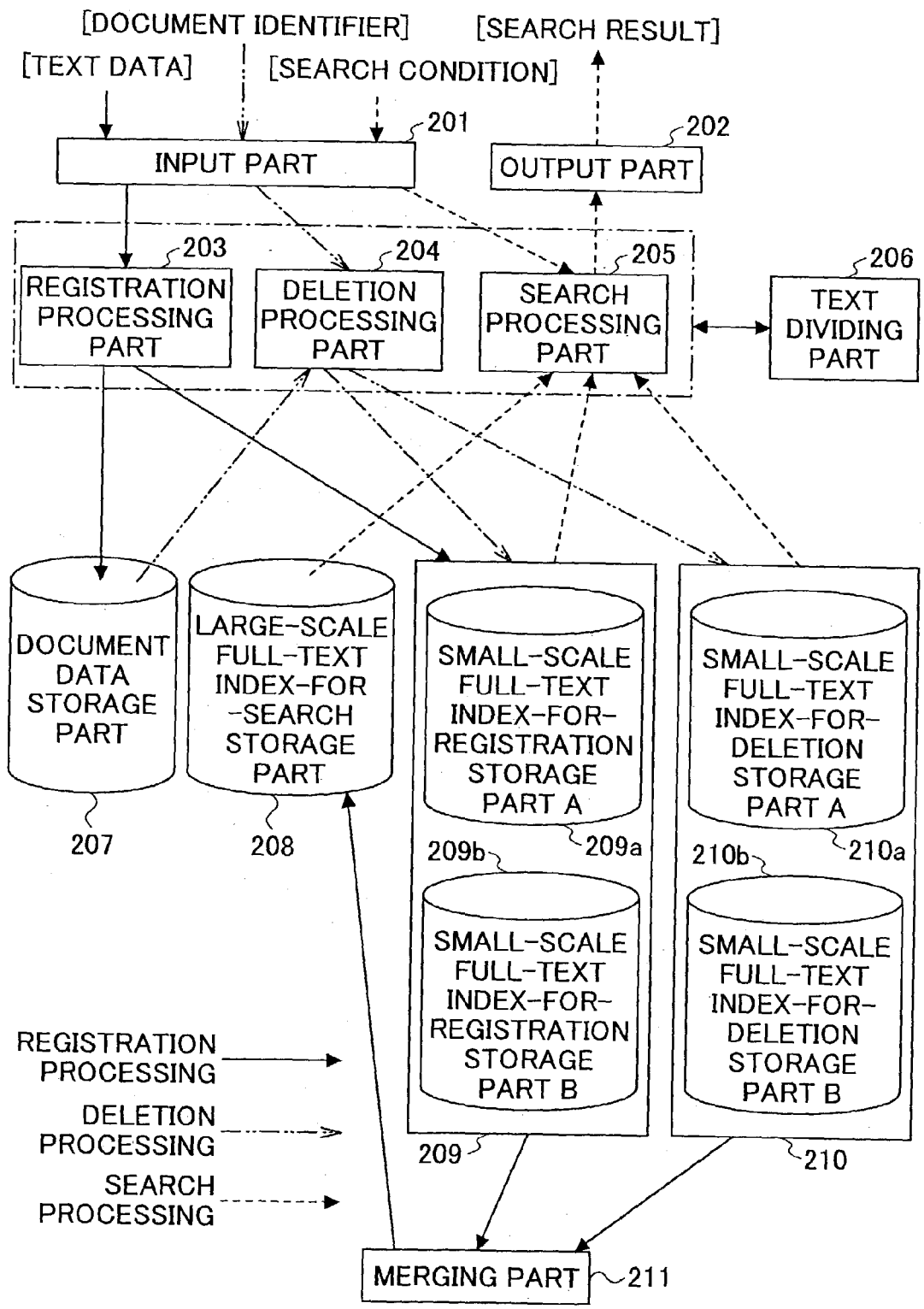
FIG. 23 is a block diagram for explaining a full-text search device according to a ninth embodiment of the present invention.

FIG. 23 is a block diagram for explaining the full-text search device according to the ninth embodiment of the present invention.

In the full-text search device according to the present ninth embodiment, two small-scale full-text indexes for registration and two small-scale full-text indexes for deletion are prepared so that, while performing a merging (a data transfer) from one small-scale full-text index to a large-scale full-text index, the other small-scale full-text index is used so as to perform a registration processing or a deletion processing, thereby eliminating a period during which a processing is impossible. That is, in the full-text search device according to the present ninth embodiment, providing the two small-scale full-text indexes for registration enables the registration processing to be performed even while the merge processing is being performed, and providing the two small-scale full-text indexes for deletion enables the deletion processing to be performed even while the merge processing is being performed. The present ninth embodiment is preferable for cases where the registration processing and the merge processing involved therewith are continuously performed frequently, such as when documents are read by a scanner etc., are subjected to OCR processing, and are registered successively. The full-text search becomes possible for such image data with a high response as well as for common application data.

In the present ninth embodiment, the small-scale full-text index-for-registration storage part 209 described with reference to FIG. 19 includes two storage parts, i.e., a small-scale full-text index-for-registration storage part A (209*a*) and a small-scale full-text index-for-registration storage part B (209*b*). The small-scale full-text index-for-deletion storage part 210 described with reference to FIG. 19 includes two storage parts, i.e., a small-scale full-text index-for-deletion storage part A (210*a*) and a small-scale full-text index-for-deletion storage part B (210*b*). Besides, the hardware configurations shown in FIG. 15 and FIG. 16 are also applicable to the full-text search device according to the present ninth embodiment. Besides, it is also effective to provide one or more of the above-mentioned storage parts on a memory, not on the storage device 125 or 153.

Hereinafter, a detailed description will be given of an example of operations of the full-text search device according to the present ninth embodiment.

Figure 24:
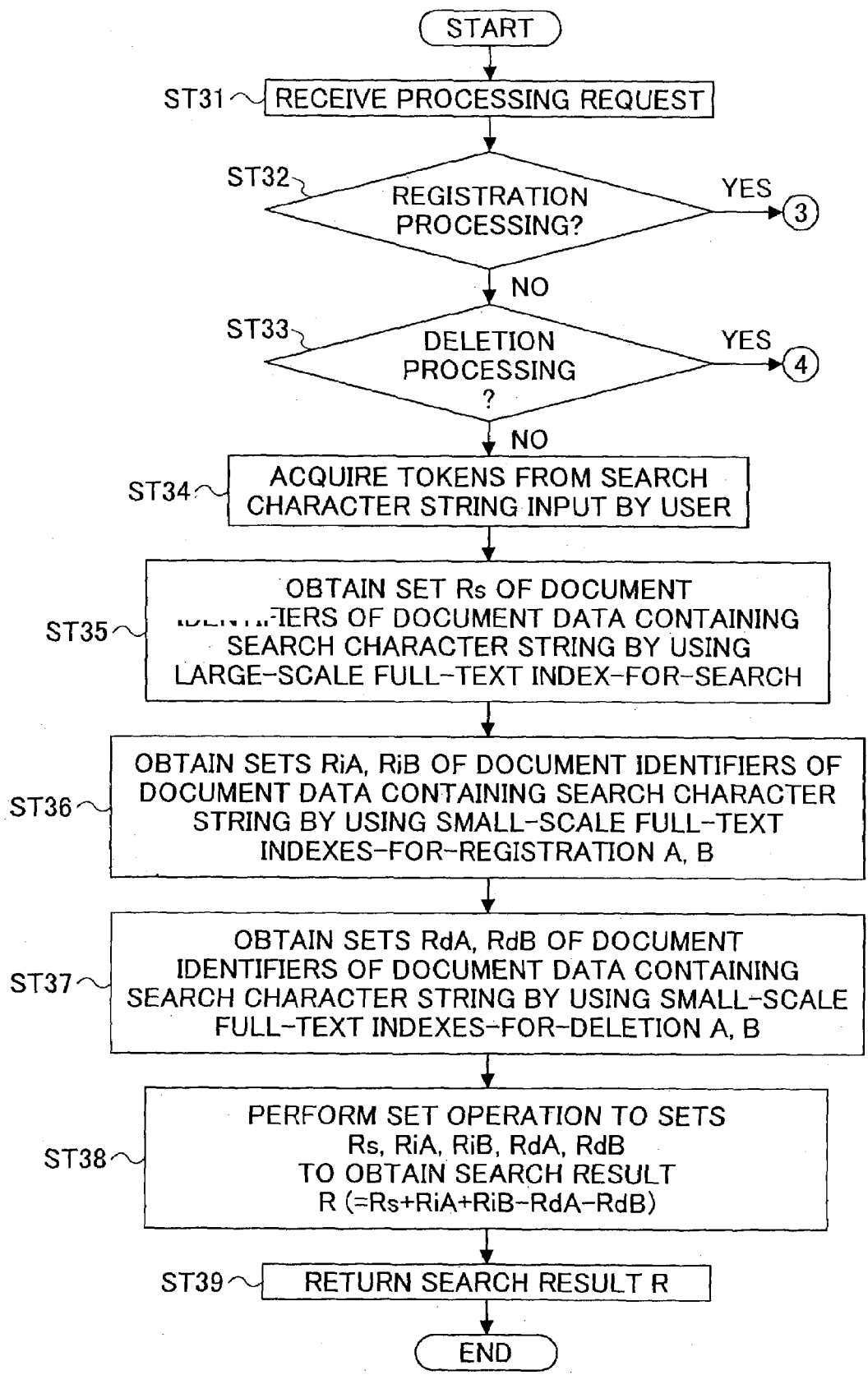
FIG. 24 is a first flowchart for explaining an example of processing in the full-text search device shown in FIG. 23.
Figure 25:
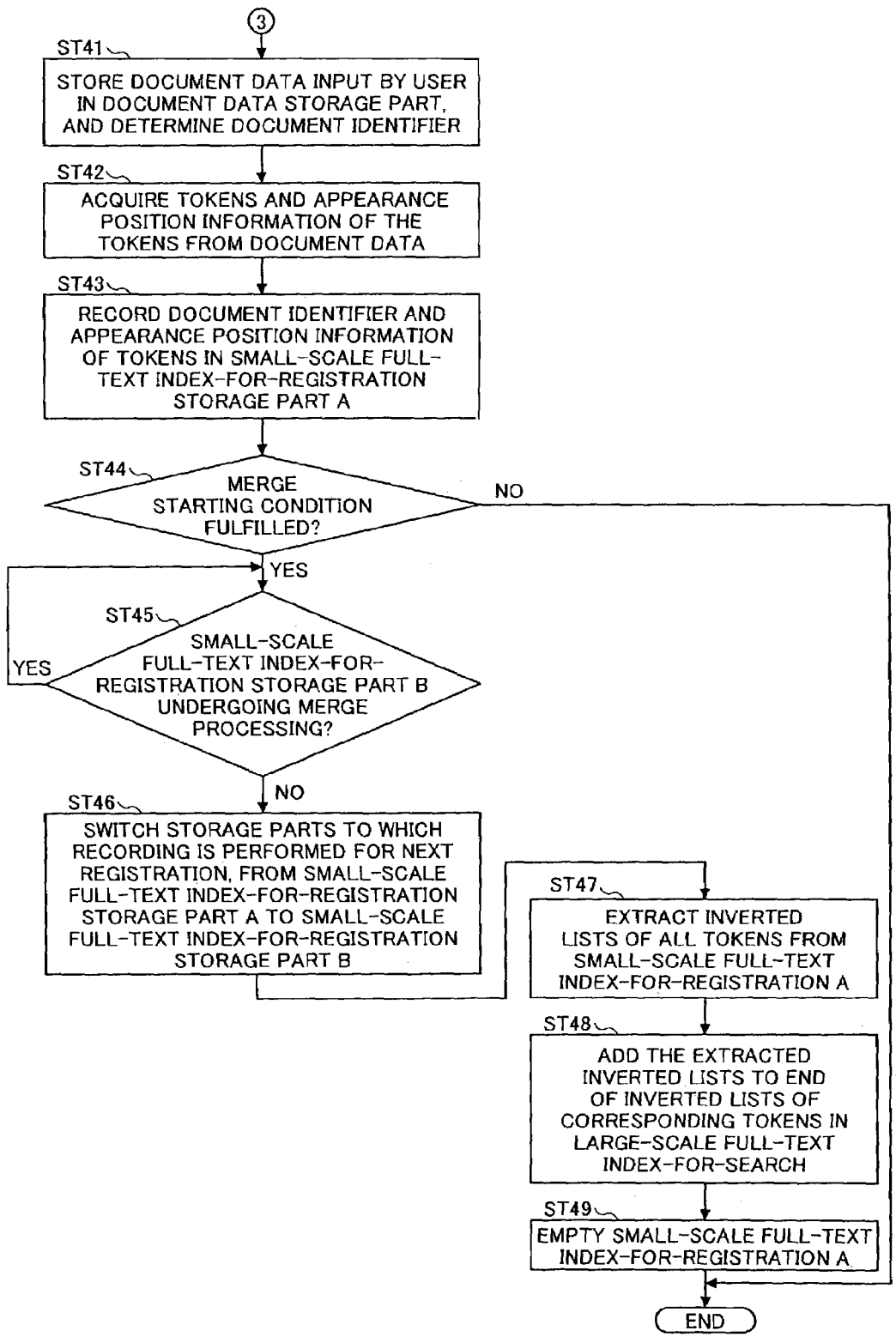
FIG. 25 is a second flowchart for explaining an example of processing in the full-text search device shown in FIG. 23.
Figure 26:
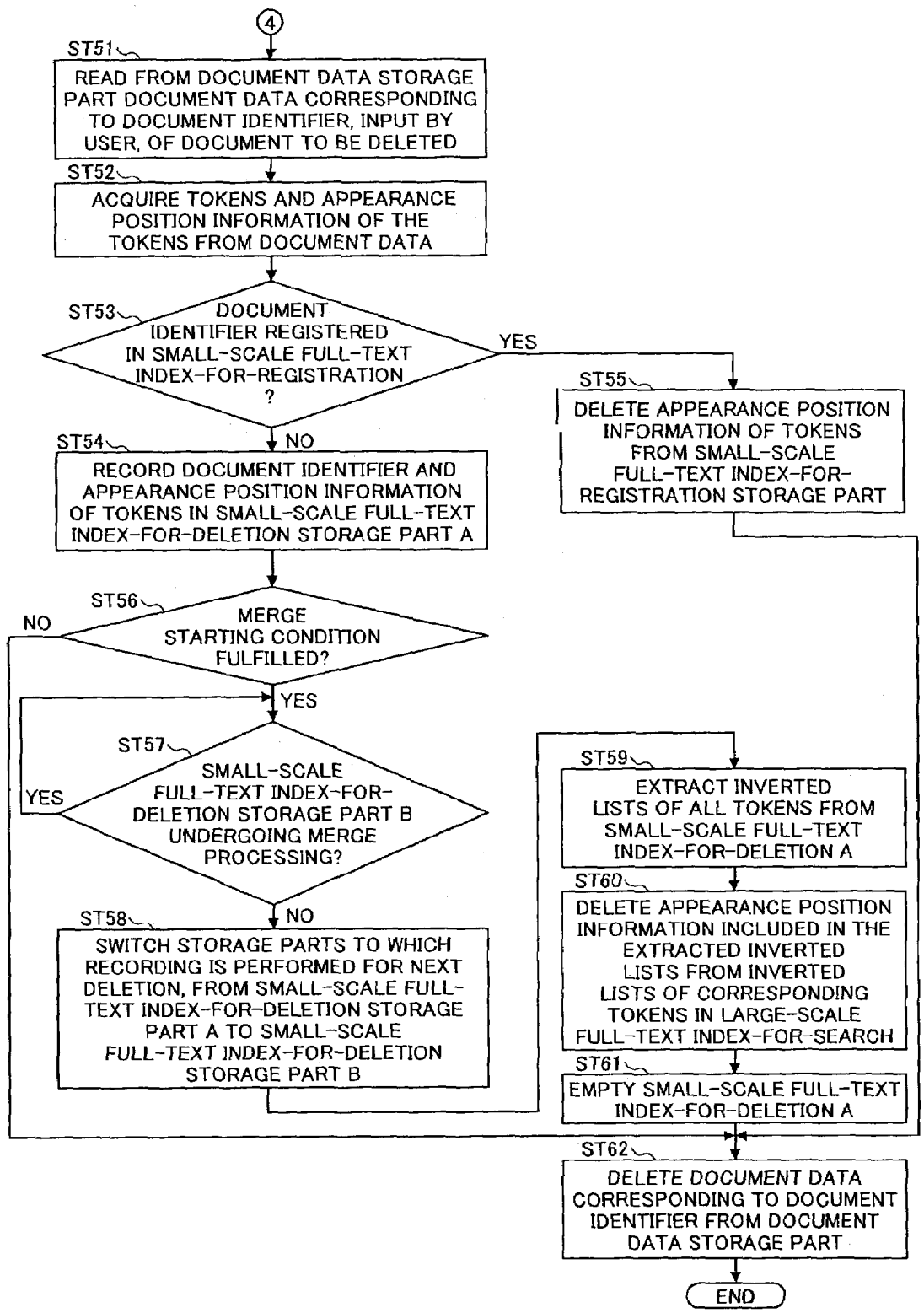
FIG. 26 is a third flowchart for explaining an example of processing in the full-text search device shown in FIG. 23.

FIG. 24 to FIG. 26 are flowcharts for explaining an example of processing in the full-text search device shown in FIG. 23.

When the full-text search device receives a processing request from a user (step ST31), first, the full-text search device judges whether the processing is the registration processing (step ST32), whether the processing is the deletion processing (step ST33), and whether the processing is the search processing (NO in step ST33). The full-text search device performs either of the following processings according to this judgment.

<<Registration Processing>>

In performing the registration processing, first, the user creates document data, and registers the document data via the input part 201. The registration processing part 203 stores the document data in the document data storage part 207, and at the same time, determines an identifier (a document identifier) indicating the document data (step ST41 in FIG. 25). Further, the registration processing part 203 acquires partial character strings (tokens) and appearance position information of the tokens from the document data by using the text dividing part 206 (step ST42). Besides, the dividing method and the full-text index are substantially the same as described above. The registration processing part 203 records the document identifier and the appearance position information of the tokens in the small-scale full-text index-for-registration storage part at that point (for example, the small-scale full-text index-for-registration storage part A (209*a*)) (step ST43).

A merge processing is timely performed after the recording in step ST43. In the present example, the merge processing is performed according to a predetermined merge starting condition. First, as a result of the recording in step ST43, the registration processing part 203 judges whether the merge starting condition is fulfilled (step ST44). When the merge starting condition is not fulfilled (NO in step ST44), the processing is ended. Besides, the starting conditions of the forms of the merge processing described above in the foregoing embodiments are also applicable to the present ninth embodiment. When the merge starting condition is fulfilled (YES in step ST44), the registration processing part 203 judges whether the other small-scale full-text index-for-registration storage part (in this example, the small-scale full-text index-for-registration storage part B (209*b*)) is undergoing a merge processing (step ST45). When the other small-scale full-text index-for-registration storage part B (209*b*) is undergoing a merge processing (YES in step ST45), the registration processing part 203 waits for the merge processing to end.

When the merge starting condition is fulfilled, and the other small-scale full-text index-for-registration storage part B (209*b*) is not undergoing a merge processing (NO in step ST45), the registration processing part 203 starts the hereinafter-described merge processing (steps ST47-ST49) with respect to a small-scale full-text index-for-registration A in the small-scale full-text index-for-registration storage part A (209*a*), and switches the storage parts to which the recording is performed for a next registration processing, from the small-scale full-text index-for-registration storage part A (209*a*) to the other small-scale full-text index-for-registration storage part B (209*b*) (step ST46). When the merge processing is started, the merging part 211 performs the merge processing asynchronously with the registration processing part 203.

<<Deletion Processing>>

In performing the deletion processing, first, the user inputs a document identifier of a document to be deleted via the input part 201. Next, the deletion processing part 204 reads document data corresponding to the document identifier from the document data storage part 207 (step ST51 in FIG. 26). Further, the deletion processing part 204 acquires partial character strings (tokens) and appearance position information of the tokens from the document data by using the text dividing part 206 (step ST52).

Next, the deletion processing part 204 judges whether the document identifier is registered in the small-scale full-text index-for-registration (step ST53). When the document identifier is registered in the small-scale full-text index-for-registration, the appearance position information of the tokens is deleted from the small-scale full-text index-for-registration storage part 209 (209*a* and 209*b*) (step ST55). When the document identifier is not registered in the small-scale full-text index-for-registration (i.e., when the document identifier is registered in the large-scale full-text index-for-search), the document identifier and the appearance position information of the tokens are recorded in the small-scale full-text index-for-deletion storage part at that point (for example, the small-scale full-text index-for-deletion storage part A (210*a*)) (step ST54). Subsequently, the deletion processing part 204 deletes the document data corresponding to the document identifier from the document data storage part 207 (step ST62).

A merge processing is timely performed after the recording in step ST54. In the present example, the merge processing is performed according to a predetermined merge starting condition. First, as a result of the recording in step ST54, the deletion processing part 204 judges whether the merge starting condition is fulfilled (step ST56). When the merge starting condition is not fulfilled (NO in step ST56), the processing is ended after step ST62 is performed. Besides, as mentioned above, the starting conditions of the forms of the merge processing described above in the foregoing embodiments are also applicable to the present ninth embodiment. When the merge starting condition is fulfilled (YES in step ST56), the deletion processing part 204 judges whether the other small-scale full-text index-for-deletion storage part (in this example, the small-scale full-text index-for-deletion storage part B (210*b*)) is undergoing a merge processing (step ST57). When the other small-scale full-text index-for-deletion storage part B (210*b*) is undergoing a merge processing (YES in step ST57), the deletion processing part 204 waits for the merge processing to end.

When the merge starting condition is fulfilled, and the other small-scale full-text index-for-deletion storage part B (210*b*) is not undergoing a merge processing (NO in step ST57), the deletion processing part 204 starts the hereinafter-described merge processing (steps ST59-ST61) with respect to a small-scale full-text index-for-deletion A in the small-scale full-text index-for-deletion storage part A (210*a*), and switches the storage parts to which the recording is performed for a next deletion processing, from the small-scale full-text index-for-deletion storage part A (210*a*) to the other small-scale full-text index-for-deletion storage part B (210*b*) (step ST58). When the merge processing is started, the merging part 211 performs the merge processing asynchronously with the deletion processing part 204.

<<Search Processing>>

In performing the search processing, first, the user inputs a search character string via the input part 201. Next, the search processing part 205 acquires tokens from the search character string by using the text dividing part 206 (step ST34 in FIG. 24). Besides, the search processing part 205 obtains a set (Rs) of document identifiers of document data containing the search character string by using the large-scale full-text index-for-search of the large-scale full-text index-for-search storage part 208 (step ST35). The search processing part 205 obtains a set (RiA) of document identifiers of document data containing the search character string by using the small-scale full-text index-for-registration A of the small-scale full-text index-for-registration storage part A (209a), and obtains a set (RiB) of document identifiers of document data containing the search character string by using a small-scale full-text index-for-registration B of the small-scale full-text index-for-registration storage part B (209b) (step ST36). Further, the search processing part 205 obtains a set (RdA) of document identifiers of document data containing the search character string by using the small-scale full-text index-for-deletion A of the small-scale full-text index-for-deletion storage part A (210a), and obtains a set (RdB) of document identifiers of document data containing the search character string by using a small-scale full-text index-for-deletion B of the small-scale full-text index-for-deletion storage part B (210b) (step ST37).

The search processing part 205 performs the following set operation to the obtained sets (Rs, RiA, RiB, RdA, RdB) of the document identifiers so as to obtain a search result (R) (step ST38), and outputs the search result (R) as a set of the document identifiers of the document data containing the search character string to the user via the output part 202 (step ST39).

$$R=Rs+RiA+RiB-RdA-RdB,$$

wherein + represents a logical OR operator, and − represents a logical NOT operator.

<<Merge Processing>>

In performing the merge processing of the small-scale full-text index-for-registration, with respect to all of tokens in the small-scale full-text index-for-registration for which the merge processing is started (in this example, the small-scale full-text index-for-registration A), (a) a process of extracting inverted lists of the tokens from the full-text index (step ST47 in FIG. 25), and (b) a process of adding the inverted lists to an end of inverted lists of the corresponding tokens in the large-scale full-text index-for-search (step ST48), are performed. Next, the small-scale full-text index-for-registration A is emptied (step ST49).

In performing the merge processing of the small-scale full-text index-for-deletion, with respect to all of tokens in the small-scale full-text index-for-deletion for which the merge processing is started (in this example, the small-scale full-text index-for-deletion A), (c) a process of extracting inverted lists of the tokens from the full-text index (step ST59 in FIG. 26), and (d) a process of deleting appearance position information included in the extracted inverted lists from inverted lists of the corresponding tokens in the large-scale full-text index-for-search (step ST60), are performed. Next, the small-scale full-text index-for-deletion A is emptied (step ST61).

Besides, the merge processing of the inverted lists according to the present embodiment is substantially the same as described above with reference to FIG. 18.

Embodiment 10

Next, a description will be given, with reference to FIG. 27 to FIG. 30, of a full-text search device according to a tenth embodiment of the present invention, in which three or more small-scale full-text index-for-registration storage parts and/or three or more small-scale full-text index-for-deletion storage parts are used in the full-text search device according to the foregoing ninth embodiment.

Figure 27:
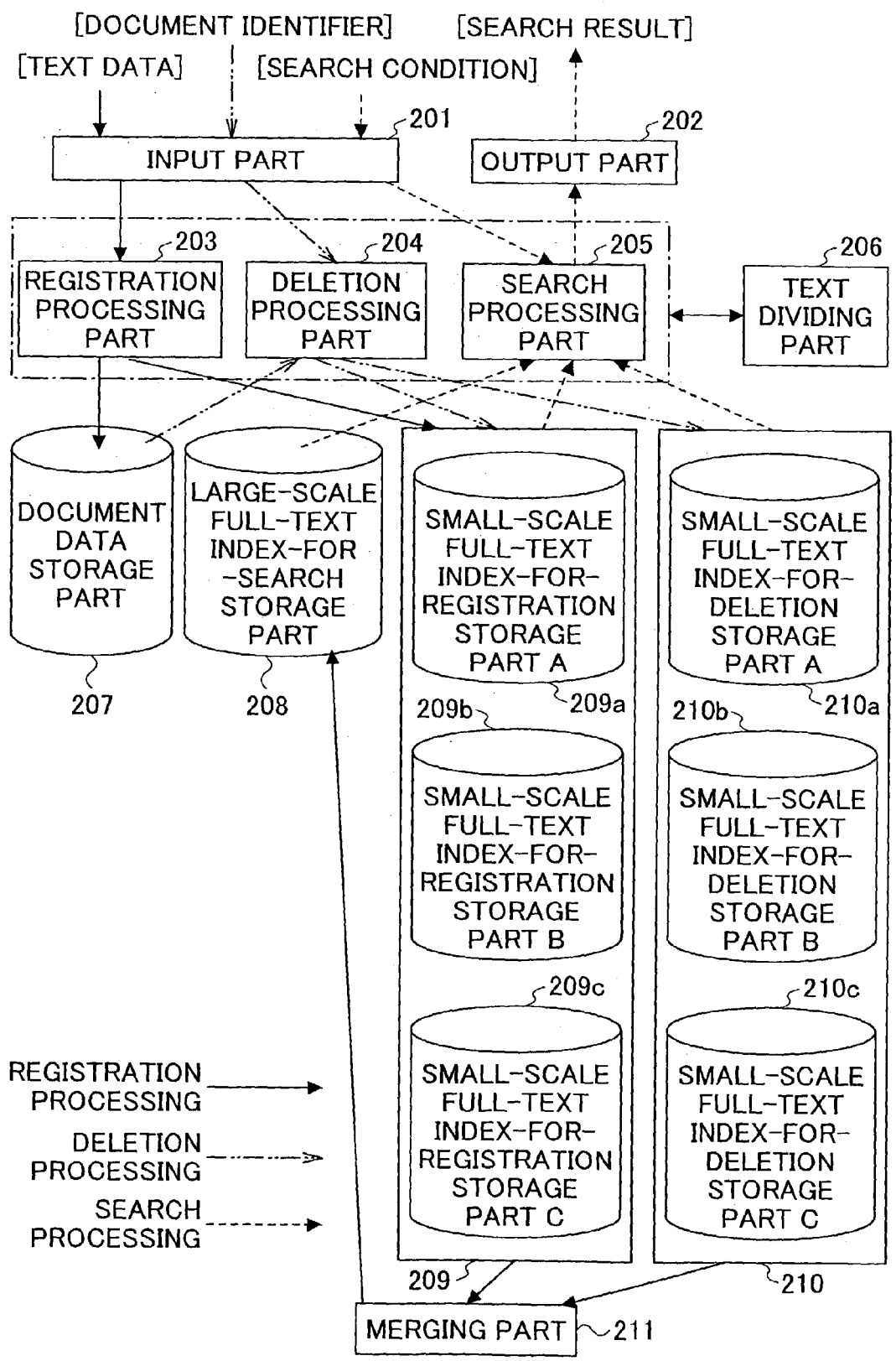
FIG. 27 is a block diagram for explaining a full-text search device according to a tenth embodiment of the present invention.

FIG. 27 is a block diagram for explaining the full-text search device according to the tenth embodiment of the present invention.

In the full-text search device according to the present tenth embodiment, three or more small-scale full-text indexes for registration and three or more small-scale full-text indexes for deletion are prepared (each described as three in this example) so that, while performing a merging (a data transfer) from two of the small-scale full-text indexes to a large-scale full-text index, the other small-scale full-text index is used so as to perform a registration processing or a deletion processing, thereby eliminating a period during which a processing is impossible. That is, in the full-text search device according to the present tenth embodiment, providing a plurality of small-scale full-text indexes for registration enables the registration processing to be performed even while the merge processing is being performed with respect to the other small-scale full-text indexes for registration and even while other registration processing is being performed; also, providing a plurality of small-scale full-text indexes for deletion enables the deletion processing to be performed even while the merge processing is being performed with respect to the other small-scale full-text indexes for deletion and even while other deletion processing is being performed. In actuality, since registration or deletion is processed in a shorter time than merging, it is assumed that the merge processings more often coincide.

In the present tenth embodiment, the small-scale full-text index-for-registration storage part 209 described with reference to FIG. 19 includes three storage parts, i.e., the small-scale full-text index-for-registration storage part A (209a), the small-scale full-text index-for-registration storage part B (209b) and a small-scale full-text index-for-registration storage part C (209c). The small-scale full-text index-for-deletion storage part 210 described with reference to FIG. 19 includes three storage parts, i.e., the small-scale full-text index-for-deletion storage part A (210a), the small-scale full-text index-for-deletion storage part B (210b) and a small-scale full-text index-for-deletion storage part C (210c). Besides, the hardware configurations shown in FIG. 15 and FIG. 16 are also applicable to the full-text search device according to the present tenth embodiment. Besides, it is also effective to provide one or more of the above-mentioned storage parts on a memory, not on the storage device 125 or 153.

Hereinafter, a detailed description will be given of an example of operations of the full-text search device according to the present tenth embodiment.

Figure 28:
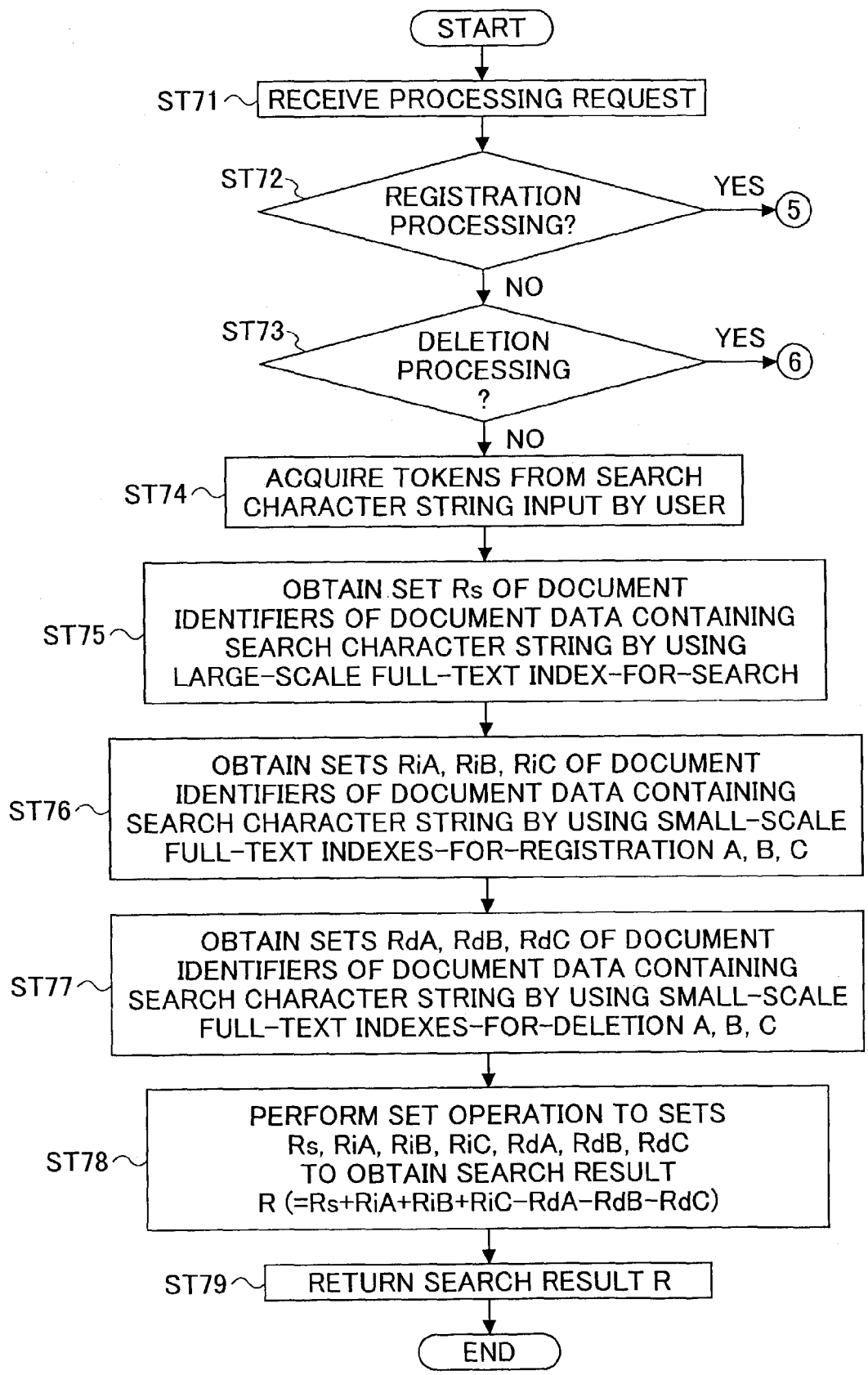
FIG. 28 is a first flowchart for explaining an example of processing in the full-text search device shown in FIG. 27.
Figure 29:
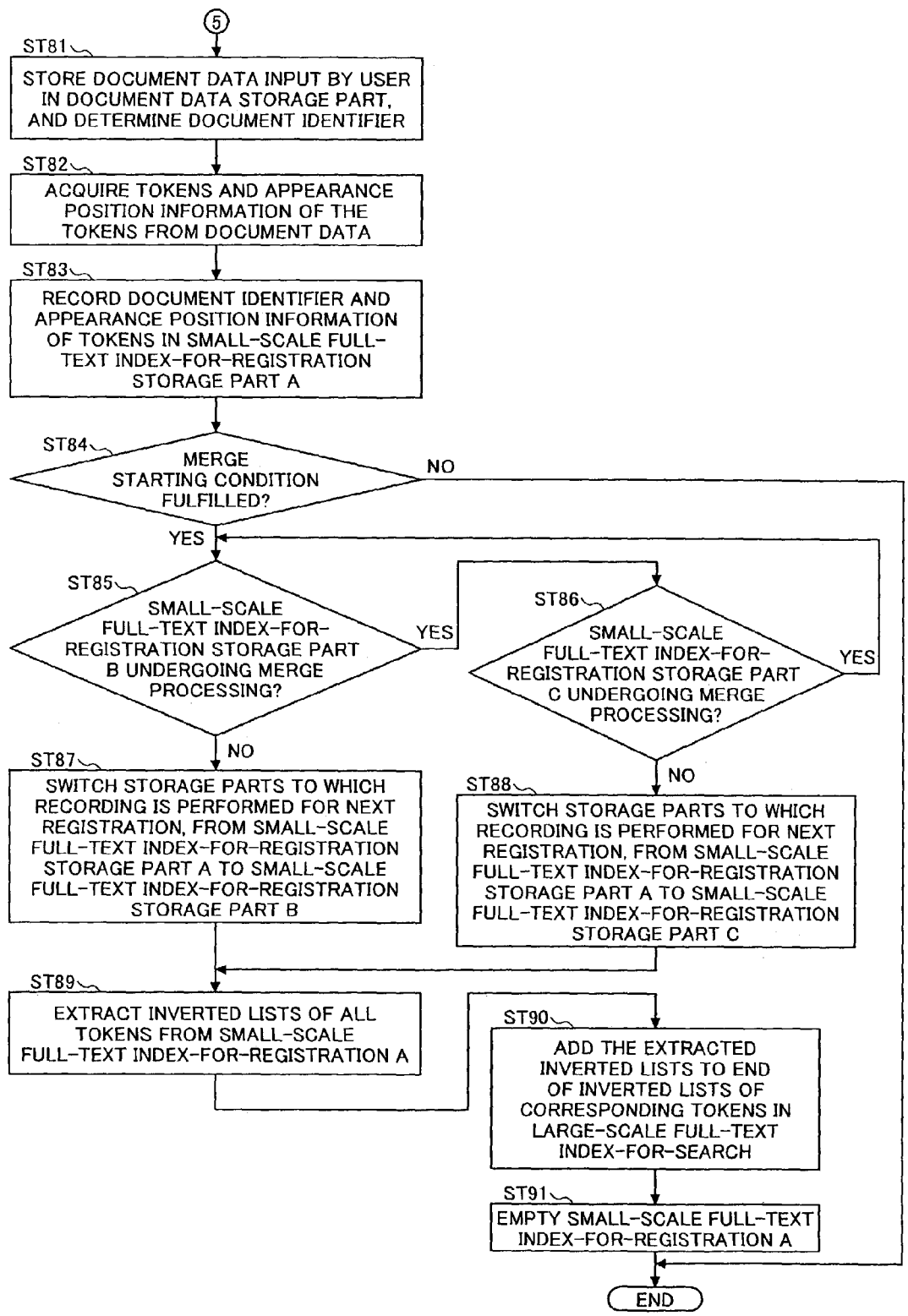
FIG. 29 is a second flowchart for explaining an example of processing in the full-text search device shown in FIG. 27.
Figure 30:
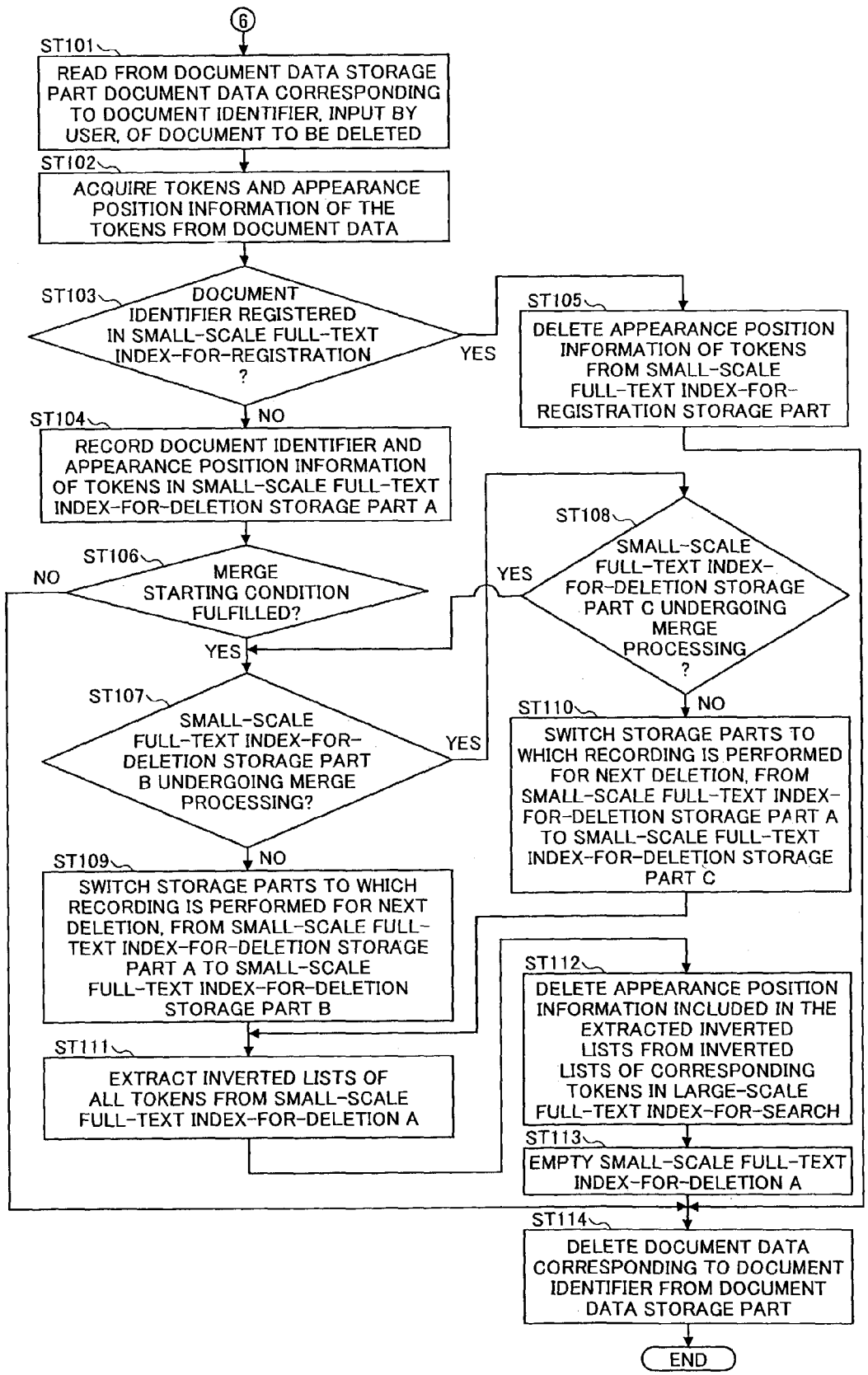
FIG. 30 is a third flowchart for explaining an example of processing in the full-text search device shown in FIG. 27.

FIG. 28 to FIG. 30 are flowcharts for explaining an example of processing in the full-text search device shown in FIG. 27.

When the full-text search device receives a processing request from a user (step ST71), first, the full-text search device judges whether the processing is the registration processing (step ST72), whether the processing is the deletion processing (step ST73), and whether the processing is the search processing (NO in step ST73). The full-text search device performs either of the following processings according to this judgment.

<<Registration Processing>>

In performing the registration processing, first, the user creates document data, and registers the document data via the input part 201. The registration processing part 203 stores the document data in the document data storage part 207, and at the same time, determines an identifier (a document identifier) indicating the document data (step ST81 in FIG. 29). Further, the registration processing part 203 acquires partial character strings (tokens) and appearance position information of the tokens from the document data by using the text dividing part 206 (step ST82). Besides, the dividing method and the full-text index are substantially the same as described above. The registration processing part 203 records the document identifier and the appearance position information of the tokens in the small-scale full-text index-for-registration storage part at that point (for example, the small-scale full-text index-for-registration storage part A (209a)) (step ST83).

A merge processing is timely performed after the recording in step ST83. In the present example, the merge processing is performed according to a predetermined merge starting condition. First, as a result of the recording in step ST83, the registration processing part 203 judges whether the merge starting condition is fulfilled (step ST84). When the merge starting condition is not fulfilled (NO in step ST84), the processing is ended. Besides, the starting conditions of the forms of the merge processing described above in the foregoing embodiments are also applicable to the present tenth embodiment. When the merge starting condition is fulfilled (YES in step ST84), the registration processing part 203 judges whether another small-scale full-text index-for-registration storage part (in this example, the small-scale full-text index-for-registration storage part B (209b)) is undergoing a merge processing (step ST85). When the small-scale full-text index-for-registration storage part B (209b) is undergoing a merge processing (YES in step ST85), the registration processing part 203 judges whether the third small-scale full-text index-for-registration storage part (in this example, the small-scale full-text index-for-registration storage part C (209c)) is undergoing a merge processing (step ST86). Besides, in step ST85 and step ST86, the registration processing part 203 also judges whether each of the small-scale full-text index-for-registration storage parts B (209b) and C (209c) is undergoing a registration processing. When the small-scale full-text index-for-registration storage part C (209c) is undergoing a merge processing (YES in step ST86), the registration processing part 203 waits for the merge processing to end. Herein, the most assumed case concerning the judgments regarding the merge processing is explained.

When the merge starting condition is fulfilled, and either of the other small-scale full-text index-for-registration storage parts B (209b) and C (209c) is not undergoing a merge processing (NO in step ST85/ST86), the registration processing part 203 starts the same merge processing (steps ST89-ST91) as in steps ST47-ST49 shown in FIG. 25 with respect to the small-scale full-text index-for-registration A in the small-scale full-text index-for-registration storage part A (209a), and switches the storage parts to which the recording is performed for a next registration processing, from the small-scale full-text index-for-registration storage part A (209a) to another small-scale full-text index-for-registration storage part B (209b)/C (209c) (i.e., the storage part not undergoing a merge processing, which is expressed in the same manner hereinafter) (step ST87/ST88). When the merge processing is started, the merging part 211 performs the merge processing asynchronously with the registration processing part 203.

<<Deletion Processing>>

In performing the deletion processing, first, the user inputs a document identifier of a document to be deleted via the input part 201. Next, the deletion processing part 204 reads document data corresponding to the document identifier from the document data storage part 207 (step ST101 in FIG. 30). Further, the deletion processing part 204 acquires partial character strings (tokens) and appearance position information of the tokens from the document data by using the text dividing part 206 (step ST102).

Next, the deletion processing part 204 judges whether the document identifier is registered in the small-scale full-text index-for-registration (step ST103). When the document identifier is registered in the small-scale full-text index-for-registration, the appearance position information of the tokens is deleted from the small-scale full-text index-for-registration storage part 209 (209a, 209b and 209c) (step ST105). When the document identifier is not registered in the small-scale full-text index-for-registration (i.e., when the document identifier is registered in the large-scale full-text index-for-search), the document identifier and the appearance position information of the tokens are recorded in the small-scale full-text index-for-deletion storage part at that point (for example, the small-scale full-text index-for-deletion storage part A (210a)) (step ST104). Subsequently, the deletion processing part 204 deletes the document data corresponding to the document identifier from the document data storage part 207 (step ST114).

A merge processing is timely performed after the recording in step ST104. In the present example, the merge processing is performed according to a predetermined merge starting condition. First, as a result of the recording in step ST104, the deletion processing part 204 judges whether the merge starting condition is fulfilled (step ST106). When the merge starting condition is not fulfilled (NO in step ST106), the processing is ended after step ST114 is performed. Besides, as mentioned above, the starting conditions of the forms of the merge processing described above in the foregoing embodiments are also applicable to the present tenth embodiment. When the merge starting condition is fulfilled (YES in step ST106), the deletion processing part 204 judges whether another small-scale full-text index-for-deletion storage part (in this example, the small-scale full-text index-for-deletion storage part B (210b)) is undergoing a merge processing (step ST107). When the small-scale full-text index-for-deletion storage part B (210b) is undergoing a merge processing (YES in step ST107), the deletion processing part 204 judges whether the third small-scale full-text index-for-deletion storage part (in this example, the small-scale full-text index-for-deletion storage part C (210c)) is undergoing a merge processing (step ST108). Besides, in step ST107 and step ST108, the deletion processing part 204 also judges whether each of the small-scale full-text index-for-deletion storage parts B (210b) and C (210c) is undergoing a deletion processing. When the small-scale full-text index-for-deletion storage part C (210c) is undergoing a merge processing (YES in step ST108), the deletion processing part 204 waits for the merge processing to end. Herein, the most assumed case concerning the judgments regarding the merge processing is explained.

When the merge starting condition is fulfilled, and either of the other small-scale full-text index-for-deletion storage parts B (210b) and C (210c) is not undergoing a merge processing (NO in step ST107/ST108), the deletion processing part 204 starts the same merge processing (steps ST111-ST113) as in steps ST59-ST61 shown in FIG. 26 with respect to the small-scale full-text index-for-deletion A in the small-scale full-text index-for-deletion storage part A (210a), and switches the storage parts to which the recording is performed for a next deletion processing, from the small-scale full-text index-for-deletion storage part A (210a) to another small-scale full-text index-for-deletion storage part B (210b)/C (210c) (step ST109/ST110). When the merge processing is started, the merging part 211 performs the merge processing asynchronously with the deletion processing part 204.

<<Search Processing>>

The search processing according to the present tenth embodiment is basically similar to the search processing described above with reference to FIG. 24, and steps ST34 to ST39 in FIG. 24 correspond to steps ST74 to ST79 in FIG. 28, respectively, except that, in step ST76, the search processing part 205, not only obtains the sets (RiA, RiB), but also obtains a set (RiC) of document identifiers of document data containing the search character string by using a small-scale full-text index-for-registration C of the small-scale full-text index-for-registration storage part C (209c) (step ST76). Further, in step ST77, the search processing part 205, not only obtains the sets (RdA, RdB), but also obtains a set (RdC) of document identifiers of document data containing the search character string by using a small-scale full-text index-for-deletion C of the small-scale full-text index-for-deletion storage part C (210c) (step ST77). The search processing part 205 performs the following set operation to the obtained sets (Rs, RiA, RiB, RiC, RdA, RdB, RdC) of the document identifiers so as to obtain a search result (R) (step ST78), and outputs the search result (R) as a set of the document identifiers of the document data containing the search character string to the user via the output part 202 (step ST79).

$$R=Rs+RiA+RiB+RiC-RdA-RdB-RdC,$$

wherein + represents a logical OR operator, and − represents a logical NOT operator.

Embodiment 11

In the foregoing ninth and tenth embodiments, the full-text search device uses a plurality of small-scale full-text index-for-registration storage parts and/or a plurality of small-scale full-text index-for-deletion storage parts. Next, a description will be given, with reference to FIG. 31 to FIG. 34, of a full-text search device according to an eleventh embodiment of the present invention, which is applicable to a case where these full-text index storage parts (except the large-scale full-text index-for-search storage part) are allocated to individual storage areas on the storage device 125 or 153 shown in FIG. 15 or FIG. 16, or to individual storage areas on a memory, or to a case where these full-text index storage parts (except the large-scale full-text index-for-search storage part) are provided as individual files stored in the storage device 125 or 153 or stored in a memory.

Figure 31:
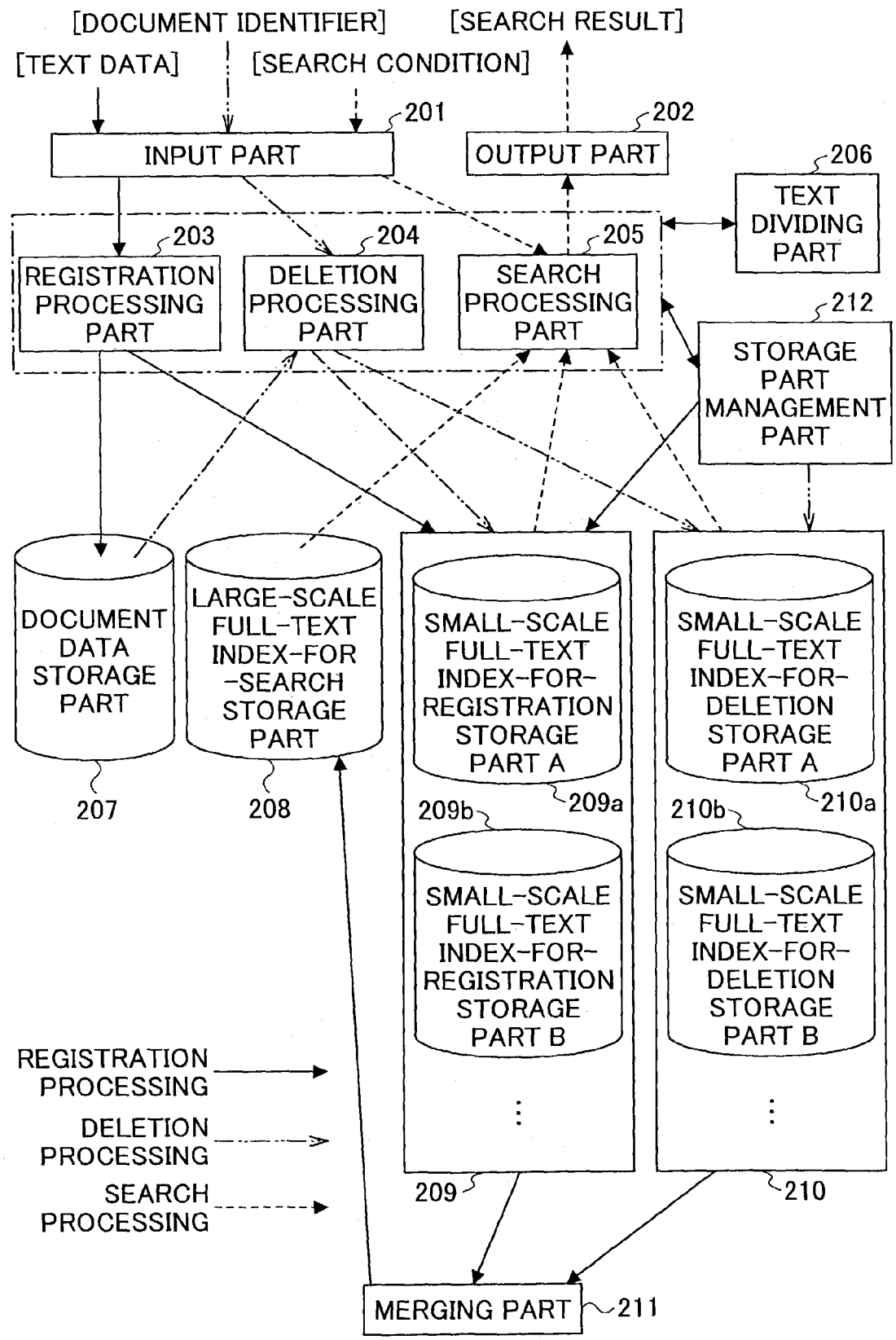
FIG. 31 is a block diagram for explaining a full-text search device according to an eleventh embodiment of the present invention.

FIG. 31 is a block diagram for explaining the full-text search device according to the eleventh embodiment of the present invention.

In the full-text search device according to the present eleventh embodiment, one small-scale full-text index for registration and one small-scale full-text index for deletion are prepared beforehand so that, when there exists no full-text index-for-registration/deletion storage part in which the full-text index-for-registration/deletion can be stored upon registration/deletion processing, such as while performing a merging (a data transfer) from the small-scale full-text index to a large-scale full-text index, another small-scale full-text index is newly created so as to perform the registration processing or the deletion processing, thereby eliminating a period during which a processing is impossible. That is, in the full-text search device according to the present eleventh embodiment, timely providing a plurality of small-scale full-text indexes for registration enables the registration processing to be performed even while the merge processing is being performed with respect to a plurality of small-scale full-text indexes for registration and even while other registration processing is being performed; also, timely providing a plurality of small-scale full-text indexes for deletion enables the deletion processing to be performed even while the merge processing is being performed with respect to a plurality of small-scale full-text indexes for deletion and even while other deletion processing is being performed. In actuality, since registration or deletion is processed in a shorter time than merging, it is assumed that the merge processings more often coincide.

The full-text search device according to the present eleventh embodiment includes a storage part management part 212 managing another small-scale full-text index-for-registration storage part different from the small-scale full-text index-for-registration storage part A (209a). Besides, the storage part management part 212 manages another small-scale full-text index-for-deletion storage part different from the small-scale full-text index-for-deletion storage part A (210a) upon deletion processing. When there exists no full-text index-for-registration storage part in which a full-text index-for-registration can be stored upon registration processing, the storage part management part 212 newly creates another small-scale full-text index-for-registration storage part. Further, the storage part management part 212 deletes an excessive full-text index-for-registration/deletion storage part (not to be used in a next processing).

Besides, in the present eleventh embodiment, the small-scale full-text index-for-registration storage part 209 described with reference to FIG. 19 timely increases a number of storage parts from only the small-scale full-text index-for-registration storage part A (209a) to the small-scale full-text index-for-registration storage parts B (209b), C (209c), D (209d), . . . , (in random order), and timely deletes these storage parts. The small-scale full-text index-for-deletion storage part 210 described with reference to FIG. 19 timely increases a number of storage parts from only the small-scale full-text index-for-deletion storage part A (210a) to the small-scale full-text index-for-deletion storage parts B (210b), C (210c), D (210d), . . . , (in random order), and timely deletes these storage parts.

By using the timely created/deleted small-scale full-text index-for-registration storage parts, while performing a process of merging data from one of the full-text index-for-registration storage parts to the large-scale full-text index-for-search storage part 208 (or other registration processing), the registration processing part 203 uses another full-text index-for-registration storage part so as to perform a registration processing. On the other hand, by using the timely created/deleted small-scale full-text index-for-deletion storage parts, while performing a process of merging data from one of the full-text index-for-deletion storage parts to the large-scale full-text index-for-search storage part 208 (or other deletion processing), the deletion processing part 204 uses another full-text index-for-deletion storage part so as to perform a deletion processing. Besides, the hardware configurations shown in FIG. 15 and FIG. 16 are also applicable to the full-text search device according to the present eleventh embodiment. Besides, it is also effective to provide one or more of the above-mentioned storage parts on a memory, not on the storage device 125 or 153.

Hereinafter, a detailed description will be given of an example of operations of the full-text search device according to the present eleventh embodiment.

Figure 32:
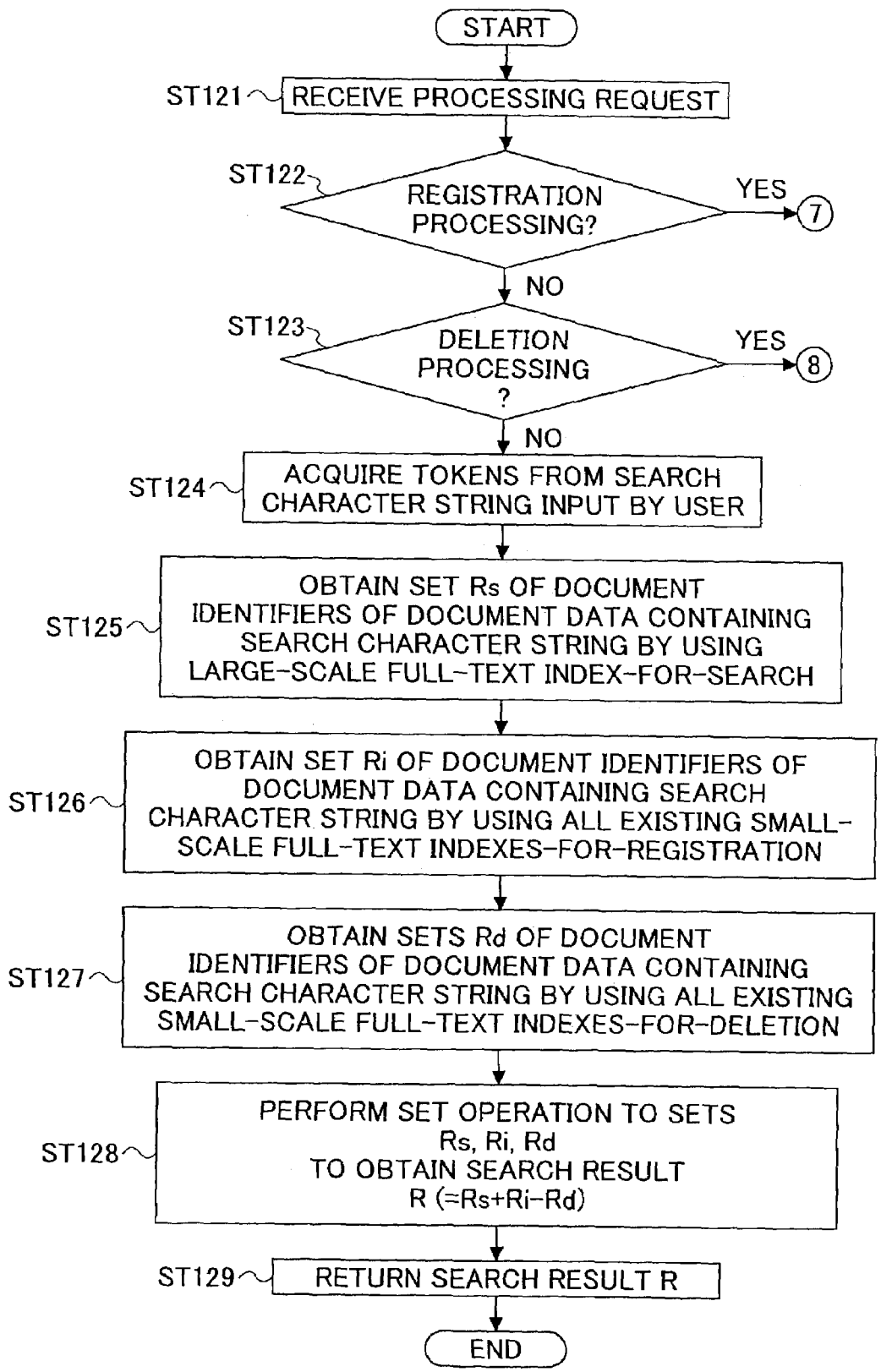
FIG. 32 is a first flowchart for explaining an example of processing in the full-text search device shown in FIG. 31.
Figure 33:
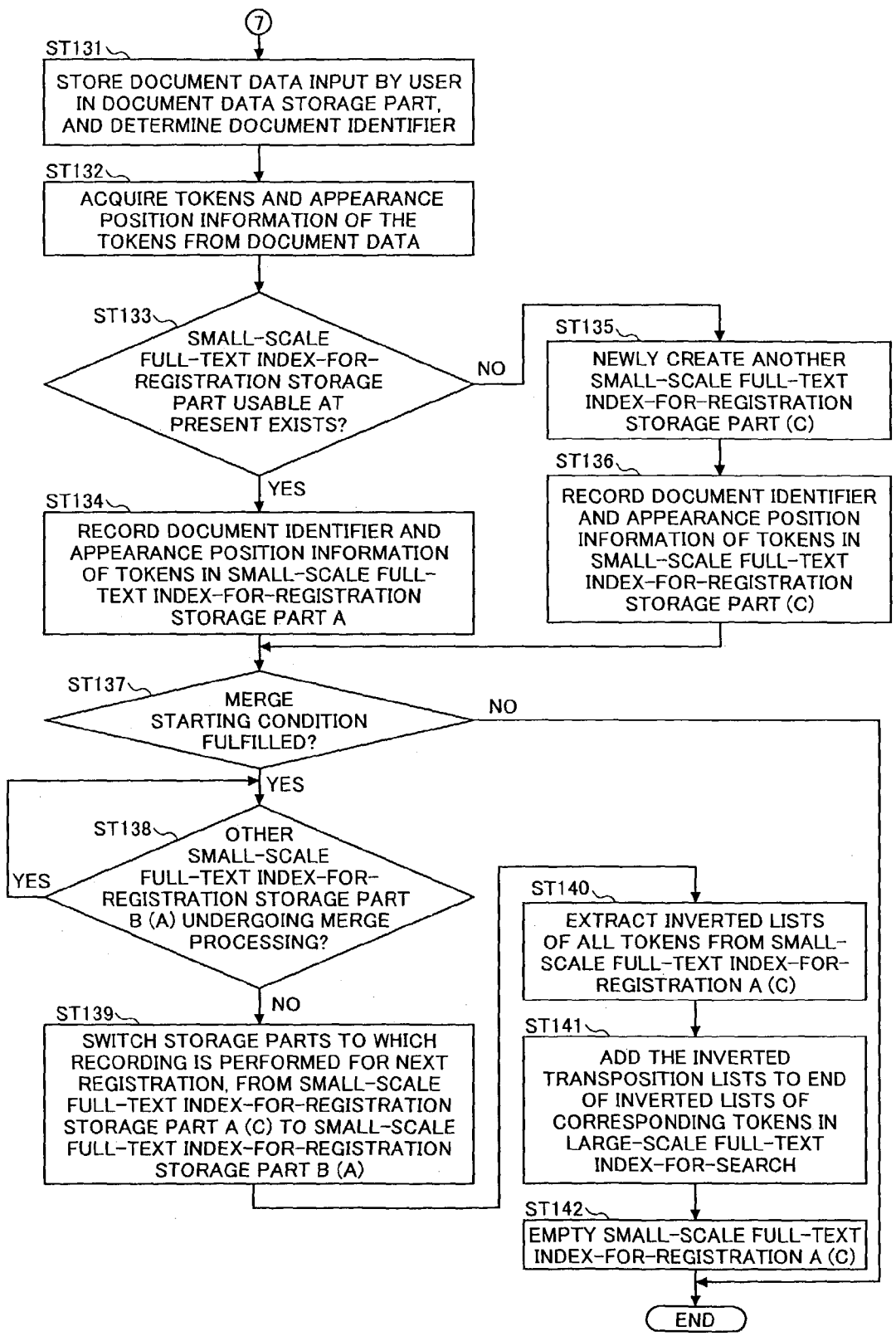
FIG. 33 is a second flowchart for explaining an example of processing in the full-text search device shown in FIG. 31.
Figure 34:
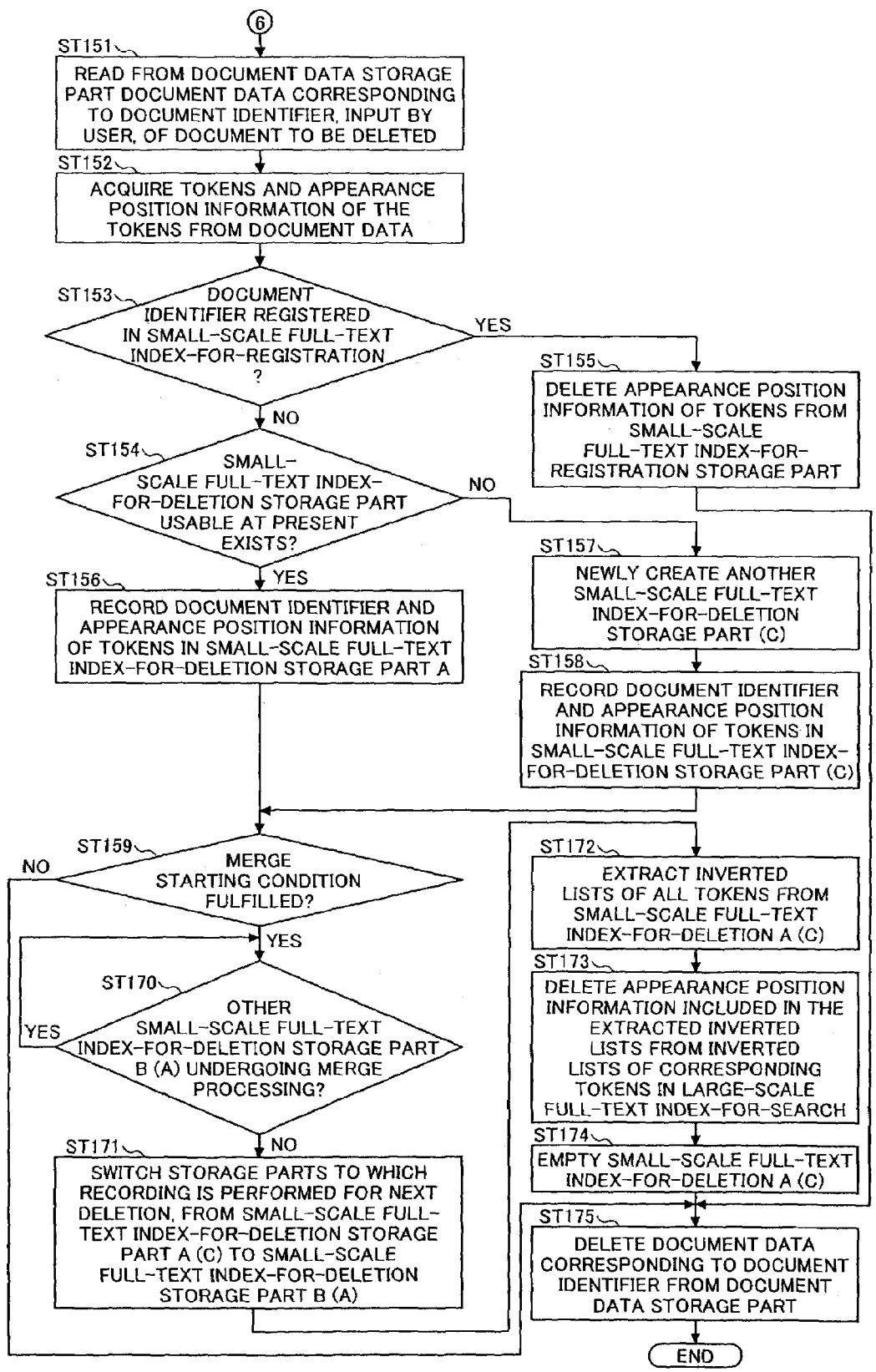
FIG. 34 is a fourth flowchart for explaining an example of processing in the full-text search device shown in FIG. 31.

FIG. 32 to FIG. 34 are flowcharts for explaining an example of processing in the full-text search device shown in FIG. 31.

When the full-text search device receives a processing request from a user (step ST121), first, the full-text search device judges whether the processing is the registration processing (step ST122), whether the processing is the deletion processing (step ST123), and whether the processing is the search processing (NO in step ST123). The full-text search device performs either of the following processings according to this judgment.

<<Registration Processing>>

In performing the registration processing, first, the user creates document data, and registers the document data via the input part 201. The registration processing part 203 stores the document data in the document data storage part 207, and at the same time, determines an identifier (a document identifier) indicating the document data (step ST131 in FIG. 33). Further, the registration processing part 203 acquires partial character strings (tokens) and appearance position information of the tokens from the document data by using the text dividing part 206 (step ST132). Besides, the dividing method and the full-text index are substantially the same as described above.

According to a command from the registration processing part 203, or timely, the storage part management part 212 judges whether there exists a small-scale full-text index-for-registration storage part usable at present (step ST133). When there exists no small-scale full-text index-for-registration storage part usable at present (NO in step ST133), the storage part management part 212 newly creates another small-scale full-text index-for-registration storage part (e.g., the small-scale full-text index-for-registration storage part C) (step ST135). At a point when there exists a usable small-scale full-text index-for-registration storage part (YES in step ST133, or after step ST135), the registration processing part 203 records the document identifier and the appearance position information of the tokens in the small-scale full-text index-for-registration storage part at that point (e.g., the small-scale full-text index-for-registration storage part A (209*a*)/C) (step ST134/ST136).

A merge processing is timely performed after the recording in step ST134/ST136. In the present example, the merge processing is performed according to a predetermined merge starting condition. First, as a result of the recording in step ST134/ST136, the registration processing part 203 judges whether the merge starting condition is fulfilled (step ST137). When the merge starting condition is not fulfilled (NO in step ST137), the processing is ended. Besides, the starting conditions of the forms of the merge processing described above in the foregoing embodiments are also applicable to the present eleventh embodiment. When the merge starting condition is fulfilled (YES in step ST137), the registration processing part 203 judges whether the other small-scale full-text index-for-registration storage part (in this example, the small-scale full-text index-for-registration storage part B (209*b*)/A (209*a*)) is undergoing a merge processing (step ST138). Besides, in step ST138, the registration processing part 203 also judges whether the small-scale full-text index-for-registration storage part B (209*b*)/A (209*a*) is undergoing a registration processing. When the small-scale full-text index-for-registration storage part B (209*b*)/A (209*a*) is undergoing a merge processing (YES in step ST138), the registration processing part 203 waits for the merge processing to end. Herein, the most assumed case concerning the judgments regarding the merge processing is explained.

When the merge starting condition is fulfilled, and the other small-scale full-text index-for-registration storage part B (209*b*)/A (209*a*) is not undergoing a merge processing (NO in step ST138), the registration processing part 203 starts a similar merge processing (steps ST140-ST142) as in steps ST47-ST49 shown in FIG. 25 with respect to the small-scale full-text index-for-registration A/C in the small-scale full-text index-for-registration storage part A (209*a*)/C, and switches the storage parts to which the recording is performed for a next registration processing, from the small-scale full-text index-for-registration storage part A (209*a*)/C to the other small-scale full-text index-for-registration storage part B (209*b*)/A (209*a*) (step ST139). When the merge processing is started, the merging part 211 performs the merge processing asynchronously with the registration processing part 203. Besides, the storage part management part 212 may delete excessive full-text index-for-registration storage parts (not to be used in the next processing) upon the merge processing, or timely.

<<Deletion Processing>>

In performing the deletion processing, first, the user inputs a document identifier of a document to be deleted via the input part 201. Next, the deletion processing part 204 reads document data corresponding to the document identifier from the document data storage part 207 (step ST151 in FIG. 34). Further, the deletion processing part 204 acquires partial character strings (tokens) and appearance position information of the tokens from the document data by using the text dividing part 206 (step ST152).

Next, the deletion processing part 204 judges whether the document identifier is registered in the small-scale full-text index-for-registration (step ST153). When the document identifier is registered in the small-scale full-text index-for-registration, the appearance position information of the tokens is deleted from small-scale full-text index-for-registration storage part (step ST155). When the document identifier is not registered in the small-scale full-text index-for-registration (i.e., when the document identifier is registered in the large-scale full-text index-for-search), a recording to the small-scale full-text index-for-deletion storage part is performed as follows.

According to a command from the deletion processing part 204, or timely, the storage part management part 212 judges whether there exists a small-scale full-text index-for-deletion storage part usable at present (step ST154). When there exists no small-scale full-text index-for-deletion storage part usable at present (NO in step ST154), the storage part management part 212 newly creates another small-scale full-text index-for-deletion storage part (e.g., the small-scale full-text index-for-deletion storage part C) (step ST157). At a point when there exists a usable small-scale full-text index-for-deletion storage part (YES in step ST154, or after step ST157), the deletion processing part 204 records the document identifier and the appearance position information of the tokens in the small-scale full-text index-for-deletion storage part at that point (e.g., the small-scale full-text index-for-deletion storage part A (210*a*)/C) (step ST156/ST158). Subsequently, the deletion processing part 204 deletes the document data corresponding to the document identifier from the document data storage part 207 (step ST175).

A merge processing is timely performed after the recording in step ST156/ST158. In the present example, the merge processing is performed according to a predetermined merge starting condition. First, as a result of the recording in step ST156/ST158, the deletion processing part 204 judges whether the merge starting condition is fulfilled (step ST159). When the merge starting condition is not fulfilled (NO in step ST159), the processing is ended after step ST175 is performed. Besides, as mentioned above, the starting conditions of the forms of the merge processing described above in the foregoing embodiments are also applicable to the present eleventh embodiment. When the merge starting condition is fulfilled (YES in step ST159), the deletion processing part 204 judges whether the other small-scale full-text index-for-deletion storage part (in this example, the small-scale full-text index-for-deletion storage part B (210*b*)/A (210*a*)) is undergoing a merge processing (step ST170). Besides, in step ST170, the deletion processing part 204 also judges whether the small-scale full-text index-for-deletion storage part B (210*b*)/A (210*a*) is undergoing a deletion processing. When the small-scale full-text index-for-deletion storage part B (210b)/A (210a) is undergoing a deletion processing (YES in step ST170), the deletion processing part 204 waits for the merge processing to end. Herein, the most assumed case concerning the judgments regarding the merge processing is explained.

When the merge starting condition is fulfilled, and the other small-scale full-text index-for-deletion storage part B (210b)/A (210a) is not undergoing a merge processing (NO in step ST170), the deletion processing part 204 starts a similar merge processing (steps ST172-ST174) as in steps ST59-ST61 shown in FIG. 26 with respect to the small-scale full-text index-for-deletion A/C in the small-scale full-text index-for-deletion storage part A (210a)/C, and switches the storage parts to which the recording is performed for a next deletion processing, from the small-scale full-text index-for-deletion storage part A (210a)/C to the other small-scale full-text index-for-deletion storage part B (210b)/A (210a) (step ST171). When the merge processing is started, the merging part 211 performs the merge processing asynchronously with the deletion processing part 204. Besides, the storage part management part 212 may delete excessive full-text index-for-deletion storage parts (not to be used in the next processing) upon the merge processing, or timely.

<<Search Processing>>

The search processing according to the present eleventh embodiment is basically similar to the search processing described above with reference to FIG. 24, and steps ST34 to ST39 in FIG. 24 correspond to steps ST124 to ST129 in FIG. 32, respectively, except that, in step ST126, the search processing part 205 obtains a set (Ri) of document identifiers of document data containing the search character string by using small-scale full-text indexes-for-registration of all of the small-scale full-text index-for-registration storage parts existing at present (step ST126). Further, in step ST127, the search processing part 205 obtains a set (Rd) of document identifiers of document data containing the search character string by using small-scale full-text indexes-for-deletion of all of the small-scale full-text index-for-deletion storage parts existing at present (step ST127). The search processing part 205 performs the following set operation to the obtained sets (Rs, Ri, Rd) of the document identifiers so as to obtain a search result (R) (step ST128), and outputs the search result (R) as a set of the document identifiers of the document data containing the search character string to the user via the output part 202 (step ST129).

$R=Rs+Ri-Rd,$ wherein + represents a logical OR operator, and − represents a logical NOT operator.

Besides, the present invention is applicable, not only to the above-described full-text search device, but also to a full-text search method in a-full-text search system, as described above with reference to the flowcharts as examples of the processing in the full-text search device. Further, the present invention is also applicable to a program for realizing functions of the full-text search device, to a program for realizing functions of the parts composing the full-text search device, to a program for executing the full-text search method, to a program for executing steps of the processing, or to a computer readable recording medium storing either of the programs.

Embodiment 12

A description will be given of an embodiment where the program and data for realizing the functions of the full-text search according to each of the foregoing embodiments are stored in the recording medium. Specifically, the recording medium may be a CD-ROM, a magneto-optical disc, a DVD-ROM, an FD, a flash memory, and various types of ROM and RAM, and so forth. The program for causing a computer to perform the functions of the full-text search device according to each of the foregoing embodiments so as to realize the functions of the full-text search is recorded in the recording medium for distribution, thereby facilitating the realization of these functions. The functions of the full-text search according to the present invention can be performed by mounting the above-mentioned recording medium in an information processing device, such as a computer, and reading the program by the information processing device, or by storing the program in a storage medium provided in the information processing device, and reading the program when needed.

The present invention is not limited to the specifically disclosed embodiments, and variations and modifications may be made without departing from the scope of the present invention.

The present application is based on Japanese priority applications No. 2002-165580 filed on Jun. 6, 2002, No. 2002-169487 filed on Jun. 11, 2002, and No. 2002-214343 filed on Jul. 23, 2002, the entire contents of which are hereby incorporated by search.

What is claimed is:

1. A database management system managing a database, the system comprising:

a first data retaining part for performing a search operation of data at a first speed using a stored inverted list of a first full-text index, and for performing a changing operation of data at a second speed slower than the first speed, wherein the changing operation comprises an insertion operation, an updating operation, or a deletion operation;

three or more second data retaining parts, each second data retaining part performing a changing operation of data and a search operation of data using a stored inverted list of a second full-text index, wherein said changing operation of data is performed at a higher speed than said search operation of data, and at least one of the second data retaining parts conducts a deletion operation as the only changing operation;

a data transfer part for obtaining a stored inverted list of a second full-text index and transferring data from the stored inverted list of the second full-text index to the stored inverted list of the first full-text index so as to reflect a result of the changing operation;

a database operation request processing part for executing an operation request with respect to the database;

a transaction processing part for guaranteeing a consistency of data between said data transfer part and said database operation request processing part;

a file switching part for switching said second data retaining parts based on the operation request with respect to the database and an asynchronous merge processing to said first data retaining part so that when one of said second data retaining parts is used for the asynchronous merge processing, a different second data retaining part is used for the operation request with respect to the database; and a data amount judging part for judging whether or not an amount of data in one of the second data retaining parts used for the operation request with respect to the database exceeds a threshold value, wherein said file switching part switches one of said second data retaining parts judged by said data amount judging part to exceed said threshold value for the merge processing, and switches another unused second data retaining part for the second data retaining part used for the operation request with respect to the database.

2. A database management system managing a database, the system comprising:

a first data retaining part for performing a search operation of data at a first speed using a stored inverted list of a first full-text index, and for performing a changing operation of data at a second speed slower than the first speed;

a plurality of second data retaining parts for conducting an insertion operation or a deletion operation, each performing a search operation of data using a stored inverted list of a second full-text index, and for performing a changing operation of data at a higher speed than said search operation;

a data transfer part for obtaining a stored inverted list of a second full-text index and transferring data from the stored inverted list of the second full-text index to the stored inverted list of the first full-text index so as to reflect a result of the changing operation;

a database operation request processing part for executing an operation request with respect to the database;

a transaction processing part for guaranteeing a consistency of data between said data transfer part and said database operation request processing part;

a file switching part for switching said second data retaining parts based on the operation request with respect to the database and an asynchronous merge processing to said first data retaining part so that when one of said second data retaining parts is used for the asynchronous merge processing, a different second data retaining part is used for the operation request with respect to the database;

a data amount judging part judging whether or not an amount of data in the second data retaining part used for the operation request with respect to the database exceeds a threshold value; and a reference queue part including a first pointer at a head position referencing a second data retaining part used for the operation request with respect to the database and a second pointer referencing a second data retaining part used for the asynchronous merge processing, wherein said file switching part newly generates another second data retaining part dynamically so as to expand the reference queue part when said second data retaining part used for the operation request with respect to the database is judged by said data amount judging part to exceed said threshold value for the merge processing and switches the newly generated second data retaining part for the second data retaining part used for the operation request with respect to the database by setting the first pointer at the head position of the reference queue part to reference the newly generated second data retaining part, and wherein the changing operation comprises an insertion operation, an updating operation, or a deletion operation.

3. A database management system managing a database, comprising:

a first data retaining part for performing a search operation of data at a first speed using a stored inverted list of a first full-text index, and for performing a changing operation of data at a second speed slower than the first speed, wherein the changing operation comprises an insertion operation, an updating operation, or a deletion operation;

a plurality of second data retaining parts for conducting an insertion operation or a deletion operation, each performing a search operation of data using a stored inverted list of a second full-text index, and for performing a changing operation of data at a higher speed than said search operation;

a data transfer part for obtaining a stored inverted list of a second full-text index and transferring data from the stored inverted list of the second full-text index to the stored inverted list of the first full-text index so as to reflect a result of the changing operation;

a database operation request processing part for executing an operation request with respect to the database;

a transaction processing part for guaranteeing a consistency of data between said data transfer part and said database operation request processing part;

a file switching part for switching said second data retaining parts based on the operation request with respect to the database and an asynchronous merge processing to said first data retaining part so that when one of said second data retaining parts is used for the asynchronous merge processing, the other second data retaining part is used for the operation request with respect to the database; and a watchdog timer monitoring passage of a set time, and requesting a release of a lock when said set time has passed, wherein said database operation request processing part starts said watchdog timer upon receiving a search request, said data transfer part performs the merge processing of a plurality of index units collectively without releasing the lock until said set time has passed, said data transfer part releases the lock for the merge processing, and passes control to said search request when said set time has passed, and said database operation request processing part clears the watchdog timer when said set time has passed.

4. The database management system of claim 3, wherein said set time set in said watchdog timer is a maximum time delayable in searching.

5. A database management program for causing a computer to function as a database management system managing a database, comprising:

a first data retaining part for performing a search operation of data at a first speed using a stored inverted list of a first full-text index, and for performing a changing operation of data at a second speed slower than the first speed, wherein the changing operation comprises an insertion operation, an updating operation, or a deletion operation;

at least two second data retaining parts for performing a changing operation of data and a search operation of data using a stored inverted list of a second full-text index, wherein said changing operation of data is performed at a higher speed than said search operation of data, and at least one of the second data retaining parts conducts a deletion operation as the only changing operation;

a data transfer part for obtaining a stored inverted list of a second full-text index and transferring data from the stored inverted list of the second full-text index to the stored inverted list of the first full-text index so as to reflect a result of the changing operation;

a database operation request processing part for executing an operation request with respect to the database;

a transaction processing part for guaranteeing a consistency of data between said data transfer part and said database operation request processing part;

a file switching part for switching said at least two second data retaining parts based on the operation request with respect to the database and an asynchronous merge processing to said first data retaining part so that when one of said second data retaining parts is used for the asynchronous merge processing, a different second data retaining part is used for the operation request with respect to the database; and a reference queue part including a plurality of pointers to said at least two second data retaining parts, a first pointer referencing a second data retaining part used for the operation request with respect to the database and at least one second pointer referencing second data retaining parts used for the asynchronous merge processing.

6. A computer readable recording medium storing a database management program for causing a computer to function as a relational database management system managing a database, comprising:

a first data retaining part for performing a search operation of data at a first speed using a stored inverted list of a first full-text index, and for performing a changing operation of data at a second speed slower than the first speed, wherein the changing operation comprises an insertion operation, an updating operation, or a deletion operation;

at least two second data retaining parts for performing a changing operation of data and a search operation of data using a stored inverted list of a second full-text index, wherein said changing operation of data is performed at a higher speed than said search operation of data, and at least one of the second data retaining parts conducts a deletion operation as the only changing operation;

a data transfer part for obtaining a stored inverted list of a second full-text index and transferring data from the stored inverted list of the second full-text index to the stored inverted list of the first full-text index so as to reflect a result of the changing operation;

a database operation request processing part for executing an operation request with respect to the relational database;

a transaction processing part for guaranteeing a consistency of data between said data transfer part and said database operation request processing part;

a file switching part for switching said at least two second data retaining parts based on the operation request with respect to the database and an asynchronous merge processing to said first data retaining part so that when one of said second data retaining parts is used for the asynchronous merge processing, a different second data retaining part is used for the operation request with respect to the database; and a reference queue part including a plurality of pointers to said at least two second data retaining parts, a first pointer referencing a second data retaining part used for the operation request with respect to the database and at least one second pointer referencing second data retaining parts used for the asynchronous merge processing.

* * * * *